(12) United States Patent
Komatsu et al.

(10) Patent No.: US 12,292,554 B2
(45) Date of Patent: May 6, 2025

(54) ZOOM LENS AND IMAGING APPARATUS

(71) Applicant: FUJIFILM Corporation, Tokyo (JP)

(72) Inventors: Daiki Komatsu, Saitama (JP);
Masanao Kawana, Saitama (JP);
Motoari Ota, Saitama (JP); Takuya Tanaka, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 467 days.

(21) Appl. No.: 17/748,443

(22) Filed: May 19, 2022

(65) Prior Publication Data

US 2022/0382027 A1 Dec. 1, 2022

(30) Foreign Application Priority Data

May 28, 2021 (JP) .................................. 2021-090401

(51) Int. Cl.
*G02B 15/14* (2006.01)
*G02B 7/09* (2021.01)
(Continued)

(52) U.S. Cl.
CPC ....... *G02B 15/143103* (2019.08); *G02B 7/09* (2013.01); *G02B 13/02* (2013.01); *G03B 5/02* (2013.01); *G02B 3/0043* (2013.01)

(58) Field of Classification Search
CPC ...... G02B 7/09; G02B 15/1461; G02B 15/16; G02B 15/00; G02B 15/14; G02B 15/1421; G02B 15/143; G02B 15/1431; G02B 15/143103; G02B 15/143107; G02B 15/144; G02B 15/1441; G02B 15/144103; G02B 15/144107; G02B 15/144111; G02B 15/144115; G02B 15/145; G02B 15/1451; G02B 15/145103; G02B 15/145107;
(Continued)

(56) References Cited

U.S. PATENT DOCUMENTS 10,627,610 B2 4/2020 Sugita
10,823,942 B2 11/2020 Miyagawa et al.
(Continued)

FOREIGN PATENT DOCUMENTS

CN 111929876 A * 11/2020 ........... G02B 13/004
CN 112198645 A * 1/2021 ..... G02B 15/144111
(Continued)

OTHER PUBLICATIONS

Gross et al. "Handbook of Optical Systems Volume 3: Aberration Theory and Correction of Optical Systems" Weinheim Germany, WILEY-VCH Verlag GmbH & Co. KGaA, pp. 377-379 (Year: 2007).*
(Continued)

*Primary Examiner* — Pinping Sun
*Assistant Examiner* — Alaina Marie Swanson
(74) *Attorney, Agent, or Firm* — Studebaker Brackett PLLC

(57) ABSTRACT

The zoom lens consists of, in order from the object side, a first lens group that has a positive refractive power, a second lens group that has a positive refractive power, and a subsequent group. During zooming, a spacing between the first lens group and the second lens group changes, and a spacing between the second lens group and the subsequent group changes. The subsequent groups include a focusing group that moves during focusing.

20 Claims, 25 Drawing Sheets

(51) Int. Cl.
*G02B 13/02* (2006.01)
*G03B 5/02* (2021.01)
*G02B 3/00* (2006.01)

(58) Field of Classification Search
CPC .... G02B 15/145111; G02B 15/145115; G02B 15/145119; G02B 15/145123; G02B 15/145127; G02B 15/145131; G02B 15/146; G02B 15/144105; G03B 5/02
USPC ....... 359/701, 383, 392, 410, 676, 684, 695, 359/745, 754, 759, 760, 767, 768, 769, 359/791, 792
See application file for complete search history.

(56) References Cited

U.S. PATENT DOCUMENTS

| | | | |
|---|---|---|---|
| 11,435,566 B2 | 9/2022 | Sugita | |
| 2010/0177407 A1* | 7/2010 | Ryu | G02B 15/143103 359/791 |
| 2012/0013993 A1* | 1/2012 | Uchida | G02B 15/145123 359/684 |

| | | |
|---|---|---|
| 2015/0198792 A1 | 7/2015 | Kawana |
| 2019/0064489 A1 | 2/2019 | Tanaka |

FOREIGN PATENT DOCUMENTS

| | | |
|---|---|---|
| JP | H10-0142506 A | 5/1998 |
| JP | 2002-196239 A | 7/2002 |
| JP | 2010-191336 A | 9/2010 |
| JP | 2013-003255 A | 1/2013 |
| JP | 2013-003384 A | 1/2013 |
| JP | 2015-156010 A | 8/2015 |
| JP | 2018-132675 A | 8/2018 |
| JP | 2019-008236 A | 1/2019 |
| JP | 2019-040020 A | 3/2019 |
| JP | 2019-045555 A | 3/2019 |
| WO | 2017/134929 A1 | 8/2017 |
| WO | 2021/220579 A1 | 11/2021 |

OTHER PUBLICATIONS

"Notice of Reasons for Refusal" Office Action issued in JP 2021-090401; mailed by the Japanese Patent Office on Nov. 5, 2024.

* cited by examiner

FIG. 2
EXAMPLE 1
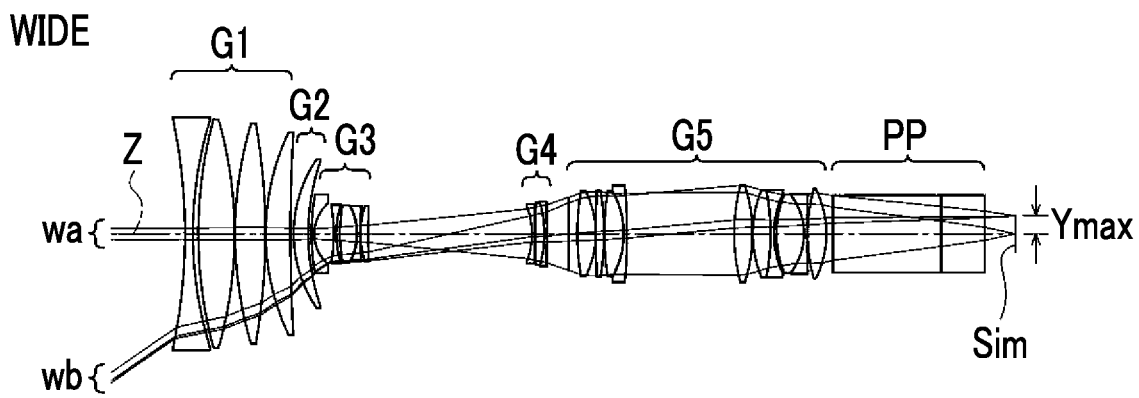
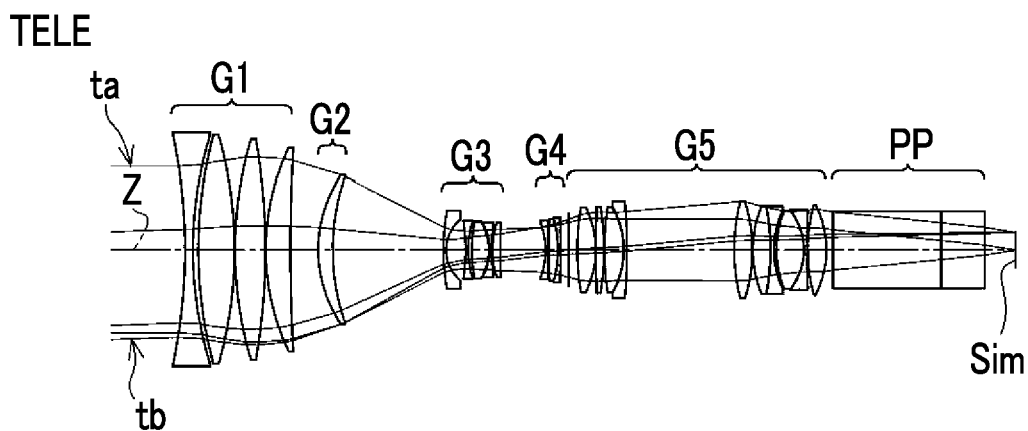
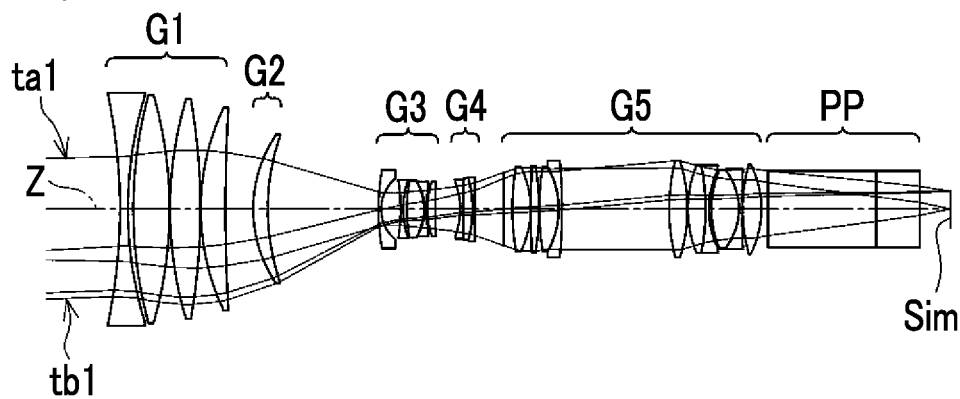

FIG. 3
EXAMPLE 1
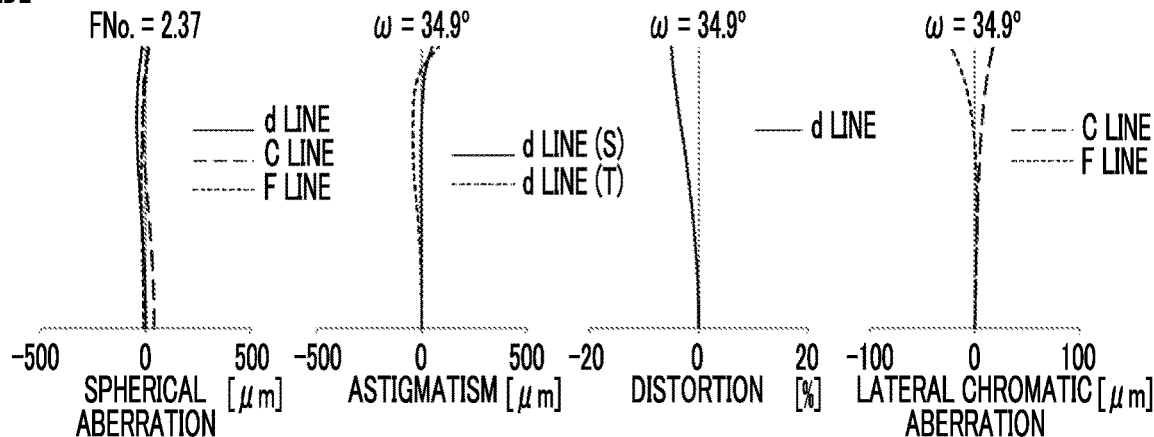
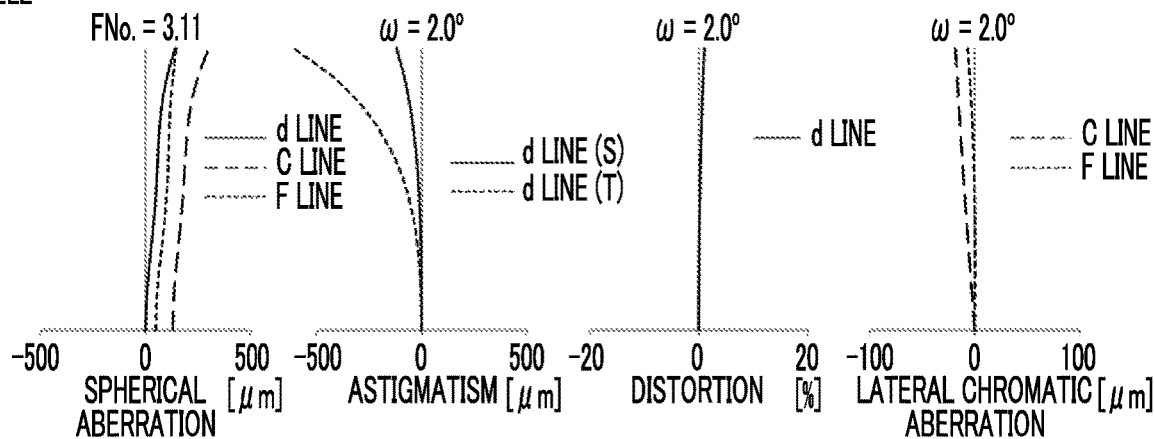
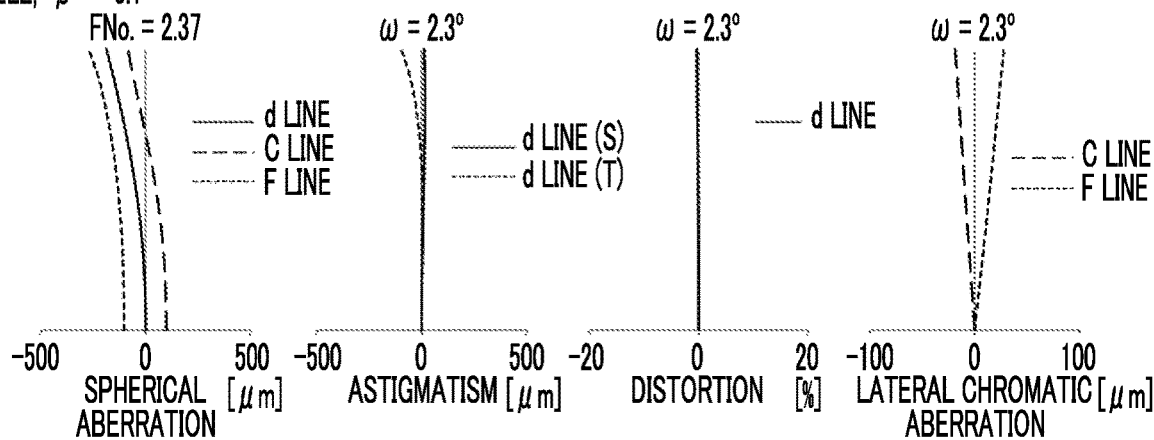

EXAMPLE 2

FIG. 5
EXAMPLE 2
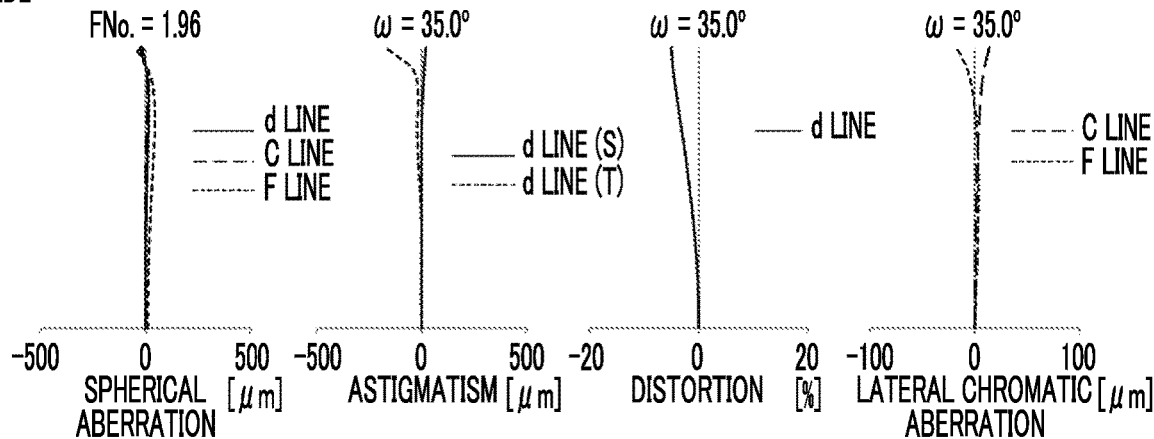
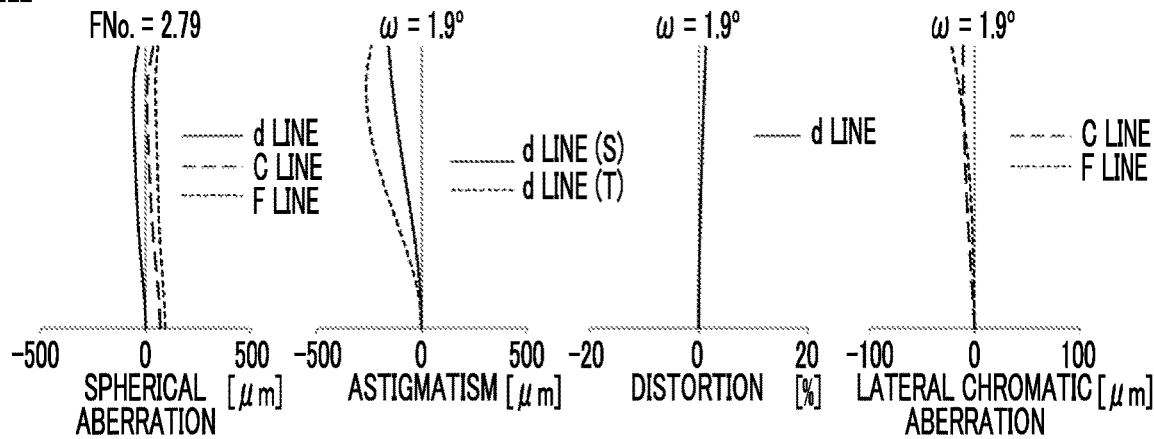
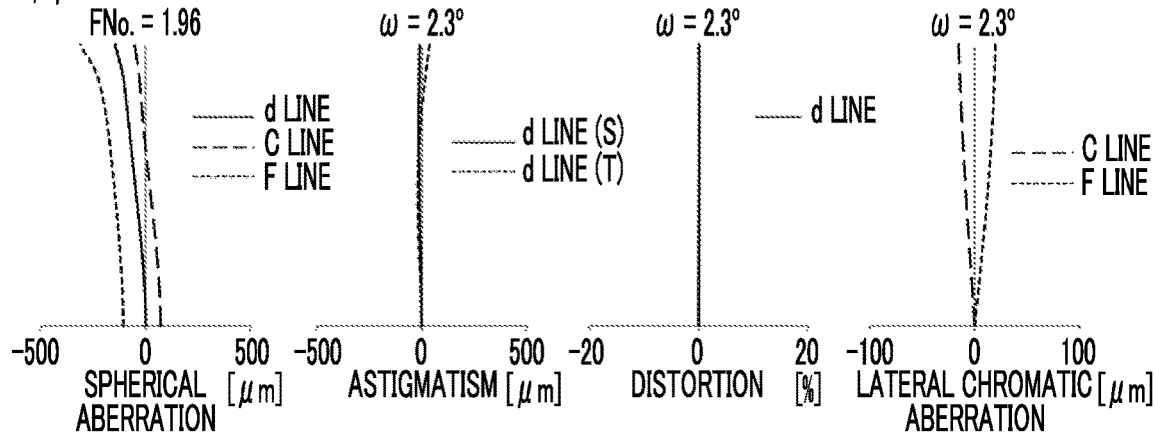

EXAMPLE 3

FIG. 7
EXAMPLE 3
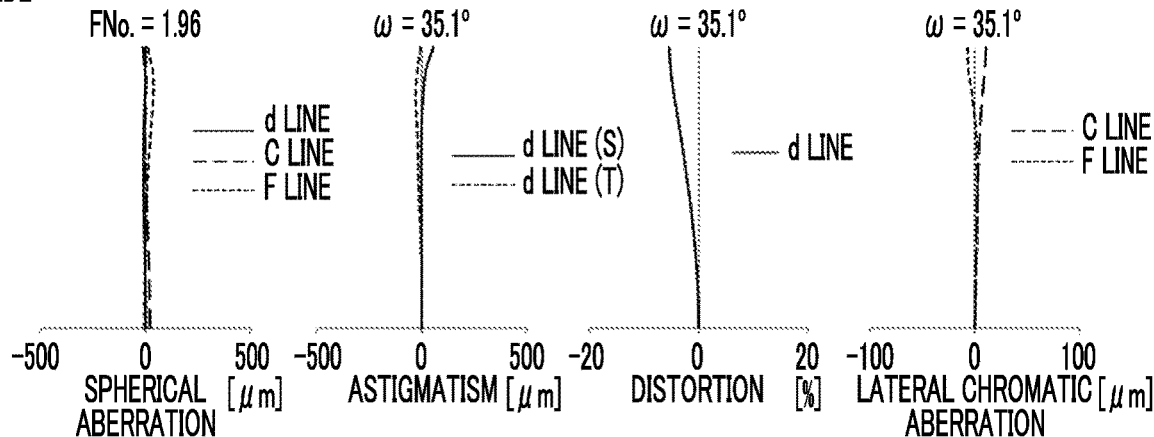
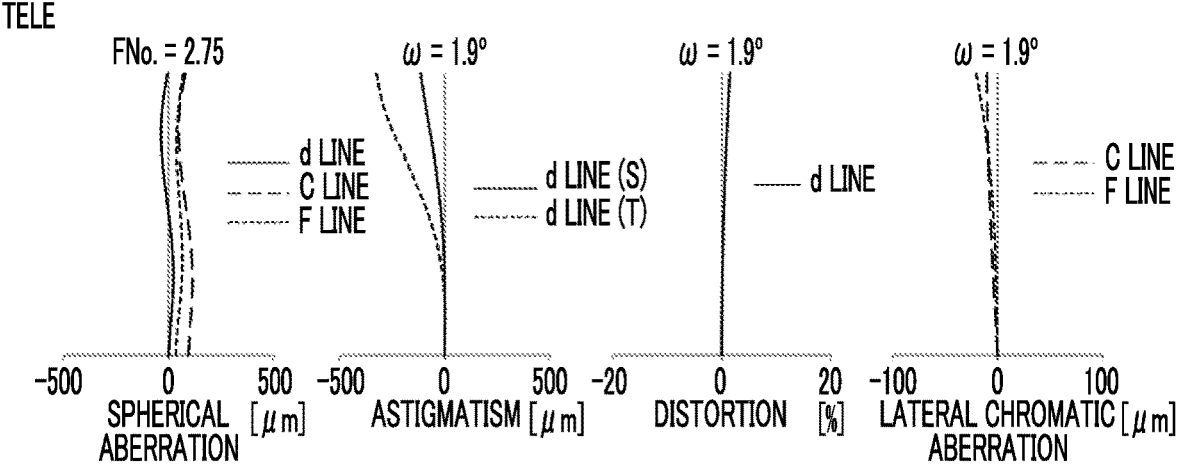
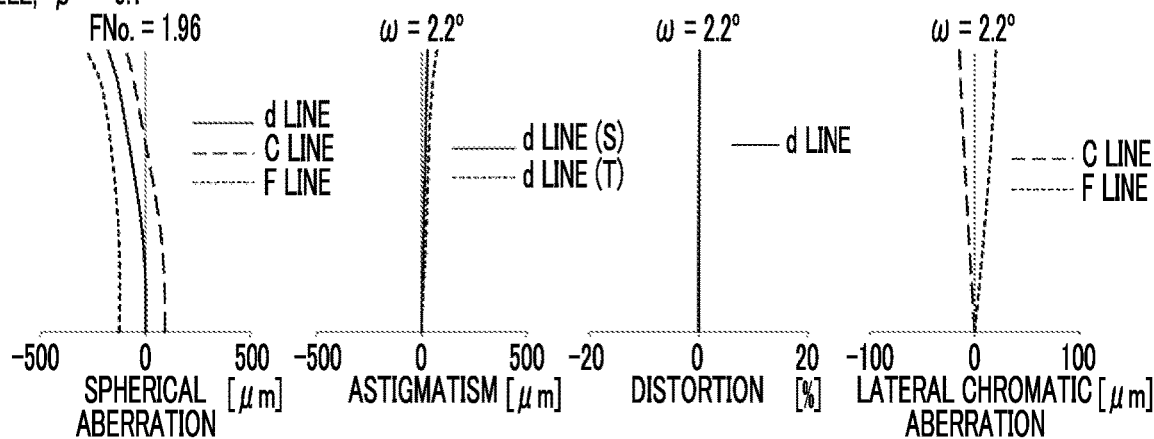

EXAMPLE 4

FIG. 9
EXAMPLE 4
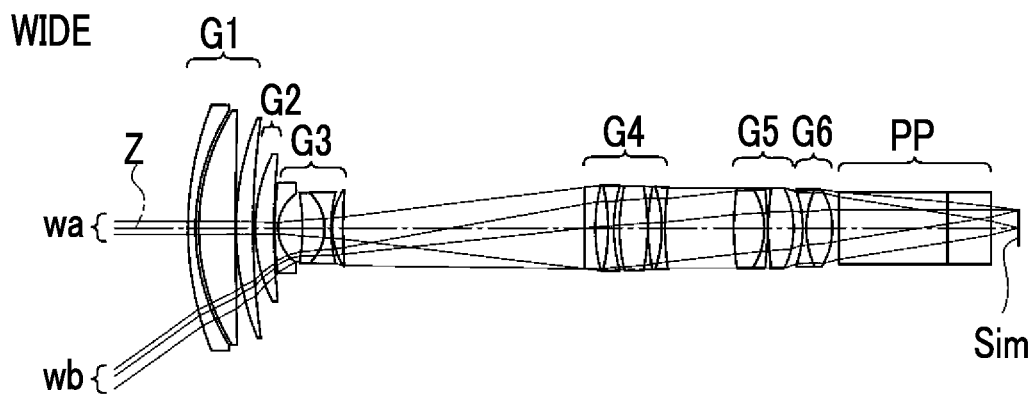
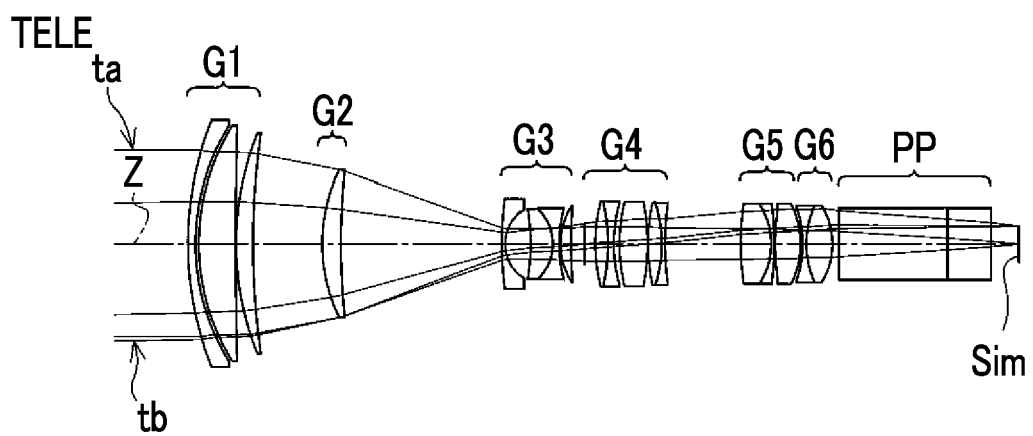
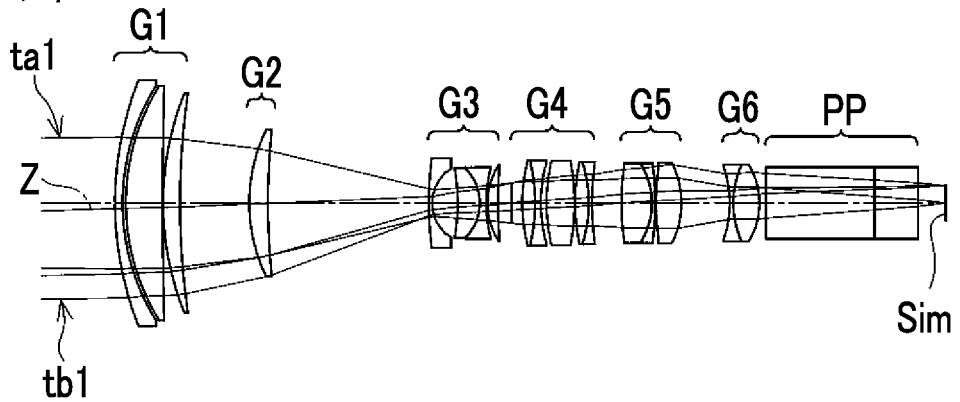

FIG. 10
EXAMPLE 4
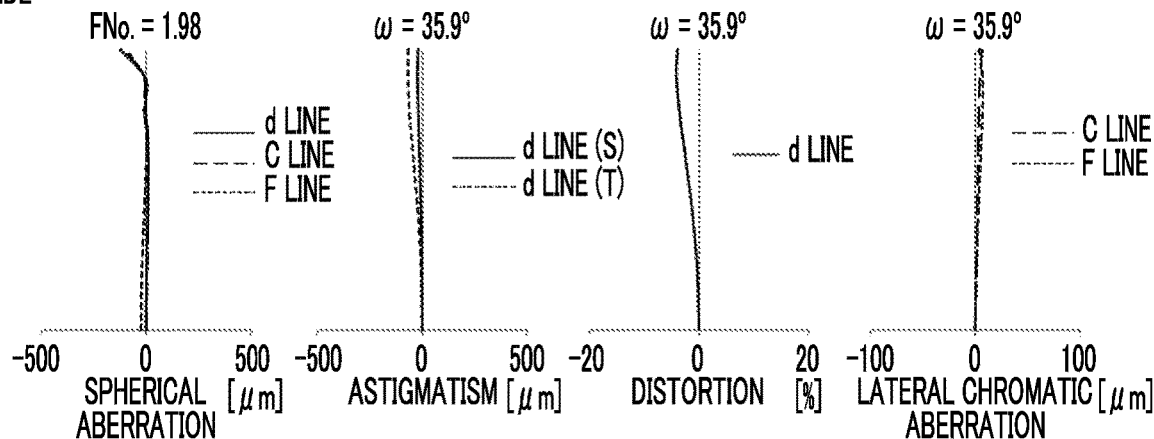
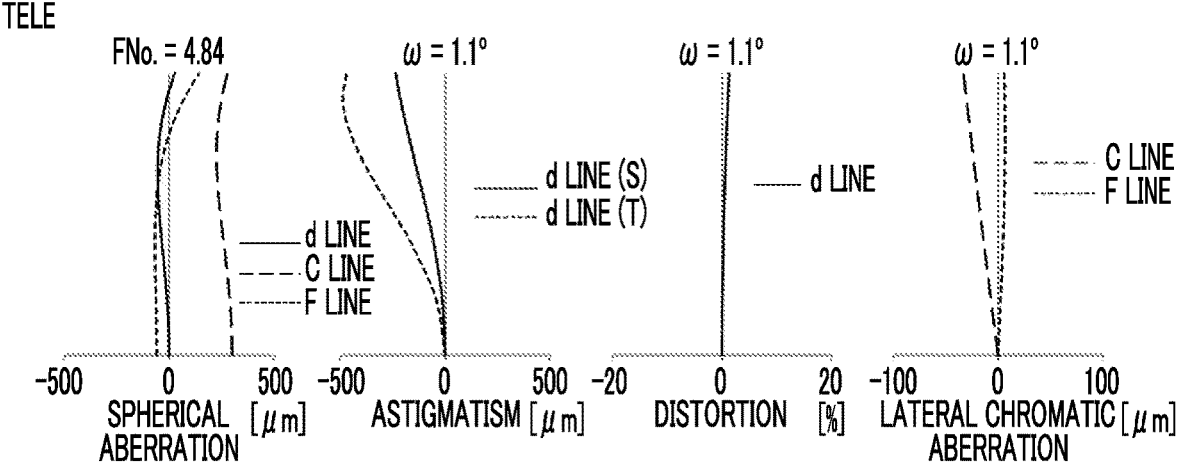
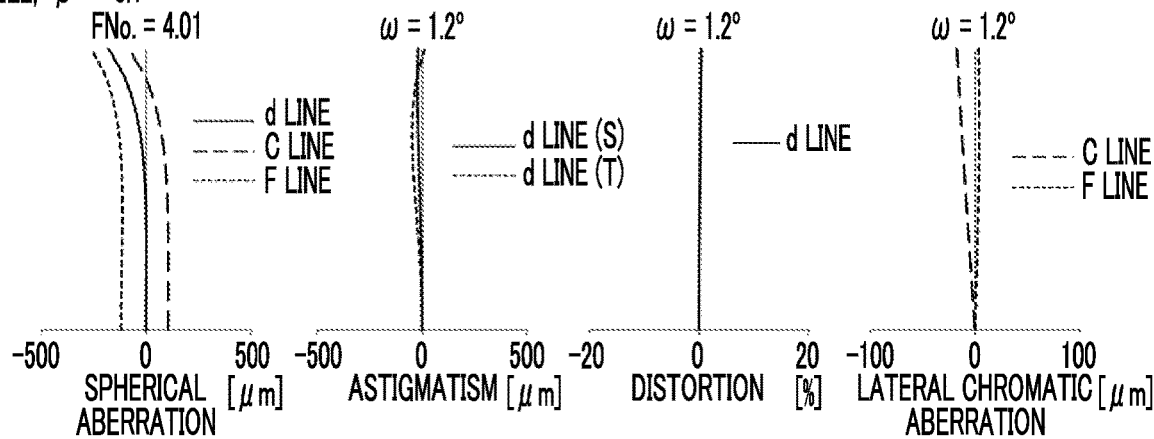

EXAMPLE 5

FIG. 12
EXAMPLE 5
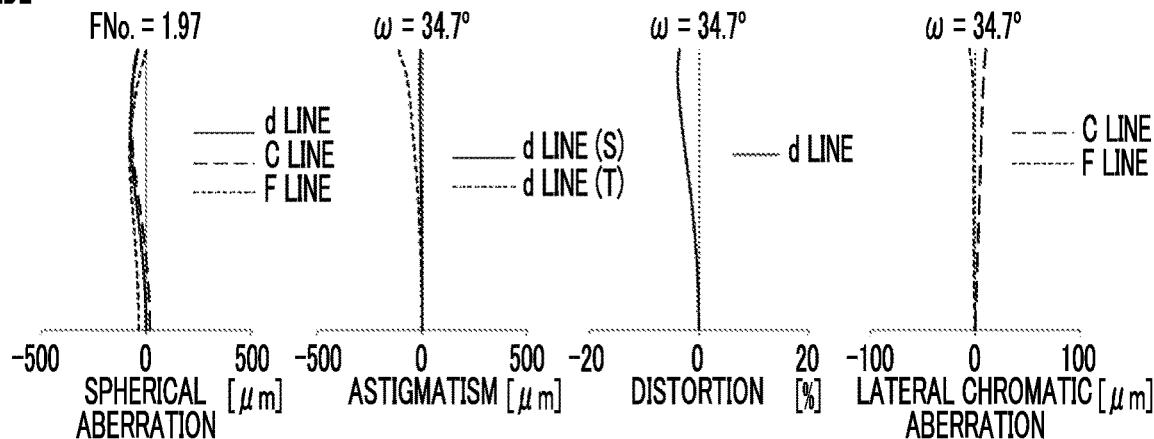
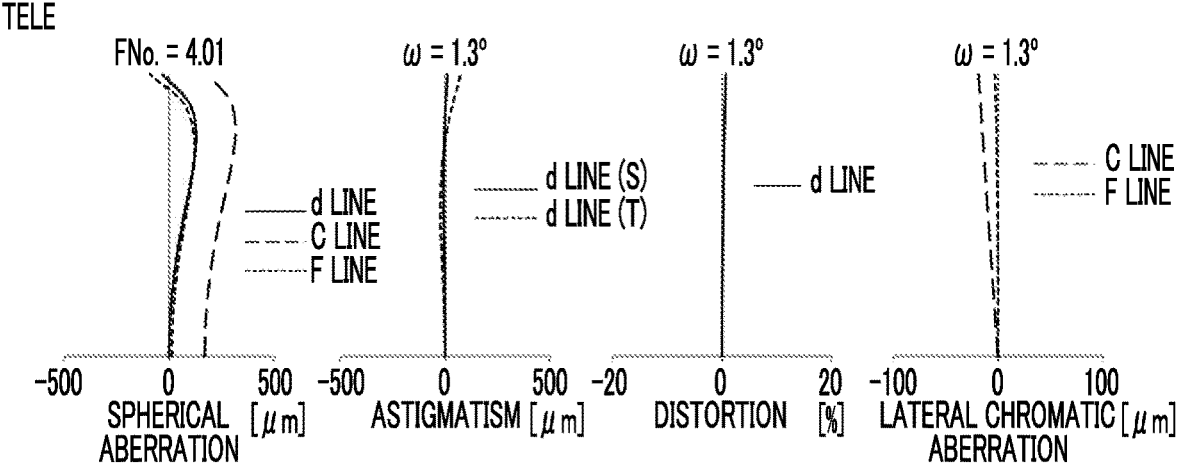
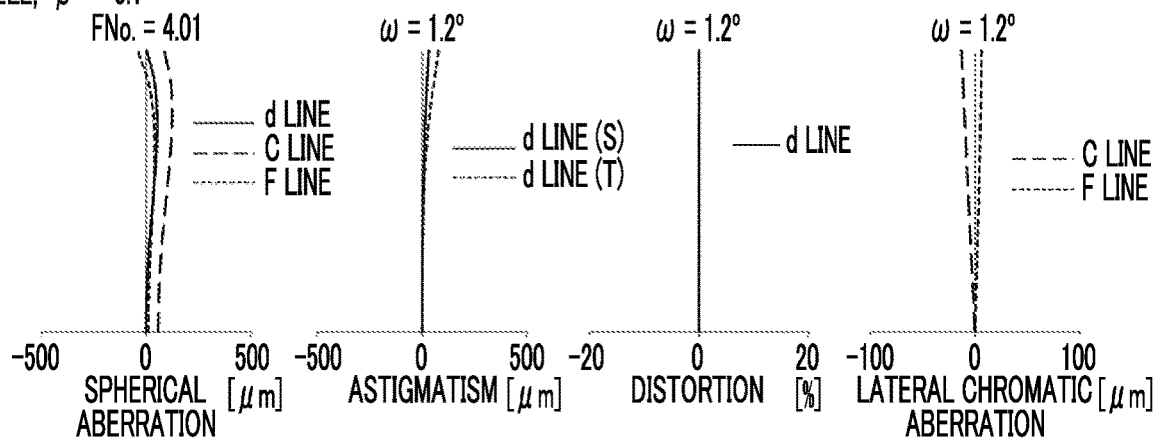

EXAMPLE 6

FIG. 14
EXAMPLE 6
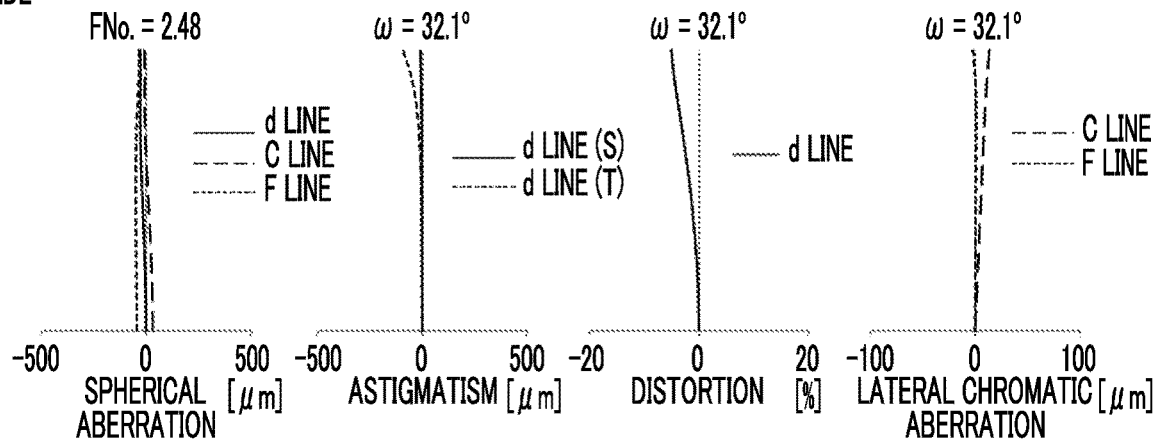
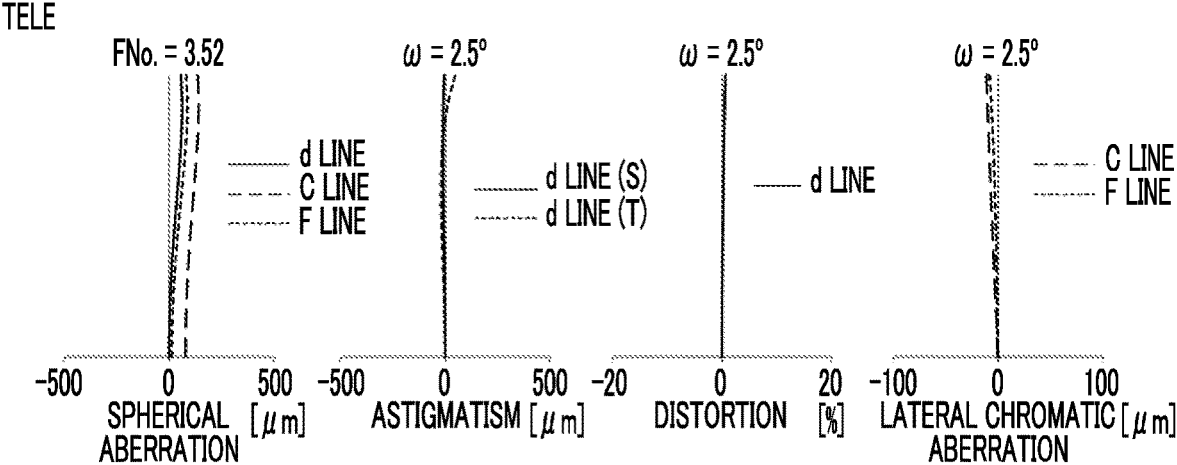
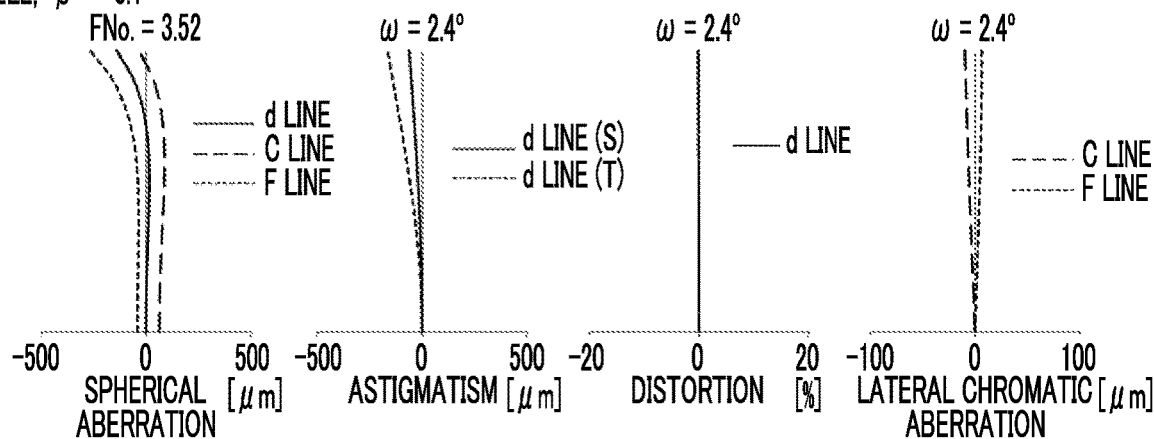

FIG. 16
EXAMPLE 7
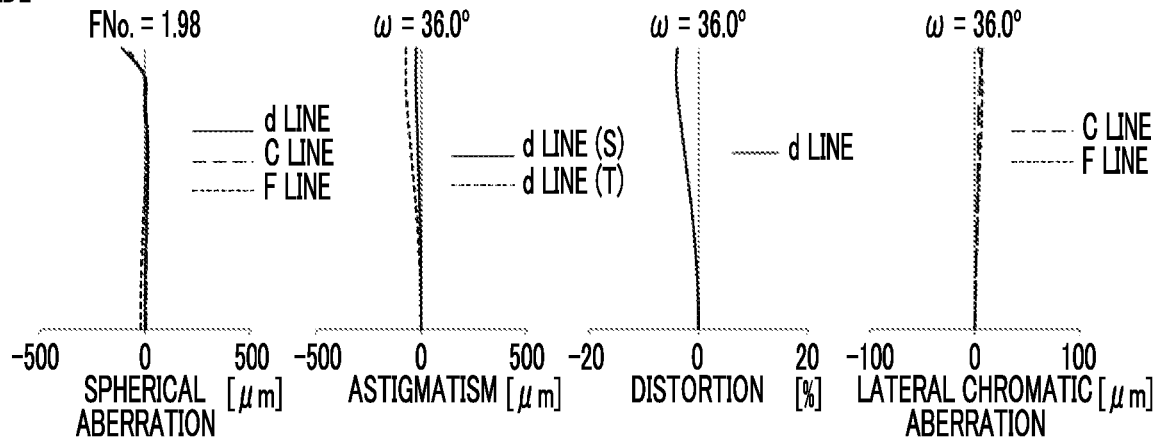
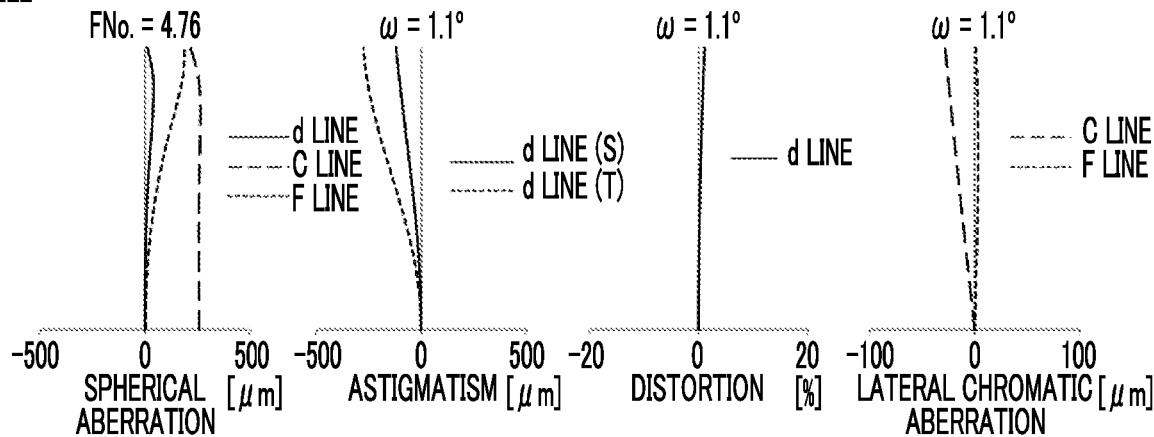
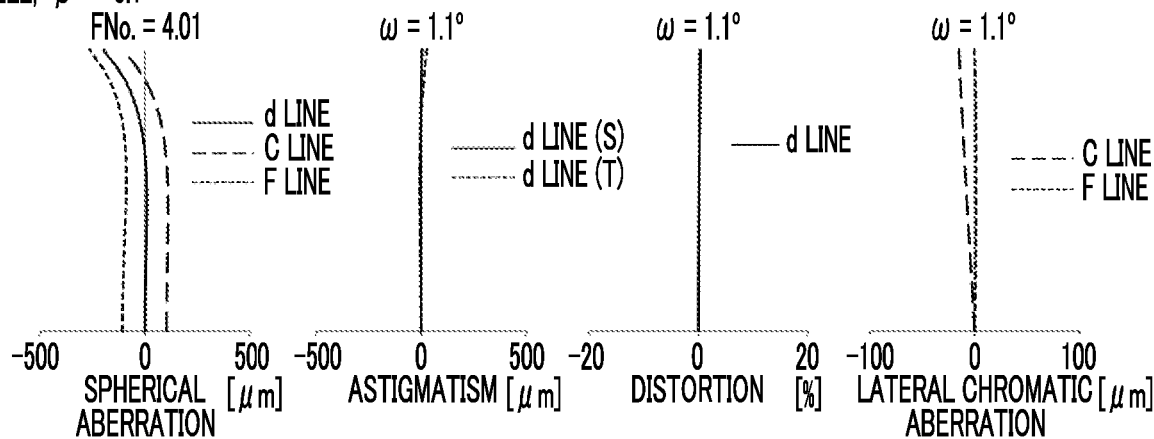

FIG. 18
EXAMPLE 8
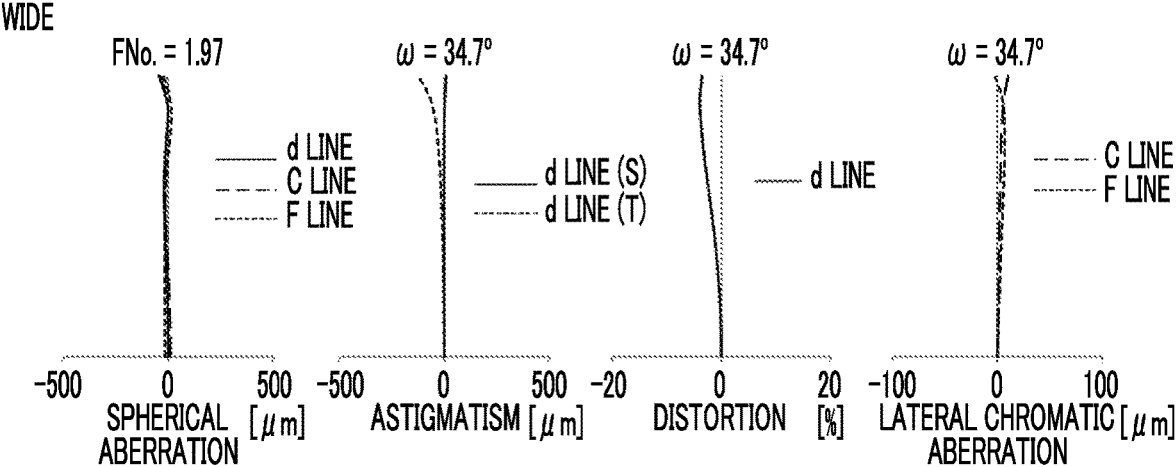
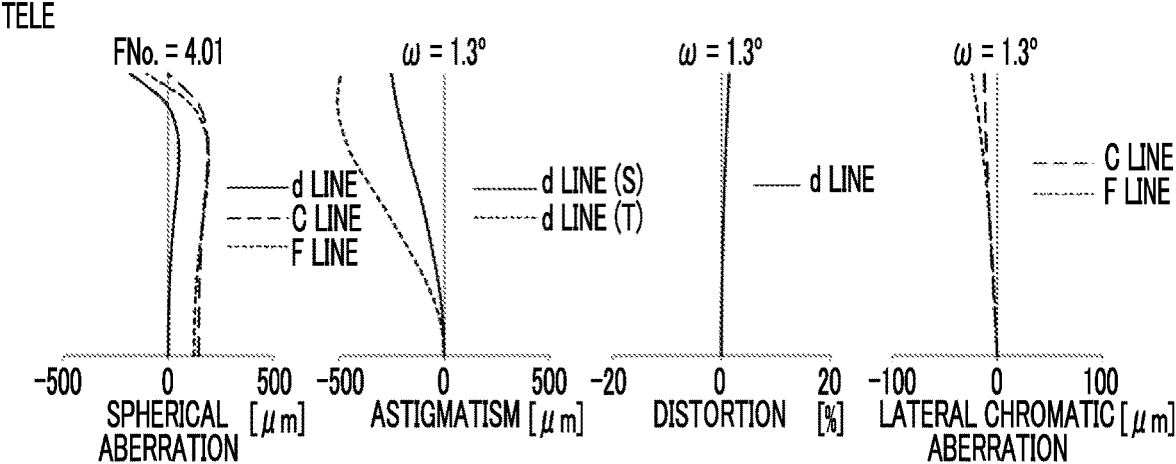
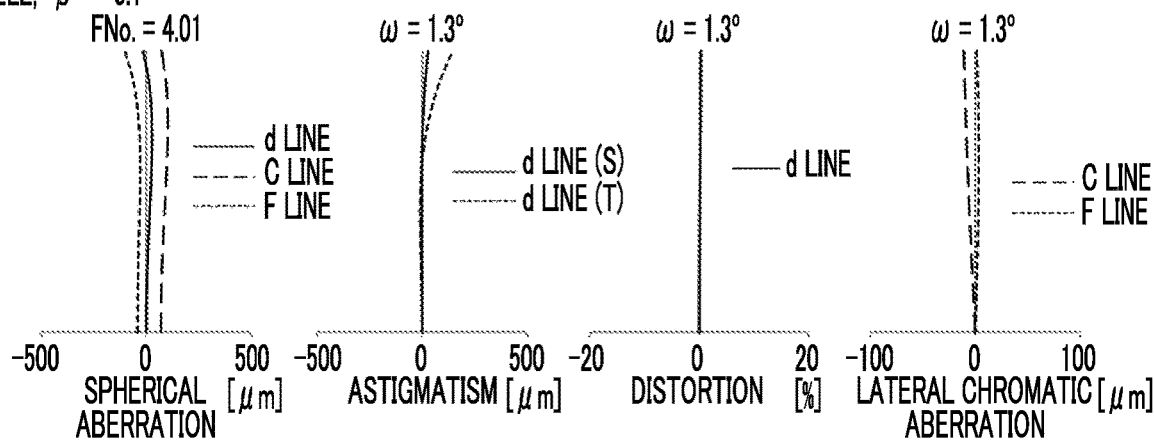

EXAMPLE 9

FIG. 20
EXAMPLE 9
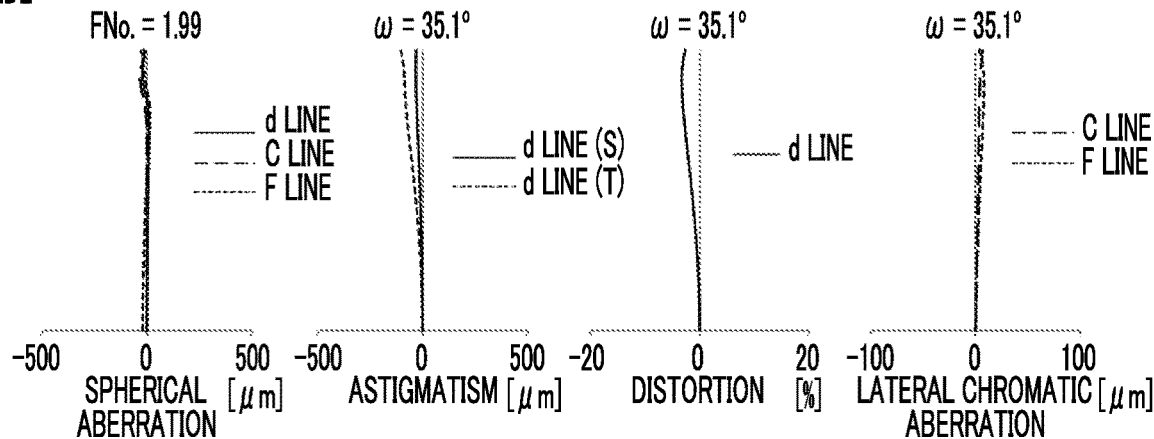
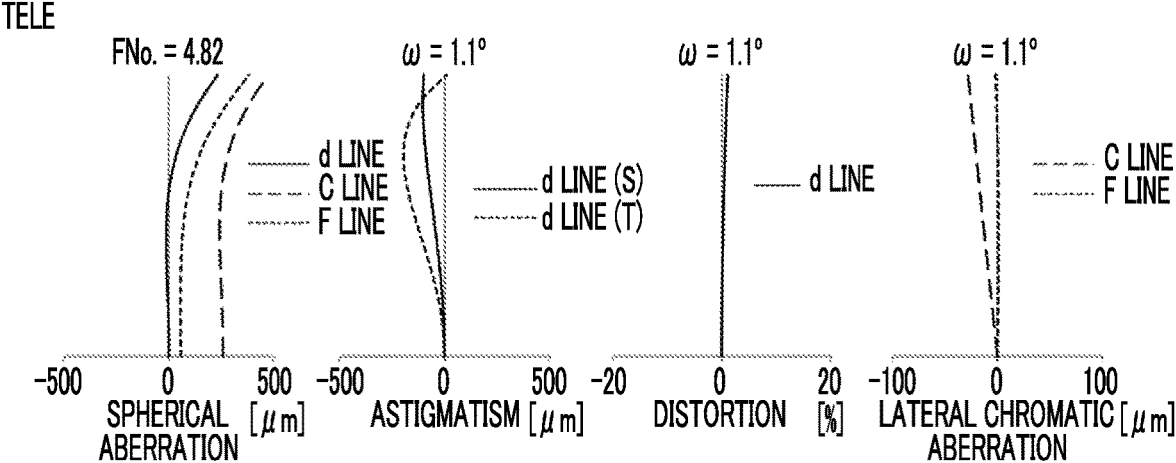
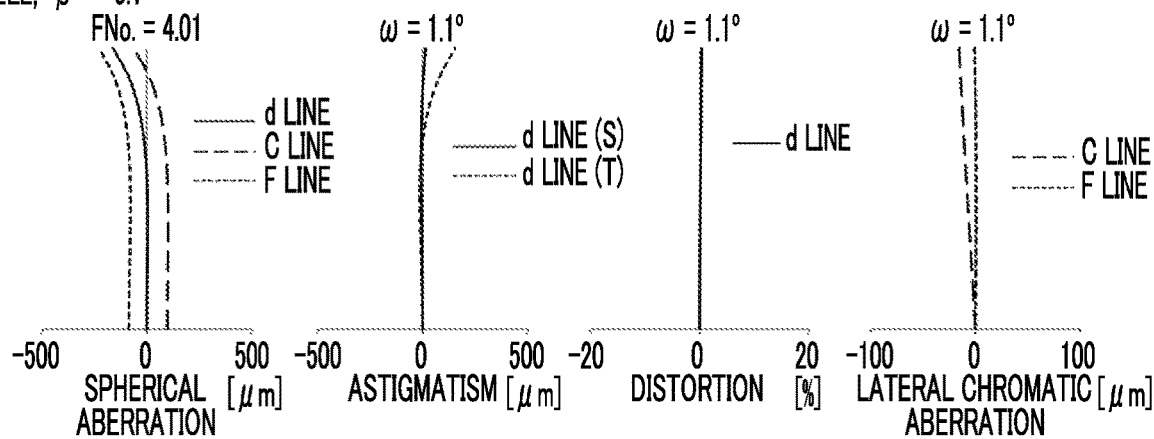

EXAMPLE 10

FIG. 22
EXAMPLE 10
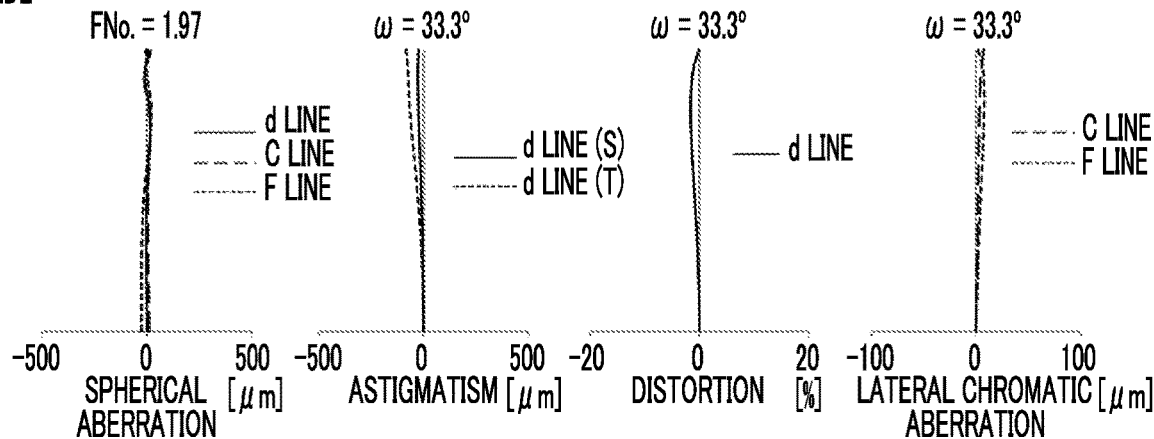
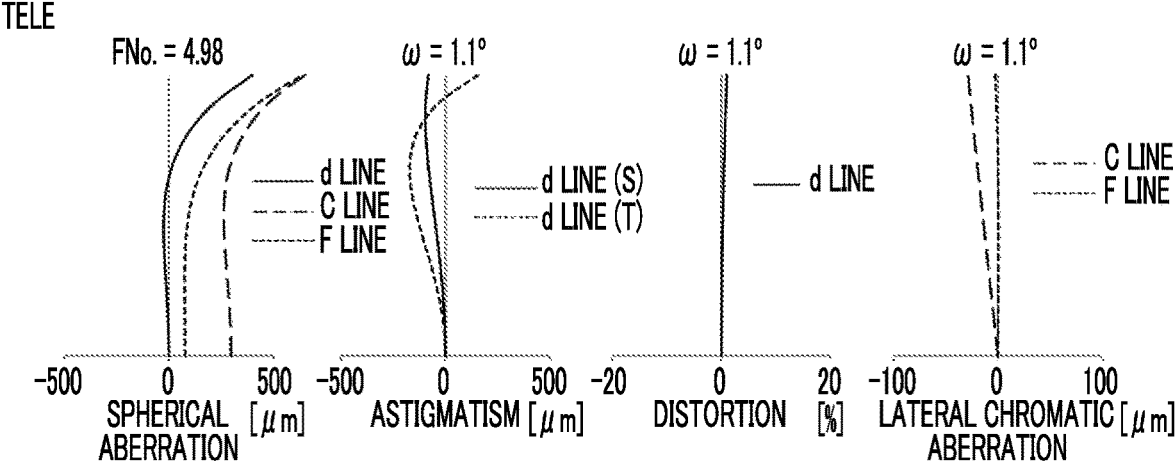
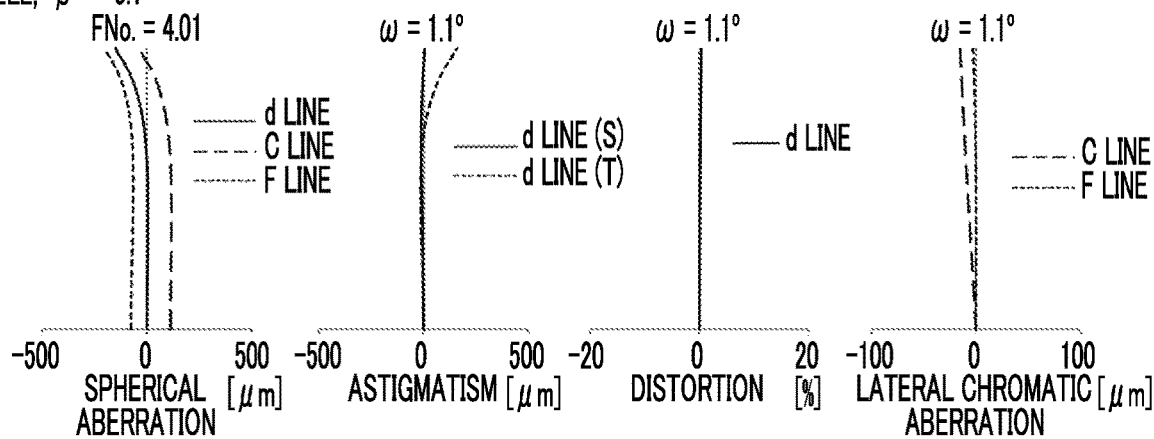

FIG. 24
EXAMPLE 11
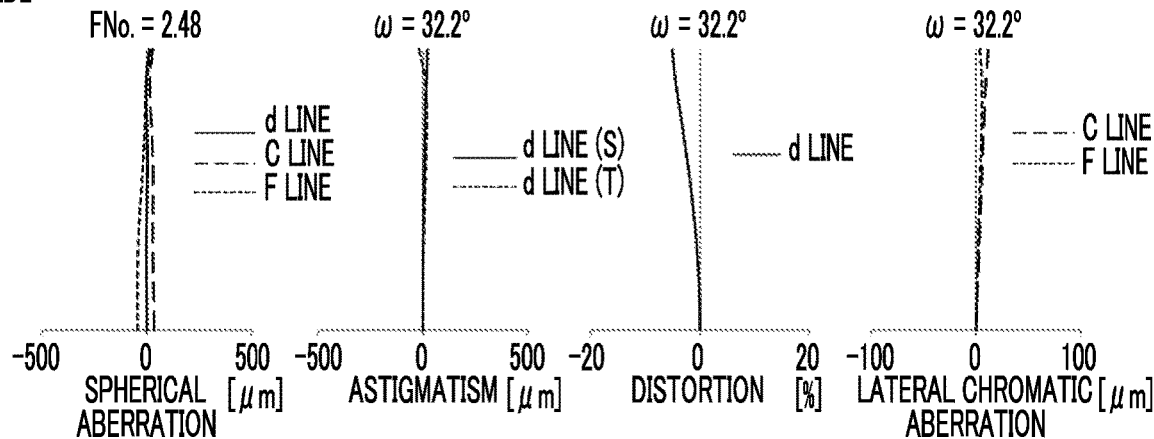
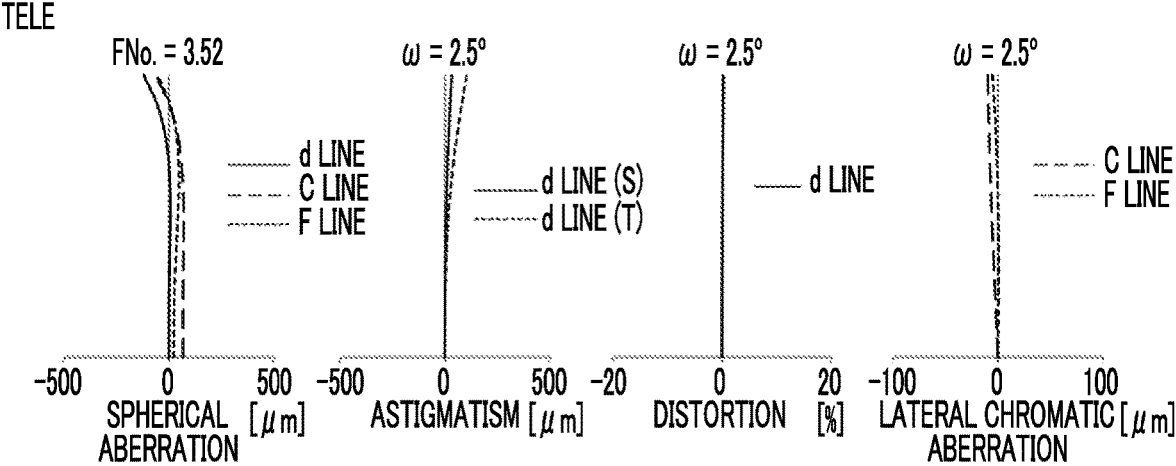
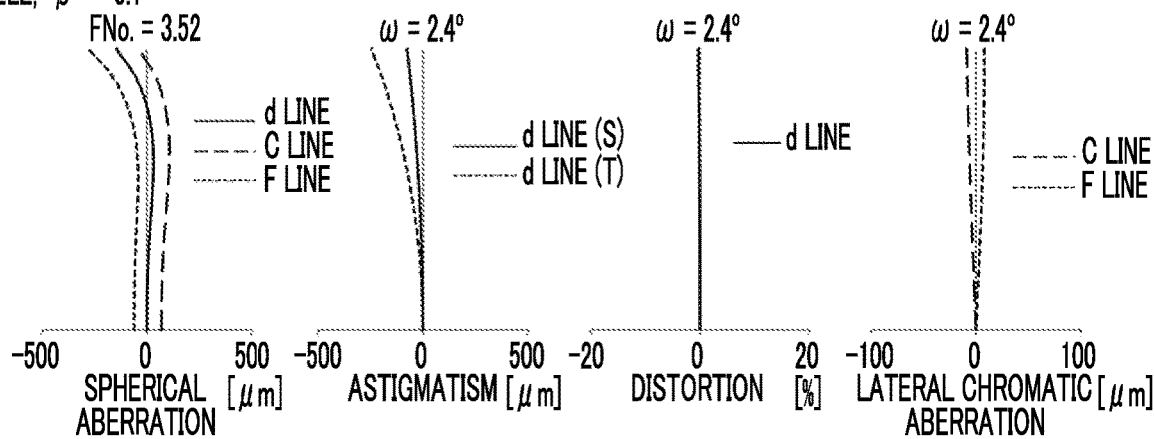

ZOOM LENS AND IMAGING APPARATUS

CROSS-REFERENCE TO RELATED APPLICATIONS

The present application claims priority under 35 U.S.C. § 119 to Japanese Patent Application No. 2021-090401, filed on May 28, 2021. The above application is hereby expressly incorporated by reference, in its entirety, into the present application.

BACKGROUND

Technical Field

The technology of the present disclosure relates to a zoom lens and an imaging apparatus.

Related Art

In the related art, as a zoom lens applicable to an imaging apparatus such as a broadcast camera, a movie camera, a digital camera, a video camera, and a surveillance camera, for example, the lens systems described in JP2019-040020A and JP2015-156010A are known.

There is a demand for a zoom lens that is configured to have a small size and has a high magnification.

SUMMARY

The present disclosure has been made in view of the above circumstances, and an object of the present invention is to provide a zoom lens that is reduced in size and has a high magnification, and an imaging apparatus comprising the zoom lens.

According to an aspect of the present disclosure, there is provided a zoom lens consisting of, in order from an object side to an image side: a first lens group that has a positive refractive power; a second lens group that has a positive refractive power; and a subsequent group. During zooming, a spacing between the first lens group and the second lens group changes, and a spacing between the second lens group and the subsequent group changes, and the subsequent group includes a focusing group that moves during focusing.

Assuming that a focal length of the first lens group is f1, and a maximum image height is Ymax, the zoom lens of the above-mentioned aspect preferably satisfies Conditional Expression (1), and more preferably satisfies Conditional Expression (1-1).

$$0 < Ymax/f1 < 2 \quad (1)$$

$$0 < Ymax/f1 < 1 \quad (1\text{-}1)$$

Assuming that a focal length of the first lens group is f1, and a focal length of the second lens group is f2, the zoom lens of the above-mentioned aspect preferably satisfies Conditional Expression (2), and more preferably satisfies Conditional Expression (2-1).

$$0 < f1/f2 < 4 \quad (2)$$

$$0 < f1/f2 < 3 \quad (2\text{-}1)$$

Assuming that a focal length of the zoom lens in a state where an infinite distance object is in focus at a telephoto end is ft, and a focal length of the second lens group is f2, the zoom lens of the above-mentioned aspect preferably satisfies Conditional Expression (3), and more preferably satisfies Conditional Expression (3-1).

$$0 < ft/f2 < 4 \quad (3)$$

$$0 < ft/f2 < 3 \quad (3\text{-}1)$$

Assuming that a focal length of the zoom lens in a state where an infinite distance object is in focus at a telephoto end is ft, and a focal length of the focusing group is fF, the zoom lens of the above-mentioned aspect preferably satisfies Conditional Expression (4), and more preferably satisfies Conditional Expression (4-1).

$$1 < |ft/fF| < 15 \quad (4)$$

$$2 < |ft/fF| < 12 \quad (4\text{-}1)$$

Assuming that a difference in an optical axis direction between a position of the focusing group in a state in which an infinite distance object is in focus at the telephoto end and a position of the focusing group in a state in which the lateral magnification of the zoom lens at the telephoto end is −0.1 times is DZF, and a focal length of the focusing group is fF, the zoom lens of the above-mentioned aspect preferably satisfies Conditional Expression (5), and more preferably satisfies Conditional Expression (5-1).

$$0.1 < |DZF/fF| < 1 \quad (5)$$

$$0.12 < |DZF/fF| < 0.8 \quad (5\text{-}1)$$

Assuming that a curvature radius of a lens surface closest to the image side in the first lens group is R1r, and a curvature radius of a lens surface closest to the object side in the second lens group is R2f, the zoom lens of the above-mentioned aspect preferably satisfies Conditional Expression (6) and more preferably satisfies Conditional Expression (6-1).

$$0 \le (R1r - R2f)/(R1r + R2f) < 2 \quad (6)$$

$$0 \le (R1r - R2f)/(R1r + R2f) < 1.5 \quad (6\text{-}1)$$

Assuming that a curvature radius of a lens surface closest to the image side in the second lens group is R2r, and a curvature radius of a lens surface closest to the object side in the subsequent group is RSf, it is preferable that the zoom lens of the above-mentioned aspect satisfies Conditional Expression (7).

$$-0.3 < (R2r - RSf)/(R2r + RSf) < 1.2 \quad (7)$$

It is preferable that the subsequent group includes at least one lens group having a negative refractive power, among lens groups having negative refractive powers in the subsequent group, a Sn lens group, which is a lens group that has a strongest refractive power, moves during zooming. Assuming that a focal length of the Sn lens group is fSn, and a difference in an optical axis direction between a position of the Sn lens group in a state in which an infinite distance object is in focus at a wide angle end and a position of the Sn lens group in a state in which the infinite distance object is in focus at a telephoto end is DZSn, it is preferable that the zoom lens of the above-mentioned aspect satisfies Conditional Expression (8).

$$-15 < DZSn/fSn < -2 \quad (8)$$

Assuming that a focal length of the Sn lens group is fSn and a focal length of the second lens group is f2, it is preferable that the zoom lens of the above-mentioned aspect satisfies Conditional Expression (9).

$$-0.3 < fSn/f2 < 0 \quad (9)$$

Assuming that a focal length of the Sn lens group is fSn and a focal length of the zoom lens in a state in which the infinite distance object is in focus at the telephoto end is ft, it is preferable that the zoom lens of the above-mentioned aspect satisfies Conditional Expression (10).

$$-0.2<fSn/ft<0 \quad (10)$$

Assuming that a focal length of the Sn lens group is fSn and a focal length of the first lens group is f1, it is preferable that the zoom lens of the above-mentioned aspect satisfies Conditional Expression (11).

$$-30<f1/fSn<-3 \quad (11)$$

The imaging apparatus according to another aspect of the present disclosure includes a zoom lens according to the above-mentioned aspect of the present disclosure.

In the present specification, it should be noted that the terms "consisting of" and "consists of" mean that the lens may include not only the above-mentioned constituent elements but also lenses substantially having no refractive powers, optical elements, which are not lenses, such as a stop, a filter, and a cover glass, and mechanism parts such as a lens flange, a lens barrel, an imaging element, and a camera shaking correction mechanism.

The term "~group that has a positive refractive power" in the present specification means that the group has a positive refractive power as a whole. Similarly, the term "~group that has a negative refractive power" means that the group has a negative refractive power as a whole. The term "a lens that has a positive refractive power" and the term "a positive lens" are synonymous. The term "a lens that has a negative refractive power" and the term "negative lens" are synonymous. The terms "lens group", "focusing group", "front group", "middle group", and "rear group" in the present specification are not limited to a configuration consisting of a plurality of lenses, but may be a configuration consisting of only one lens.

A compound aspherical lens (a lens in which a spherical lens and an aspherical film formed on the spherical lens are integrally formed and function as one aspherical lens as a whole) is not regarded as cemented lenses, but the compound aspherical lens is regarded as one lens. The curvature radius, the sign of the refractive power, and the surface shape of the lens including the aspherical surface will be used in terms of the paraxial region unless otherwise specified.

The "focal length" used in a conditional expression is a paraxial focal length. The values used in Conditional Expressions are values in a case where the d line is used as a reference in a state where the infinite distance object is in focus unless otherwise specified.

The "d line", "C line", "F line", and "g line" described in the present specification are emission lines. The wavelength of the d line is 587.56 nm (nanometers) and the wavelength of the C line is 656.27 nm (nanometers), the wavelength of F line is 486.13 nm (nanometers), and the wavelength of g line is 435.84 nm (nanometers).

According to the present disclosure, it is possible to provide a zoom lens that is reduced in size and has a high magnification, and an imaging apparatus comprising the zoom lens.

BRIEF DESCRIPTION OF THE DRAWINGS

FIG. 2 is a diagram illustrating a configuration and luminous flux in each state of the zoom lens of FIG. 1.

FIG. 3 is a diagram illustrating aberrations of the zoom lens of Example 1.

FIG. 5 is a diagram illustrating aberrations of the zoom lens of Example 2.

FIG. 7 is a diagram illustrating aberrations of the zoom lens of Example 3.

FIG. 9 is a diagram illustrating a configuration and luminous flux in each state of the zoom lens of Example 4.

FIG. 10 is a diagram illustrating aberrations of the zoom lens of Example 4.

FIG. 12 is a diagram illustrating aberrations of the zoom lens of Example 5.

FIG. 14 is a diagram illustrating aberrations of the zoom lens of Example 6.

FIG. 16 is a diagram illustrating aberrations of the zoom lens of Example 7.

FIG. 18 is a diagram illustrating aberrations of the zoom lens of Example 8.

FIG. 20 is a diagram illustrating aberrations of the zoom lens of Example 9.

FIG. 22 is a diagram illustrating aberrations of the zoom lens of Example 10.

FIG. 24 is a diagram illustrating aberrations of the zoom lens of Example 11.

DESCRIPTION OF EMBODIMENTS

Hereinafter, embodiments of the present disclosure will be described with reference to the accompanying drawings.

Figure 1:
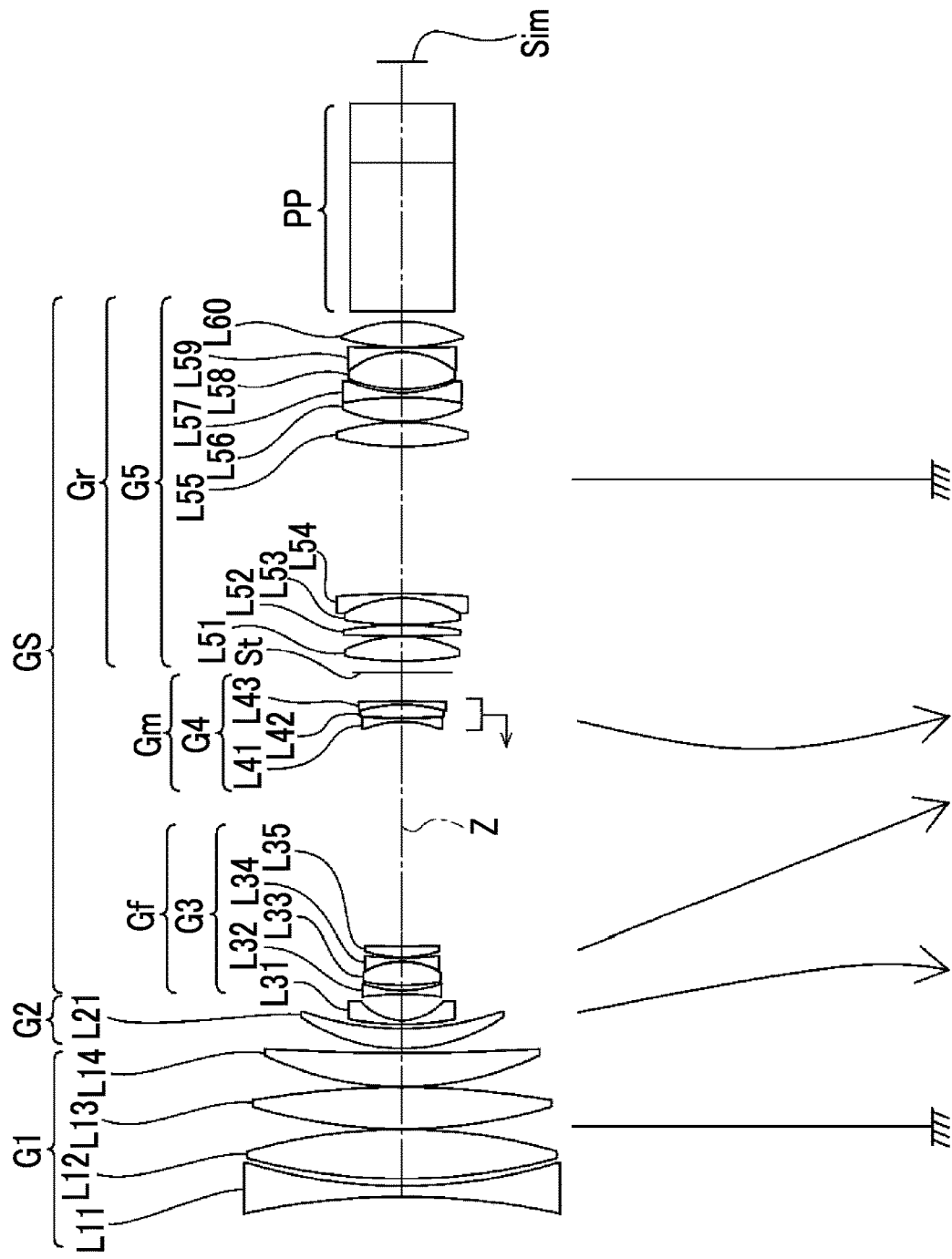
FIG. 1 is a cross-sectional view illustrating a configuration of a zoom lens according to an embodiment and a diagram illustrating movement loci thereof, the zoom lens corresponding to a zoom lens of Example 1.

FIG. 1 shows a cross-sectional view of a configuration and movement loci of a zoom lens according to an embodiment of the present disclosure at a wide angle end. Further, FIG. 2 shows a cross-sectional view and a luminous flux of the configuration of the zoom lens of FIG. 1 in each state. In FIG. 2, the upper part labeled "WIDE" shows a state in which the infinite distance object is in focus at the wide angle end, the middle part labeled "TELE" shows a state in which the infinite distance object is in focus at the telephoto end, and the lower part labeled "TELE, β=−0.1" shows a state in which the lateral magnification of the zoom lens at the telephoto end is −0.1 times. In FIG. 2, as the luminous flux, the upper part shows the on-axis luminous flux wa and the luminous flux with the maximum image height wb, the middle part shows the on-axis luminous flux to and the luminous flux with the maximum image height tb, and the lower part shows the on-axis luminous flux ta1 and the luminous flux with the maximum image height tb1. The examples shown in FIGS. 1 and 2 correspond to a zoom lens of Example 1 to be described later. In FIGS. 1 and 2, the left side is the object side and the right side is the image side. Hereinafter, the zoom lens according to the embodiment of the present disclosure will be described mainly with reference to FIG. 1.

FIG. 1 shows an example in which an optical member PP of which the incident surface and emission surface are parallel is disposed between the zoom lens and an image plane Sim under the assumption that the zoom lens is applied to an imaging apparatus. The optical member PP is a member that assumes a protective cover glass, various filters according to the use of an imaging apparatus, a prism, and the like. The various filters include, for example, a low pass filter, an infrared cut filter, and a filter that cuts a specific wavelength region. The optical member PP is a member that has no refractive power. It is also possible to configure the imaging apparatus by removing the optical member PP.

The zoom lens according to the present embodiment consists of, in order from the object side to the image side, a first lens group G1 having a positive refractive power, a second lens group G2 having a positive refractive power, and a subsequent group GS. During zooming, a spacing between the first lens group G1 and the second lens group G2 changes, and a spacing between the second lens group G2 and the subsequent group GS changes. By changing the spacing between a plurality of groups during zooming, it is easy to achieve an increase in magnification. By forming the lens group closest to the object side as the first lens group G1 having a positive refractive power, it is easy to achieve reduction in total length of the lens system. Thus, there is an advantage in achieving reduction in size. The second lens group G2 is a lens group that has a positive refractive power, and the spacing between the object side and the image side of the second lens group G2 changes during zooming. Therefore, it is possible to suppress an increase in effective diameter of the first lens group G1 on the telephoto side. As a result, it is possible to suppress an increase in outer diameter of the first lens group G1 and thus it is possible to achieve reduction in size. In particular, since portability is required for an imaging camera, a broadcast camera, and the like, it is effective to achieve reduction in size of the first lens group G1 in which the lens diameter tends to be large and heavy.

The subsequent group GS includes one or more lens groups. It should be noted that the term "lens group" in the present specification refers to a part including the at least one lens, which is a constituent part of the zoom lens and is divided by an air spacing that changes during zooming. During zooming, the lens groups move or remain stationary, and the mutual spacing between the lenses in one lens group does not change. That is, in the present specification, one lens group is a group in which the spacing between adjacent groups changes during zooming and the total spacing between adjacent lenses does not change within itself.

For example, the zoom lens of FIG. 1 consists of a first lens group G1, a second lens group G2, a third lens group G3, a fourth lens group G4, and a fifth lens group G5, in order from the object side to the image side. In the example of FIG. 1, the subsequent group GS consists of a third lens group G3, a fourth lens group G4, and a fifth lens group G5.

For example, each lens group in FIG. 1 is composed of lenses described below. The first lens group G1 consists of four lenses L11 to L14 in order from the object side to the image side. The second lens group G2 consists of one lens L21. The third lens group G3 consists of five lenses L31 to L35 in order from the object side to the image side. The fourth lens group G4 consists of three lenses L41 to L43 in order from the object side to the image side. The fifth lens group G5 consists of an aperture stop St and ten lenses L51 to L60 in order from the object side to the image side. The aperture stop St shown in FIG. 1 does not indicate the shape and size, but indicates the position in the optical axis direction.

In the example of FIG. 1, during zooming, the first lens group G1 and the fifth lens group G5 remain stationary with respect to the image plane Sim, and the second lens group G2, the third lens group G3, and the fourth lens group G4 move along the optical axis Z by changing the spacings between the adjacent lens groups. In FIG. 1, during zooming from the wide angle end to the telephoto end, the arrow under each movable lens group indicates a schematic movement locus thereof, and a ground symbol is shown under each movable lens group which remains stationary with respect to the image plane Sim.

As in the example of FIG. 1, it is preferable that the first lens group G1 remains stationary with respect to the image plane Sim and the second lens group G2 moves during zooming. Since the first lens group G1 remains stationary with respect to the image plane Sim during zooming, the total length of the lens system does not change even during zooming is performed. As a result, there is an advantage in achieving reduction in size. Further, since fluctuation in centroid of the lens system during zooming can be reduced, the convenience during imaging can be enhanced. By moving the second lens group G2 during zooming, it is easy to correct aberrations in a case where the magnification is increased.

The subsequent group GS of the zoom lens according to the present embodiment includes a focusing group that moves during focusing. The focusing group includes at least one lens and is a group that performs focusing by moving along the optical axis Z. By disposing the focusing group closer to the image side than the second lens group G2, the effective diameter of the focusing group can be reduced. As a result, there is an advantage in achieving reduction in size. In the example of FIG. 1, the focusing group consists of the fourth lens group G4. The parentheses and the arrow pointing to the left below the fourth lens group G4 in FIG. 1 indicate that the fourth lens group G4 is a focusing group that moves toward the object side during focusing from the infinite distance object to the short range object.

The subsequent group GS may be configured to consist of a front group Gf, a middle group Gm, and a rear group Gr in order from the object side to the image side. It is preferable that the subsequent group GS includes a lens group that has at least one negative refractive power and a lens group that has the strongest refractive power among the lens groups having a negative refractive power of the subsequent group GS is disposed closest to the image side in the front group Gf. In such a case, it is easy to ensure the amount of movement during zooming. As a result, there is an advantage in achieving an increase in magnification. Further, it is preferable that the focusing group is disposed closest to the image side in the middle group Gm. In such a case, since the focusing group can be disposed at a position where the luminous flux is thin, the diameter of the focusing group can be easily reduced. As a result, there is an advantage in achieving reduction in size. Then, the subsequent group GS includes the rear group Gr on the image side of the middle group Gm. Thereby, adjustment can be performed by the rear group Gr in accordance with the refractive power of the focusing group and the lens group closer to the object side than the focusing group. Therefore, a suitable configuration can be made, and particularly there is an advantage in ensuring a suitable back focal length. In order to facilitate the above-mentioned adjustment, the sign of the refractive power of the rear group Gr may be configured to be different from the sign of the refractive power of the focusing group.

For example, in the zoom lens of FIG. 1, the front group Gf consists of the third lens group G3, the middle group Gm consists of the fourth lens group G4, and the rear group Gr consists of the fifth lens group G5.

For example, the subsequent group GS may be configured to consist of a front group Gf that has a negative refractive power and that moves during zooming in order from the object side to the image side, a middle group Gm that has a negative refractive power and that moves during zooming, and a rear group Gr that has a positive refractive power and that remains stationary with respect to the image plane Sim during zooming. In such a configuration, the focusing group may be configured to consist of the middle group Gm. In such a case, zooming is performed by the front group Gf that has a negative refractive power and that is located on the object side in the subsequent group GS, and both correction of the focal position and focusing can be performed by the middle group Gm that has a negative refractive power and that is located closer to the image side than the front group Gf. By adopting such a configuration, there is an advantage in achieving an increase in magnification. Further, by disposing the focusing group at a position where the luminous flux becomes small, the diameter of the focusing group can be reduced. As a result, there is an advantage in achieving reduction in size. Further, by forming the rear group Gr as a group that has a positive refractive power, it is possible to suppress an increase in angle at which the principal ray of the off-axis ray is incident on the image plane Sim. As a result, there is an advantage in suppressing shading.

Next, preferable and possible configurations about the conditional expressions of the zoom lens of the present disclosure will be described. In the following description of preferable and possible configurations, the "zoom lens of the present disclosure" is also simply referred to as a "zoom lens" in order to avoid redundancy.

Assuming that a focal length of the first lens group G1 is f1, and a maximum image height is Ymax, it is preferable that the zoom lens satisfies Conditional Expression (1). By not allowing the corresponding value of Conditional Expression (1) to be equal to or less than the lower limit, the refractive power of the first lens group G1 is prevented from becoming excessively weak. As a result, there is an advantage in achieving reduction in size. By not allowing the corresponding value of Conditional Expression (1) to be equal to or greater than the upper limit, the refractive power of the first lens group G1 is prevented from becoming excessively strong, and it is easy to correct spherical aberration on the telephoto side. As a result, there is an advantage in achieving an increase in magnification. In order to obtain more favorable characteristics, it is more preferable that the zoom lens satisfies Conditional Expression (1-1), and it is yet more preferable that the zoom lens satisfies Conditional Expression (1-2).

$$0 < Y\text{max}/f1 < 2 \tag{1}$$

$$0 < Y\text{max}/f1 < 1 \tag{1-1}$$

$$0 < Y\text{max}/f1 < 0.07 \tag{1-2}$$

Assuming that a focal length of the first lens group G1 is f1, and a focal length of the second lens group G2 is f2, it is preferable that the zoom lens satisfies Conditional Expression (2). By not allowing the corresponding value of Conditional Expression (2) to be equal to or less than the lower limit, the refractive power of the second lens group G2 is prevented from becoming excessively weak. Therefore, it is easy to achieve reduction in size of the first lens group G1. Alternatively, by not allowing the corresponding value of Conditional Expression (2) to be equal to or less than the lower limit, the refractive power of the first lens group G1 is prevented from becoming excessively strong, and it is easy to correct spherical aberration on the telephoto side. As a result, there is an advantage in achieving an increase in magnification. By not allowing the corresponding value of Conditional Expression (2) to be equal to or greater than the upper limit, the refractive power of the second lens group G2 is prevented from becoming excessively strong. Therefore, it is easy to correct spherical aberration and field curvature during zooming. As a result, there is an advantage in achieving an increase in magnification. Alternatively, by not allowing the corresponding value of Conditional Expression (2) to be equal to or greater than the upper limit, the refractive power of the first lens group G1 is prevented from becoming excessively weak. As a result, there is an advantage in achieving reduction in size. In order to obtain more favorable characteristics, it is more preferable that the zoom lens satisfies Conditional Expression (2-1), and it is yet more preferable that the zoom lens satisfies Conditional Expression (2-2).

$$0 < f1/f2 < 4 \tag{2}$$

$$0 < f1/f2 < 3 \tag{2-1}$$

$$0 < f1/f2 < 2.1 \tag{2-2}$$

Assuming that a focal length of the zoom lens in a state where an infinite distance object is in focus at a telephoto end is ft, and a focal length of the second lens group G2 is f2, it is preferable that the zoom lens satisfies Conditional Expression (3). By not allowing the corresponding value of Conditional Expression (3) to be equal to or less than the lower limit, the refractive power of the second lens group G2 is prevented from becoming excessively weak. Therefore, it is easy to achieve reduction in size of the first lens group G1. By not allowing the corresponding value of Conditional Expression (3) to be equal to or greater than the upper limit, the refractive power of the second lens group G2 is prevented from becoming excessively strong. Therefore, it is easy to correct spherical aberration and field curvature during zooming. As a result, there is an advantage in achieving an increase in magnification. In order to obtain more favorable characteristics, it is more preferable that the zoom lens satisfies Conditional Expression (3-1), and it is yet more preferable that the zoom lens satisfies Conditional Expression (3-2).

$$0 < ft/f2 < 4 \tag{3}$$

$$0 < ft/f2 < 3 \tag{3-1}$$

$$0 < ft/f2 < 2 \tag{3-2}$$

Assuming that a focal length of the zoom lens in a state where an infinite distance object is in focus at a telephoto end is ft, and a focal length of the focusing group is fF, it is preferable that the zoom lens satisfies Conditional Expression (4). By not allowing the corresponding value of Conditional Expression (4) to be equal to or less than the lower limit, the refractive power of the focusing group is prevented from becoming excessively weak. Therefore, it is possible to suppress an increase in amount of movement of the focusing group especially in a case where the object distance changes at the telephoto end. As a result, there is an advantage in achieving reduction in size. By not allowing the corresponding value of Conditional Expression (4) to be equal to or greater than the upper limit, the refractive power of the focusing group is prevented from becoming excessively strong. Therefore, it is possible to suppress fluctuation in spherical aberration and field curvature occur especially in a case where the object distance changes at the telephoto end. As a result, there is an advantage in achieving an increase in magnification. The term "object distance" in the present specification is a distance on the optical axis between the zoom lens and the object that is a subject of the zoom lens. In order to obtain more favorable characteristics, it is more preferable that the zoom lens satisfies Conditional Expression (4-1), and it is yet more preferable that the zoom lens satisfies Conditional Expression (4-2).

$$1<|ft/fF|<15 \quad (4)$$

$$2<|ft/fF|<12 \quad (4\text{-}1)$$

$$3<|ft/fF|<9 \quad (4\text{-}2)$$

Assuming that a difference in an optical axis direction between a position of the focusing group in a state in which an infinite distance object is in focus at a telephoto end and a position of the focusing group in a state in which a lateral magnification of the zoom lens at the telephoto end is −0.1 times is DZF, and a focal length of the focusing group is fF, it is preferable that the zoom lens satisfies Conditional Expression (5). By not allowing the corresponding value of Conditional Expression (5) to be equal to or less than the lower limit, the refractive power of the focusing group is prevented from becoming excessively weak. Therefore, it is possible to suppress an increase in amount of movement of the focusing group especially in a case where the object distance changes at the telephoto end. As a result, there is an advantage in achieving reduction in size. By not allowing the corresponding value of Conditional Expression (5) to be equal to or greater than the upper limit, the refractive power of the focusing group is prevented from becoming excessively strong. Therefore, it is possible to suppress fluctuation in spherical aberration and field curvature occur especially in a case where the object distance changes at the telephoto end. As a result, there is an advantage in achieving an increase in magnification. Alternatively, by not allowing the corresponding value of Conditional Expression (5) to be equal to or greater than the upper limit, it is possible to suppress the amount of movement of the focusing group in a case where the object distance changes at the telephoto end. As a result, there is an advantage in achieving reduction in size. In order to obtain more favorable characteristics, it is more preferable that the zoom lens satisfies Conditional Expression (5-1), and it is yet more preferable that the zoom lens satisfies Conditional Expression (5-2).

$$0.1<|DZF/fF|<1 \quad (5)$$

$$0.12<|DZF/fF|<0.8 \quad (5\text{-}1)$$

$$0.15<|DZF/fF|<0.5 \quad (5\text{-}2)$$

Assuming that a curvature radius of a lens surface closest to the image side in the first lens group G1 is R1r, and a curvature radius of a lens surface closest to the object side in the second lens group G2 is R2f, it is preferable that the zoom lens satisfies Conditional Expression (6). By allowing the corresponding value of Conditional Expression (6) to be equal to or greater than the lower limit, the curvature radius of the lens surface closest to the object side in the second lens group G2 can be prevented from becoming excessively large, or the curvature radius of the lens surface closest to the image side in the first lens group G1 can be prevented from becoming excessively small. As a result, it is possible to prevent the refractive power of the air lens formed between the lens surface closest to the image side in the first lens group G1 and the lens closest to the object side surface of the second lens group G2 from becoming stronger in the negative direction. Therefore, it is possible to suppress the increase in size of the first lens group G1. By not allowing the corresponding value of Conditional Expression (6) to be equal to or greater than the upper limit, the refractive power of the air lens formed between the lens surface closest to the image side in the first lens group G1 and the lens surface closest to the object side in the second lens group G2 is prevented from becoming excessively strong in the positive direction. Therefore, it is easy to correct spherical aberration particularly on the telephoto side. As a result, there is an advantage in achieving an increase in magnification. In order to obtain more favorable characteristics, it is more preferable that the zoom lens satisfies Conditional Expression (6-1), and it is yet more preferable that the zoom lens satisfies Conditional Expression (6-2).

$$0 \leq (R1r-R2f)/(R1r+R2f)<2 \quad (6)$$

$$0 \leq (R1r-R2f)/(R1r+R2f)<1.5 \quad (6\text{-}1)$$

$$0.1<(R1r-R2f)/(R1r+R2f)<1 \quad (6\text{-}2)$$

Assuming that a curvature radius of a lens surface closest to the image side in the second lens group G2 is R2r, and a curvature radius of a lens surface closest to the object side in the subsequent group GS is RSf, it is preferable that the zoom lens satisfies Conditional Expression (7). By not allowing the corresponding value of Conditional Expression (7) to be equal to or less than the lower limit, the curvature radius of the lens surface closest to the image side in the second lens group G2 is prevented from becoming excessively small. Therefore, it is possible to suppress insufficiency in correction of spherical aberration on the telephoto side. As a result, there is an advantage in achieving an increase in magnification. Alternatively, by not allowing the corresponding value of Conditional Expression (7) to be equal to or less than the lower limit, the curvature radius of the lens surface closest to the object side in the subsequent group GS is prevented from becoming excessively large. Therefore, it is possible to suppress overcorrection in spherical aberration on the telephoto side. As a result, there is an advantage in achieving an increase in magnification. By not allowing the corresponding value of Conditional Expression (7) to be equal to or greater than the upper limit, the refractive power of the air lens formed between the lens surface closest to the image side in the second lens group G2 and the lens surface closest to the object side in the subsequent group GS is prevented from becoming excessively strong in the positive direction. Therefore, it is easy to correct spherical aberration particularly on the telephoto side. As a result, there is an advantage in achieving an increase in magnification. In order to obtain more favorable characteristics, it is more preferable that the zoom lens satisfies Conditional Expression (7-1), and it is yet more preferable that the zoom lens satisfies Conditional Expression (7-2).

$$-0.3 < (R2r-RSf)/(R2r+RSf) < 1.2 \quad (7)$$

$$-0.24 < (R2r-RSf)/(R2r+RSf) < 0.9 \quad (7-1)$$

$$-0.15 < (R2r-RSf)/(R2r+RSf) < 0.6 \quad (7-2)$$

It is preferable that the subsequent group GS includes a lens group that has at least one negative refractive power. In a case where the subsequent group GS includes a lens group that has at least one negative refractive power, the lens group that has the strongest refractive power among the lens groups having a negative refractive power of the subsequent group GS is referred to as an Sn lens group. It is preferable that the Sn lens group moves during zooming. Assuming that a focal length of the Sn lens group is fSn, and a difference in an optical axis direction between a position of the Sn lens group in a state in which an infinite distance object is in focus at the wide angle end and a position of the Sn lens group in a state in which the infinite distance object is in focus at a telephoto end is DZSn, it is preferable that the zoom lens satisfies Conditional Expression (8). By not allowing the corresponding value of Conditional Expression (8) to be equal to or less than the lower limit, it is possible to suppress an increase in amount of movement of the Sn lens group during zooming. As a result, there is an advantage in achieving reduction in size. Alternatively, by not allowing the corresponding value of Conditional Expression (8) to be equal to or less than the lower limit, the refractive power of the Sn lens group is prevented from becoming excessively strong. Therefore, it is possible to suppress spherical aberration and field curvature during zooming. As a result, there is an advantage in achieving an increase in magnification. By not allowing the corresponding value of Conditional Expression (8) to be equal to or greater than the upper limit, the refractive power of the Sn lens group is prevented from becoming excessively weak. As a result, there is an advantage in achieving reduction in size. In order to obtain more favorable characteristics, it is more preferable that the zoom lens satisfies Conditional Expression (8-1), and it is yet more preferable that the zoom lens satisfies Conditional Expression (8-2).

$$-15 < DZSn/fSn < -2 \quad (8)$$

$$-11 < DZSn/fSn < -2.5 \quad (8-1)$$

$$-7 < DZSn/fSn < -3 \quad (8-2)$$

Assuming that a focal length of the Sn lens group is fSn and a focal length of the second lens group G2 is f2, it is preferable that the zoom lens satisfies Conditional Expression (9). By not allowing the corresponding value of Conditional Expression (9) to be equal to or less than the lower limit, the refractive power of the second lens group G2 is prevented from becoming excessively strong. Therefore, it is possible to suppress spherical aberration and field curvature during zooming. As a result, there is an advantage in achieving an increase in magnification. Alternatively, by not allowing the corresponding value of Conditional Expression (9) to be equal to or less than the lower limit, the refractive power of the Sn lens group is prevented from becoming excessively weak. Therefore, it is possible to suppress an increase in amount of movement of the Sn lens group during zooming. As a result, there is an advantage in achieving reduction in size. Regarding the upper limit of Conditional Expression (9), since the Sn lens group has a negative refractive power, fSn<0, and since the second lens group G2 has a positive refractive power, f2>0. As a result, fSn/f2<0. In order to obtain more favorable characteristics, it is more preferable that the zoom lens satisfies Conditional Expression (9-1), and it is yet more preferable that the zoom lens satisfies Conditional Expression (9-2).

$$-0.3 < fSn/f2 < 0 \quad (9)$$

$$-0.2 < fSn/f2 < 0 \quad (9-1)$$

$$-0.15 < fSn/f2 < 0 \quad (9-2)$$

Assuming that a focal length of the Sn lens group is fSn and a focal length of the zoom lens in a state in which the infinite distance object is in focus at the telephoto end is ft, it is preferable that the zoom lens satisfies Conditional Expression (10). By not allowing the corresponding value of Conditional Expression (10) to be equal to or less than the lower limit, the refractive power of the Sn lens group is prevented from becoming excessively weak. Therefore, it is possible to suppress an increase in amount of movement of the Sn lens group during zooming. As a result, there is an advantage in achieving reduction in size. Regarding the upper limit of Conditional Expression (10), since the Sn lens group has a negative refractive power, fSn<0, and since the zoom lens has a positive refractive power, ft>0. As a result, fSn/ft<0. In order to obtain more favorable characteristics, it is more preferable that the zoom lens satisfies Conditional Expression (10-1), and it is yet more preferable that the zoom lens satisfies Conditional Expression (10-2). By not allowing the corresponding value of Conditional Expression (10-2) to be equal to or greater than the upper limit, the refractive power of the Sn lens group is prevented from becoming excessively strong. Therefore, it is possible to suppress spherical aberration and field curvature during zooming. As a result, there is an advantage in achieving an increase in magnification.

$$-0.2 < fSn/ft < 0 \quad (10)$$

$$-0.15 < fSn/ft < 0 \quad (10-1)$$

$$-0.11 < fSn/ft < -0.02 \quad (10-2)$$

Assuming that a focal length of the first lens group G1 is f1 and a focal length of the Sn lens group is fSn, it is preferable that the zoom lens satisfies Conditional Expression (11). By not allowing the corresponding value of Conditional Expression (11) to be equal to or less than the lower limit, the refractive power of the first lens group G1 is prevented from becoming excessively weak. Therefore, it is possible to suppress an increase in size. Alternatively, by not allowing the corresponding value of Conditional Expression (11) to be equal to or less than the lower limit, the refractive power of the Sn lens group is prevented from becoming excessively strong. Therefore, it is possible to suppress spherical aberration and field curvature during zooming. As a result, there is an advantage in achieving an increase in magnification. By not allowing the corresponding value of Conditional Expression (11) to be equal to or greater than the upper limit, the refractive power of the first lens group G1 is prevented from becoming excessively strong. Therefore, it is easy to correct spherical aberration and the field curvature on the telephoto side. As a result, there is an advantage in achieving an increase in magnification. Alternatively, by not allowing the corresponding value of Conditional Expression (11) to be equal to or greater than the upper limit, the refractive power of the Sn lens group is prevented from becoming excessively weak. Therefore, it is possible to suppress an increase in amount of movement of the Sn lens group during zooming. As a result, there is an advantage in achieving reduction in size. In order to obtain more favorable characteristics, it is more preferable that the zoom lens satisfies Conditional Expression (11-1), and it is yet more preferable that the zoom lens satisfies Conditional Expression (11-2).

$$-30 < f1/fSn < -3 \tag{11}$$

$$-25 < f1/fSn < -4 \tag{11-1}$$

$$-15 < f1/fSn < -6 \tag{11-2}$$

The example shown in FIG. 1 is an example, and various modifications can be made without departing from the scope of the technology of the present disclosure. For example, the number of lenses included in each lens group may be different from the number shown in FIG. 1. Further, in the example of FIG. 1, the subsequent group GS consists of three lens groups, but the number of lens groups included in the subsequent group GS can be arbitrarily set. For example, the subsequent group GS may be configured to consist of four lens groups.

The subsequent group GS may be configured to consist of a front group Gf that has a negative refractive power and that moves during zooming in order from the object side to the image side, a middle group Gm, and a rear group Gr that has a negative refractive power remaining stationary with respect to the image plane Sim during zooming. Then, the middle group Gm may be configured to consist of, in order from the object side to the image side, a first middle group that has a positive refractive power and that remains stationary with respect to the image plane Sim during zooming, and a second middle group that has a positive refractive power and that moves during zooming. In such a configuration, the focusing group may be configured to consist of the second middle group. In such a case, zooming is performed by the front group Gf that has a negative refractive power and that is located on the object side in the subsequent group GS, and both correction of the focal position and focusing can be performed by the second middle group that has a positive refractive power and that is located closer to the image side than the front group Gf. By adopting such a configuration, there is an advantage in achieving an increase in magnification. Further, by disposing the focusing group at a position where the luminous flux becomes small, the diameter of the focusing group can be reduced. As a result, there is an advantage in achieving reduction in size. Furthermore, by forming the rear group Gr as a group that has a negative refractive power, the positive refractive power contained in the middle group Gm can be strengthened. Therefore, it is possible to suppress an increase in amount of movement of the focusing group in a case where the object distance changes. As a result, there is an advantage in achieving reduction in size.

The subsequent group GS may include a lens group that remains stationary with respect to the image plane Sim during zooming. In such a case, there is an advantage in simplifying the moving mechanism, and thus such a configuration is able to contribute to reduction in size of the apparatus. Alternatively, all the lens groups included in the subsequent group GS may be configured to move during zooming. In such a case, there is an advantage in achieving both an increase in magnification and favorable performance.

The above-mentioned preferred configurations and available configurations may be optional combinations, and it is preferable to selectively adopt the configurations in accordance with required specification. It should be noted that the conditional expressions that the zoom lens of the present disclosure preferably satisfies are not limited to the conditional expressions described in the form of the expression, and the lower limit and the upper limit are selected from the preferable and more preferable, more preferable, and yet more preferable conditional expressions. The conditional expressions may include all conditional expressions obtained through optional combinations.

Next, examples of the zoom lens of the present disclosure will be described, with reference to the drawings. The reference numerals attached to the lenses in the cross-sectional views of each example are used independently for each example in order to avoid complication of description and drawings due to an increase in number of digits of the reference numerals. Therefore, even in a case where common reference numerals are attached in the drawings of different examples, components do not necessarily have a common configuration.

Example 1

FIG. 1 shows a configuration and movement loci of a zoom lens of Example 1, and an illustration method and a configuration thereof are as described above. Therefore, some description is not repeated herein. The zoom lens of Example 1 consists of, in order from the object side to the image side, a first lens group G1 having a positive refractive power, a second lens group G2 having a positive refractive power, a third lens group G3 having a negative refractive power, a fourth lens group G4 having a negative refractive power, and a fifth lens group G5 having a positive refractive power. During zooming, the first lens group G1 and the fifth lens group G5 remain stationary with respect to the image plane Sim, and the second lens group G2, the third lens group G3, and the fourth lens group G4 move along the optical axis Z by changing the spacings between the adjacent lens groups. The subsequent group GS consists of a front group Gf, a middle group Gm, and a rear group Gr in order from the object side to the image side. The front group Gf consists of a third lens group G3. The middle group Gm consists of a fourth lens group G4. The rear group Gr consists of a fifth lens group G5. The focusing group consists of a fourth lens group G4.

Regarding the zoom lens 1 of Example 1, Tables 1A and 1B show basic lens data, Table 2 shows specifications and variable surface spacings, and Table 3 shows aspherical coefficients thereof. The table of basic lens data is divided into two tables including Table 1A and Table 1B in order to avoid lengthening of one table. Table 1A shows groups from the first lens group G1 to the fourth lens group G4, and Table 1B shows the fifth lens group G5 and the optical member PP.

The table of basic lens data will be described as follows. The column of Sn shows surface numbers in a case where the surface closest to the object side is the first surface and the number is increased one by one toward the image side. The column of R shows a curvature radius of each surface. The column of D shows a surface spacing between each surface and the surface adjacent to the image side on the optical axis. The column of Nd shows a refractive index of each constituent element at the d line. The column of vd shows an Abbe number of each constituent element based on the d line. The column of θgF shows a partial dispersion ratio of each constituent element between the g line and the F line. It should be noted that the partial dispersion ratio θgF of a certain constituent element between the g line and the F line is defined by θgF=(Ng−NF)/(NF−NC), where Ng, NF, and NC are the refractive indexes of the constituent element at the g line, the F line, and the C line.

In the table of basic lens data, the sign of the curvature radius of the convex surface facing toward the object side is positive and the sign of the curvature radius of the convex surface facing toward the image side is negative. In a cell of a surface number of a surface corresponding to the aperture stop St, the surface number and a term of (St) are noted. The table of basic lens data also shows the optical member PP. A value at the bottom cell of the column of D in the table indicates a spacing between the image plane Sim and the surface closest to the image side in the table. The symbol DD[ ] is used for each variable surface spacing during zooming, and the object side surface number of the spacing is given in [ ] and is noted in the column of D.

Table 2 shows the zoom magnification Zr, the focal length f, the back focal length Bf at the air conversion distance, the open F number FNo., the maximum total angle of view 2ω, the maximum image height Ymax, and the variable surface spacing, based on the d line. (°) in the cell of 2ω indicates that the unit thereof is a degree. In Table 2, the column labeled "WIDE" shows values in a state in which the infinite distance object is in focus at the wide angle end, the column labeled "TELE" shows values in a state in which the infinite distance object is in focus at the telephoto end, and the column labeled "TELE, β=−0.1" shows values in a state in which the lateral magnification of the zoom lens at the telephoto end is −0.1 times.

In basic lens data, a reference sign * is attached to surface numbers of aspherical surfaces, and numerical values of the paraxial curvature radius are written into the column of the curvature radius of the aspherical surface. In Table 3, the row of Sn shows surface numbers of the aspherical surfaces, and the rows of KA and Am show numerical values of the aspherical coefficients for each aspherical surface. It should be noted that m of Am is an integer of 3 or more, and differs depending on the surface. For example, on the eleventh surface, m=4, 6, 8, . . . , 20. The "E±n" (n: an integer) in numerical values of the aspherical coefficients of Table 3 indicates "×10$^{±n}$". KA and Am are the aspherical coefficients in the aspherical surface expression represented by the following expression.

$$Zd = C \times h^2 / \{1 + (1 - KA \times C^2 \times h^2)^{1/2}\} + \Sigma Am \times h^m$$

Here,

Zd is an aspherical surface depth (a length of a perpendicular from a point on an aspherical surface at height h to a plane that is perpendicular to the optical axis Z and that is in contact with the vertex of the aspherical surface), h is a height (a distance from the optical axis Z to the lens surface), C is a reciprocal of the paraxial curvature radius, KA and Am are aspherical coefficients, and Σ in the aspherical expression means the sum with respect to m.

In the data of each table, degrees are used as a unit of an angle, and millimeters (mm) are used as a unit of a length, but appropriate different units may be used since the optical system can be used even in a case where the system is enlarged or reduced in proportion. Further, each of the following tables shows numerical values rounded off to predetermined decimal places.

TABLE 1A

Example 1

| Sn | R | D | Nd | νd | θgF |
|---|---|---|---|---|---|
| 1 | −172.92410 | 2.400 | 1.85883 | 30.00 | 0.59793 |
| 2 | 122.02895 | 1.652 | | | |
| 3 | 138.45371 | 11.000 | 1.43875 | 94.66 | 0.53402 |
| 4 | −129.75793 | 0.120 | | | |
| 5 | 121.78967 | 9.203 | 1.53775 | 74.70 | 0.53936 |
| 6 | −201.33560 | 0.120 | | | |
| 7 | 74.23504 | 7.475 | 1.65160 | 58.62 | 0.54102 |
| 8 | 556.62975 | DD[8] | | | |
| 9 | 41.48871 | 4.407 | 1.69560 | 59.05 | 0.54348 |
| 10 | 70.05803 | DD[10] | | | |
| *11 | 70.60233 | 0.800 | 1.85135 | 40.10 | 0.56954 |
| *12 | 12.57358 | 5.890 | | | |
| 13 | −58.41444 | 0.800 | 1.96291 | 31.71 | 0.59193 |
| 14 | 28.96162 | 1.133 | | | |
| 15 | 50.24192 | 5.110 | 1.89286 | 20.36 | 0.63944 |
| 16 | −18.13436 | 0.185 | | | |
| 17 | −17.59795 | 0.800 | 1.95090 | 32.91 | 0.58853 |
| 18 | 86.13885 | 0.120 | | | |
| 19 | 28.40152 | 2.386 | 1.66382 | 27.35 | 0.63195 |
| 20 | 309.94416 | DD[20] | | | |
| 21 | −24.46138 | 0.800 | 1.91209 | 36.79 | 0.57853 |
| 22 | 337.23958 | 0.120 | | | |
| 23 | 160.49981 | 2.862 | 1.90941 | 19.53 | 0.64519 |
| 24 | −35.48193 | 0.750 | 1.91000 | 37.00 | 0.57799 |
| 25 | −414.96005 | DD[25] | | | |

TABLE 1B

Example 1

| Sn | R | D | Nd | νd | θgF |
|---|---|---|---|---|---|
| 26(St) | ∞ | 2.500 | | | |
| 27 | 79.11853 | 5.566 | 1.51835 | 51.56 | 0.55819 |
| 28 | −30.36487 | 0.120 | | | |
| 29 | 463.33013 | 2.405 | 1.80554 | 24.72 | 0.61807 |
| 30 | −83.87935 | 0.120 | | | |
| 31 | 91.29500 | 5.879 | 1.44646 | 65.04 | 0.52832 |
| 32 | −27.22365 | 1.000 | 1.94730 | 24.45 | 0.62026 |
| 33 | −170.47879 | 32.500 | | | |
| 34 | 62.11451 | 5.511 | 1.61476 | 36.52 | 0.58738 |
| 35 | −50.65288 | 0.120 | | | |
| 36 | 36.33805 | 5.369 | 1.45885 | 62.72 | 0.53458 |
| 37 | −71.59221 | 1.000 | 1.84215 | 43.78 | 0.56258 |
| 38 | 28.90888 | 0.786 | | | |
| 39 | 31.88012 | 8.346 | 1.44147 | 73.81 | 0.52503 |
| 40 | −20.08801 | 1.000 | 1.84670 | 38.48 | 0.57561 |
| 41 | 513.70582 | 0.120 | | | |
| 42 | 51.95173 | 5.671 | 1.45615 | 86.75 | 0.53283 |
| 43 | −31.46162 | 2.000 | | | |
| 44 | ∞ | 33.000 | 1.60859 | 46.44 | 0.56664 |
| 45 | ∞ | 13.200 | 1.51633 | 64.05 | 0.53463 |
| 46 | ∞ | 9.325 | | | |

TABLE 2

Example 1

| | WIDE | TELE | TELE, β = −0.1 |
|---|---|---|---|
| Zr | 1.00 | 19.25 | 19.25 |
| f | 8.285 | 159.481 | 132.910 |
| Bf | 40.543 | 40.543 | 40.543 |
| FNo. | 2.37 | 3.11 | 2.37 |
| 2ω(°) | 69.8 | 4.0 | 4.6 |
| Ymax | 5.5 | 5.5 | 5.5 |
| DD[8] | 1.000 | 8.431 | 8.431 |
| DD[10] | 1.000 | 33.583 | 33.583 |
| DD[20] | 49.688 | 13.804 | 7.629 |
| DD[25] | 6.458 | 2.328 | 8.503 |

TABLE 3

| | Example 1 | |
|---|---|---|
| Sn | 11 | 12 |
| KA | 1.0000000E+00 | 1.0000000E+00 |
| A4 | −7.4770014E−06 | −1.0881833E−05 |
| A6 | 1.3916451E−07 | 4.4030420E−08 |
| A8 | −1.2452521E−09 | −3.4660688E−10 |
| A10 | 1.2047535E−11 | 5.9460067E−11 |
| A12 | −1.1450698E−13 | −1.2658338E−12 |
| A14 | 7.6292196E−16 | 1.5964545E−14 |
| A16 | −3.2476989E−18 | −1.2172308E−16 |
| A18 | 7.8942041E−21 | 5.1674267E−19 |
| A20 | −8.3139748E−24 | −9.3759288E−22 |

FIG. 3 shows a diagram of aberrations of the zoom lens of Example 1. FIG. 3 shows spherical aberration, astigmatism, distortion, and lateral chromatic aberration, in order from the left side. In FIG. 3, the upper part labeled "WIDE" shows aberrations in a state in which the infinite distance object is in focus at the wide angle end, the middle part labeled "TELE" shows aberrations in a state in which the infinite distance object is in focus at the telephoto end, and the lower part labeled "TELE, β=−0.1" shows aberrations in a state in which the lateral magnification of the zoom lens at the telephoto end is −0.1 times. The object distance in a state where the lateral magnification of the zoom lens is −0.1 times is 0.766 m (meters). In the spherical aberration diagram, aberrations at the d line, the C line, and the F line are indicated by the solid line, the long broken line, and the short broken line, respectively. In the astigmatism diagram, aberration in the sagittal direction at the d line is indicated by the solid line, and aberration in the tangential direction at the d line is indicated by the short broken line. In the distortion diagram, aberration at the d line is indicated by the solid line. In the lateral chromatic aberration diagram, aberrations at the C line, and the F line are respectively indicated by the long broken line, and the short broken line. In the spherical aberration diagram, the value of the open F number is shown after FNo.=. In other aberration diagrams, the value of the maximum half angle of view is shown after ω=.

Symbols, meanings, description methods, and illustration methods of the respective data pieces according to Example 1 are the same as those in the following examples unless otherwise specified. Therefore, in the following description, repeated description will be omitted.

Example 2

Figure 4:
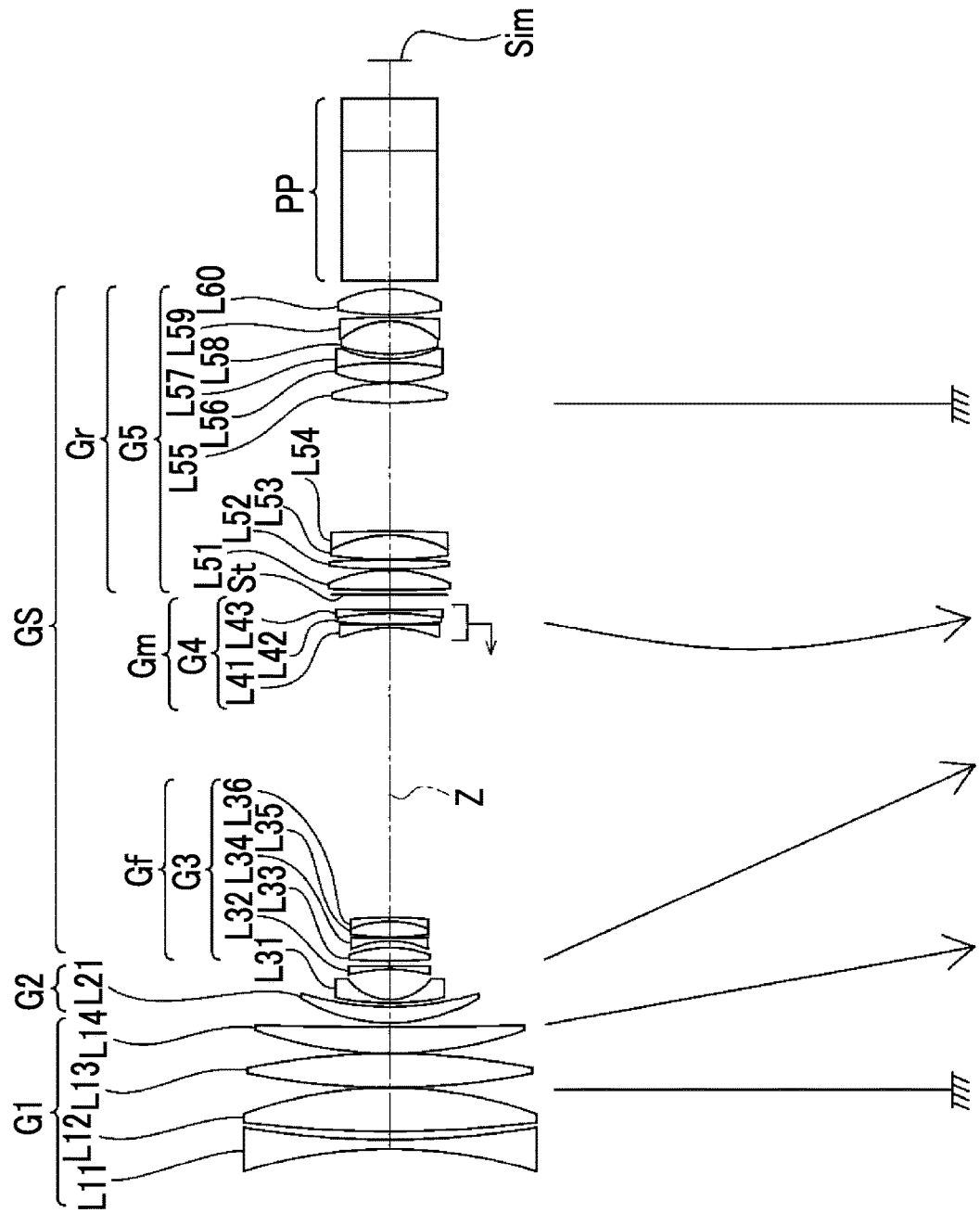
FIG. 4 is a cross-sectional view of a configuration of a zoom lens of Example 2 and a diagram illustrating movement loci thereof.

FIG. 4 shows a configuration and movement loci of the zoom lens of Example 2. The zoom lens of Example 2 consists of, in order from the object side to the image side, a first lens group G1 having a positive refractive power, a second lens group G2 having a positive refractive power, a third lens group G3 having a negative refractive power, a fourth lens group G4 having a negative refractive power, and a fifth lens group G5 having a positive refractive power. During zooming, the first lens group G1 and the fifth lens group G5 remain stationary with respect to the image plane Sim, and the second lens group G2, the third lens group G3, and the fourth lens group G4 move along the optical axis Z by changing the spacings between the adjacent lens groups. The subsequent group GS consists of a front group Gf, a middle group Gm, and a rear group Gr in order from the object side to the image side. The front group Gf consists of a third lens group G3. The middle group Gm consists of a fourth lens group G4. The rear group Gr consists of a fifth lens group G5. The focusing group consists of a fourth lens group G4.

The first lens group G1 consists of four lenses L11 to L14 in order from the object side to the image side. The second lens group G2 consists of one lens L21. The third lens group G3 consists of six lenses L31 to L36 in order from the object side to the image side. The fourth lens group G4 consists of three lenses L41 to L43 in order from the object side to the image side. The fifth lens group G5 consists of an aperture stop St and ten lenses L51 to L60 in order from the object side to the image side.

Regarding the zoom lens of Example 2, Table 4A and 4B show basic lens data, Table 5 shows specifications and variable surface spacings, and Table 6 shows aspherical coefficients thereof. FIG. 5 shows aberration diagrams. The object distance in a state where the lateral magnification of the zoom lens is −0.1 times is 0.718 m (meters).

TABLE 4A

| | Example 2 | | | | |
|---|---|---|---|---|---|
| Sn | R | D | Nd | υd | θgF |
| 1 | −128.31602 | 2.400 | 1.85883 | 30.00 | 0.59793 |
| 2 | 236.60838 | 2.110 | | | |
| 3 | 327.17274 | 11.000 | 1.43875 | 94.66 | 0.53402 |
| 4 | −111.95299 | 0.120 | | | |
| 5 | 195.47448 | 8.534 | 1.54089 | 73.71 | 0.53922 |
| 6 | −192.07116 | 0.120 | | | |
| 7 | 108.13890 | 6.669 | 1.73010 | 54.99 | 0.54410 |
| 8 | 1397.67789 | DD[8] | | | |
| 9 | 45.83634 | 4.086 | 1.75916 | 52.08 | 0.54810 |
| 10 | 79.70203 | DD[10] | | | |
| *11 | 91.99114 | 0.800 | 1.85135 | 40.10 | 0.56954 |
| *12 | 13.71976 | 7.646 | | | |
| 13 | −44.24084 | 0.800 | 1.96799 | 23.11 | 0.62810 |
| 14 | 15770.83307 | 1.392 | | | |
| 15 | 188.32079 | 3.274 | 1.88403 | 20.80 | 0.63730 |
| 16 | −33.57764 | 1.804 | | | |
| 17 | −23.72897 | 0.800 | 2.00550 | 27.45 | 0.60702 |
| 18 | 1735.89484 | 0.120 | | | |
| 19 | 74.53003 | 4.019 | 1.90465 | 19.78 | 0.63225 |
| 20 | −27.33234 | 1.000 | 1.95796 | 32.18 | 0.59048 |
| 21 | −103.44478 | DD[21] | | | |
| 22 | −34.19518 | 0.800 | 1.90595 | 37.41 | 0.57695 |
| 23 | 395.66083 | 0.189 | | | |
| 24 | 162.59630 | 2.852 | 1.95479 | 17.26 | 0.66103 |
| 25 | −82.92104 | 0.844 | 1.91000 | 37.00 | 0.57799 |
| 26 | 1308.44405 | DD[26] | | | |

TABLE 4B

| | Example 2 | | | | |
|---|---|---|---|---|---|
| Sn | R | D | Nd | υd | θgF |
| 27(St) | ∞ | 1.165 | | | |
| 28 | 365.80272 | 5.105 | 1.80278 | 27.94 | 0.60798 |
| 29 | −38.64698 | 0.120 | | | |
| 30 | 136.45865 | 2.458 | 1.84624 | 43.38 | 0.56333 |
| 31 | −280.02788 | 0.120 | | | |
| 32 | 126.35739 | 6.103 | 1.44462 | 80.68 | 0.52786 |
| 33 | −33.17580 | 1.000 | 1.93841 | 20.94 | 0.63892 |
| 34 | −273.06428 | 32.500 | | | |
| 35 | 100.06499 | 4.985 | 1.61384 | 39.30 | 0.57981 |
| 36 | −46.89702 | 0.129 | | | |
| 37 | 43.28866 | 5.149 | 1.52418 | 69.23 | 0.53501 |
| 38 | −72.91894 | 1.000 | 1.81981 | 45.70 | 0.55919 |
| 39 | 31.73582 | 1.242 | | | |
| 40 | 42.17461 | 8.323 | 1.43701 | 89.06 | 0.53059 |
| 41 | −19.85638 | 1.000 | 1.83001 | 43.87 | 0.56281 |
| 42 | −177.51446 | 0.630 | | | |
| 43 | 75.60489 | 6.538 | 1.43713 | 89.67 | 0.53092 |

TABLE 4B-continued

Example 2

| Sn | R | D | Nd | υd | θgF |
|---|---|---|---|---|---|
| 44 | −29.33961 | 2.000 | | | |
| 45 | ∞ | 33.000 | 1.60859 | 46.44 | 0.56664 |
| 46 | ∞ | 13.200 | 1.51633 | 64.05 | 0.53463 |
| 47 | ∞ | 9.758 | | | |

TABLE 5

Example 2

| | WIDE | TELE | TELE, β = −0.1 |
|---|---|---|---|
| Zr | 1.00 | 19.25 | 19.25 |
| f | 8.286 | 159.511 | 134.475 |
| Bf | 40.977 | 40.977 | 40.977 |
| FNo. | 1.96 | 2.79 | 1.96 |
| 2ω(°) | 70.0 | 3.8 | 4.6 |
| Ymax | 5.5 | 5.5 | 5.5 |
| DD[8] | 1.001 | 28.155 | 28.155 |
| DD[10] | 1.000 | 34.949 | 34.949 |
| DD[21] | 73.463 | 14.895 | 6.464 |
| DD[26] | 3.620 | 1.085 | 9.516 |

TABLE 6

Example 2

| Sn | 11 | 12 |
|---|---|---|
| KA | 1.0000000E+00 | 1.0000000E+00 |
| A3 | −7.4705579E−20 | 0.0000000E+00 |
| A4 | −1.6145629E−05 | −3.4646375E−05 |
| A5 | 3.5412160E−06 | 4.4687207E−06 |
| A6 | −1.9187586E−07 | −3.7336643E−07 |
| A7 | 3.7810880E−09 | 1.3263425E−08 |

Example 3

Figure 6:
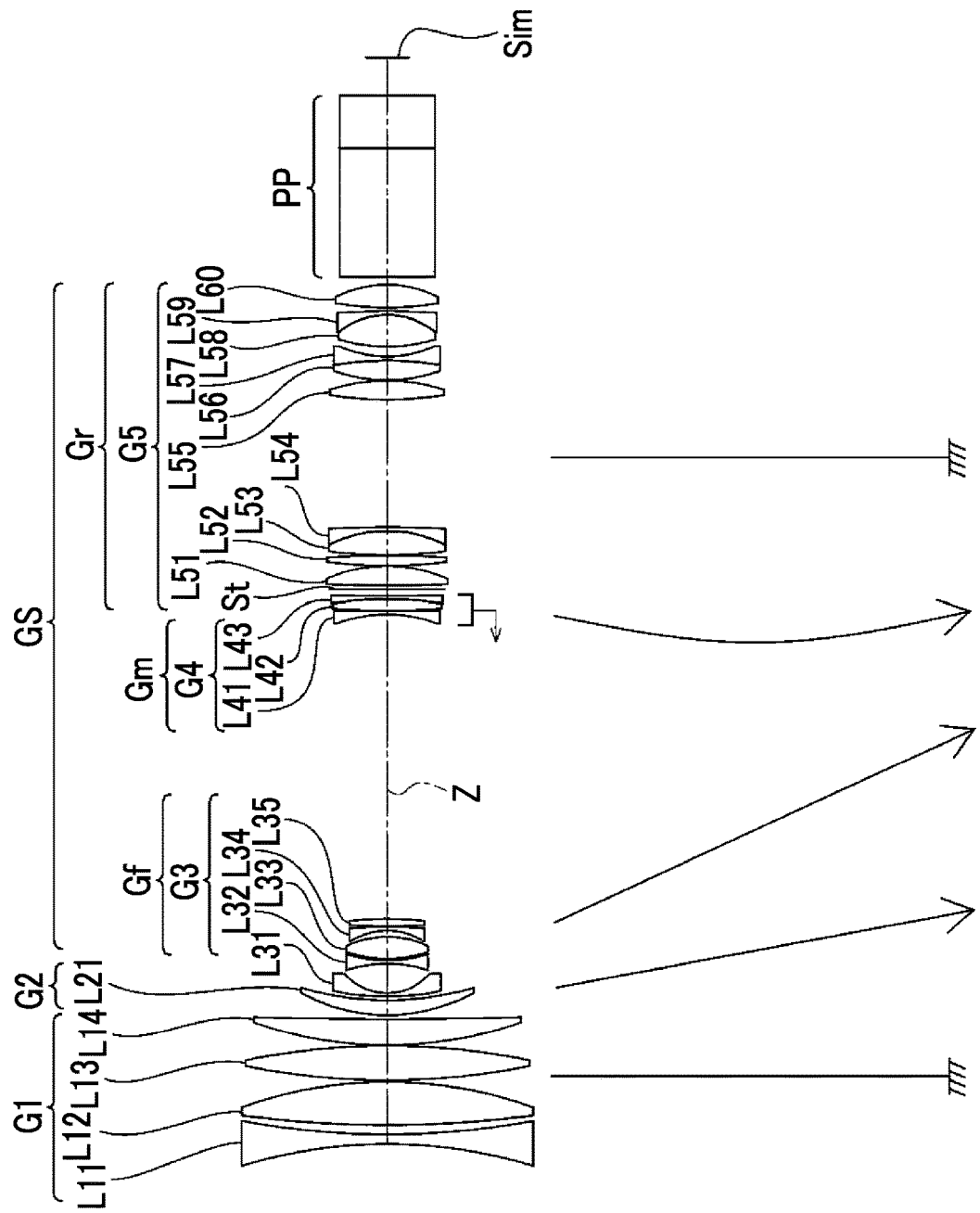
FIG. 6 is a cross-sectional view of a configuration of a zoom lens of Example 3 and a diagram illustrating movement loci thereof.

FIG. 6 shows a configuration and movement loci of the zoom lens of Example 3. The zoom lens of Example 3 consists of, in order from the object side to the image side, a first lens group G1 having a positive refractive power, a second lens group G2 having a positive refractive power, a third lens group G3 having a negative refractive power, a fourth lens group G4 having a negative refractive power, and a fifth lens group G5 having a positive refractive power. During zooming, the first lens group G1 and the fifth lens group G5 remain stationary with respect to the image plane Sim, and the second lens group G2, the third lens group G3, and the fourth lens group G4 move along the optical axis Z by changing the spacings between the adjacent lens groups. The subsequent group GS consists of a front group Gf, a middle group Gm, and a rear group Gr in order from the object side to the image side. The front group Gf consists of a third lens group G3. The middle group Gm consists of a fourth lens group G4. The rear group Gr consists of a fifth lens group G5. The focusing group consists of a fourth lens group G4.

The first lens group G1 consists of four lenses L11 to L14 in order from the object side to the image side. The second lens group G2 consists of one lens L21. The third lens group G3 consists of five lenses L31 to L35 in order from the object side to the image side. The fourth lens group G4 consists of three lenses L41 to L43 in order from the object side to the image side. The fifth lens group G5 consists of an aperture stop St and ten lenses L51 to L60 in order from the object side to the image side.

Regarding the zoom lens of Example 3, Table 7A and 7B show basic lens data, Table 8 shows specifications and variable surface spacings, and Table 9 shows aspherical coefficients thereof. FIG. 7 shows aberration diagrams. The object distance in a state where the lateral magnification of the zoom lens is −0.1 times is 0.745 m (meters).

TABLE 7A

Example 3

| Sn | R | D | Nd | υd | θgF |
|---|---|---|---|---|---|
| 1 | −130.50939 | 2.400 | 1.85883 | 30.00 | 0.59793 |
| 2 | 207.92622 | 2.446 | | | |
| 3 | 302.66947 | 10.919 | 1.43875 | 94.66 | 0.53402 |
| 4 | −114.80181 | 0.413 | | | |
| 5 | 189.03957 | 8.803 | 1.55733 | 71.18 | 0.54011 |
| 6 | −185.00512 | 0.120 | | | |
| 7 | 105.06129 | 6.776 | 1.73092 | 54.91 | 0.54417 |
| 8 | 1232.50203 | DD[8] | | | |
| 9 | 47.36531 | 3.814 | 1.75212 | 52.79 | 0.54709 |
| 10 | 82.29714 | DD[10] | | | |
| *11 | 105.86974 | 0.800 | 1.85135 | 40.10 | 0.56954 |
| *12 | 15.31628 | 7.464 | | | |
| 13 | −36.33130 | 0.800 | 1.99554 | 26.07 | 0.61172 |
| 14 | 35.01590 | 0.433 | | | |
| 15 | 33.01016 | 5.637 | 1.94518 | 17.74 | 0.65760 |
| 16 | −24.83491 | 1.545 | | | |
| 17 | −18.50710 | 1.000 | 1.97865 | 30.14 | 0.59676 |
| 18 | −109.89333 | 0.120 | | | |
| 19 | 165.82850 | 1.894 | 1.61959 | 36.04 | 0.58858 |
| 20 | −92.21192 | DD[20] | | | |
| 21 | −38.15902 | 0.800 | 1.91265 | 36.74 | 0.57867 |
| 22 | 517.81541 | 0.120 | | | |
| 23 | 193.94173 | 2.852 | 1.95656 | 17.17 | 0.66168 |
| 24 | −88.62632 | 0.760 | 1.92369 | 35.63 | 0.58152 |
| 25 | 3823.96980 | DD[25] | | | |

TABLE 7B

Example 3

| Sn | R | D | Nd | υd | θgF |
|---|---|---|---|---|---|
| 26(St) | ∞ | 1.009 | | | |
| 27 | 324.65035 | 4.978 | 1.79025 | 29.71 | 0.60259 |
| 28 | −40.25271 | 0.120 | | | |
| 29 | 129.51937 | 2.522 | 1.85380 | 40.20 | 0.57076 |
| 30 | −282.61419 | 0.120 | | | |
| 31 | 121.30930 | 6.184 | 1.45050 | 64.30 | 0.52934 |
| 32 | −33.99890 | 1.000 | 1.94845 | 19.94 | 0.64464 |
| 33 | −269.31030 | 32.500 | | | |
| 34 | 96.49415 | 4.822 | 1.62742 | 35.36 | 0.59034 |
| 35 | −49.86851 | 0.177 | | | |
| 36 | 42.28531 | 4.989 | 1.52986 | 49.40 | 0.56207 |
| 37 | −79.46812 | 1.000 | 1.81452 | 43.03 | 0.56517 |
| 38 | 31.42792 | 2.527 | | | |
| 39 | 46.02906 | 8.021 | 1.43873 | 89.43 | 0.53108 |
| 40 | −20.51147 | 1.000 | 1.83636 | 39.64 | 0.57276 |
| 41 | −171.56427 | 0.903 | | | |
| 42 | 83.39207 | 5.760 | 1.45566 | 86.82 | 0.53278 |
| 43 | −30.77073 | 2.000 | | | |
| 44 | ∞ | 33.000 | 1.60859 | 46.44 | 0.56664 |
| 45 | ∞ | 13.200 | 1.51633 | 64.05 | 0.53463 |
| 46 | ∞ | 9.709 | | | |

TABLE 8

| | Example 3 | | |
|---|---|---|---|
| | WIDE | TELE | TELE, β = −0.1 |
| Zr | 1.00 | 19.25 | 19.25 |
| f | 8.284 | 159.474 | 136.105 |
| Bf | 40.929 | 40.929 | 40.929 |
| FNo. | 1.96 | 2.75 | 1.96 |
| 2ω(°) | 70.2 | 3.8 | 4.4 |
| Ymax | 5.5 | 5.5 | 5.5 |
| DD[8] | 1.000 | 31.425 | 31.425 |
| DD[10] | 1.000 | 33.536 | 33.536 |
| DD[20] | 77.537 | 15.105 | 6.140 |
| DD[25] | 1.555 | 1.026 | 9.992 |

TABLE 9

| | Example 3 | |
|---|---|---|
| Sn | 11 | 12 |
| KA | 1.0000000E+00 | 1.0000000E+00 |
| A3 | 0.0000000E+00 | 1.2846676E−20 |
| A4 | −8.6957686E−06 | −2.0099204E−05 |
| A5 | 3.6761480E−06 | 2.7606931E−06 |
| A6 | −2.1015822E−07 | −1.2536222E−07 |
| A7 | 4.1706328E−09 | 7.1468822E−09 |

Example 4

Figure 8:
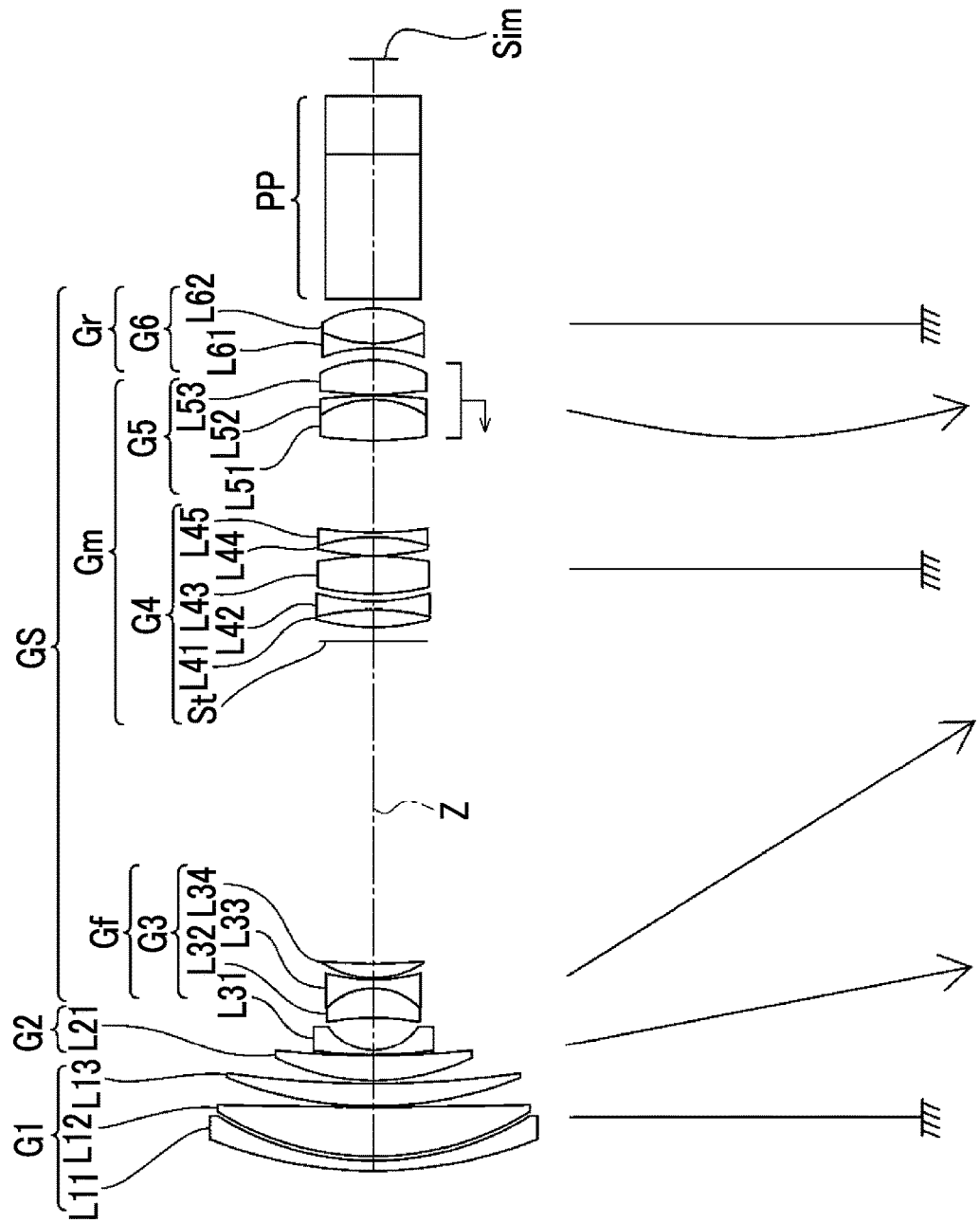
FIG. 8 is a cross-sectional view of a configuration of a zoom lens of Example 4 and a diagram illustrating movement loci thereof.

FIG. 8 shows a configuration and movement loci of the zoom lens of Example 4. Further, FIG. 9 shows a configuration and a luminous flux in each state of the zoom lens of Example 4. Since the illustration method of FIG. 9 is the same as that of FIG. 2, repeated description will not be given. The zoom lens of Example 4 consists of, in order from the object side to the image side, a first lens group G1 having a positive refractive power, a second lens group G2 having a positive refractive power, a third lens group G3 having a negative refractive power, a fourth lens group G4 having a positive refractive power, a fifth lens group G5 having a positive refractive power, and a sixth lens group G6 having a negative refractive power. During zooming, the first lens group G1, the fourth lens group G4, and the sixth lens group G6 remain stationary with respect to the image plane Sim, and the second lens group G2, the third lens group G3, and the fifth lens group G5 move along the optical axis Z by changing the spacings between the adjacent lens groups. The subsequent group GS consists of a front group Gf, a middle group Gm, and a rear group Gr in order from the object side to the image side. The front group Gf consists of a third lens group G3. The middle group Gm consists of a fourth lens group G4 and a fifth lens group G5. The rear group Gr consists of a sixth lens group G6. The focusing group consists of a fifth lens group G5.

The first lens group G1 consists of three lenses L11 to L13 in order from the object side to the image side. The second lens group G2 consists of one lens L21. The third lens group G3 consists of four lenses L31 to L34 in order from the object side to the image side. The fourth lens group G4 consists of an aperture stop St and five lenses L41 to L45 in order from the object side to the image side. The fifth lens group G5 consists of three lenses L51 to L53 in order from the object side to the image side. The sixth lens group G6 consists of two lenses L61 and L62 in order from the object side to the image side.

Regarding the zoom lens of Example 4, Table 10 shows basic lens data, Table 11 shows specifications and variable surface spacings, and Table 12 shows aspherical coefficients thereof. FIG. 10 shows aberration diagrams. The object distance in a state where the lateral magnification of the zoom lens is −0.1 times is 1.632 m (meters).

TABLE 10

| | Example 4 | | | | |
|---|---|---|---|---|---|
| Sn | R | D | Nd | νd | θgF |
| 1 | 104.84418 | 2.280 | 1.99377 | 27.12 | 0.60601 |
| 2 | 70.15853 | 1.000 | | | |
| 3 | 70.02345 | 11.198 | 1.43875 | 94.94 | 0.53433 |
| 4 | 1461.67725 | 0.120 | | | |
| 5 | 92.39314 | 5.148 | 1.79560 | 50.81 | 0.54549 |
| 6 | 243.92932 | DD[6] | | | |
| 7 | 52.63911 | 5.711 | 1.43307 | 91.26 | 0.49249 |
| 8 | 231.04931 | DD[8] | | | |
| 9 | 106.15396 | 1.028 | 2.07433 | 21.45 | 0.64115 |
| 10 | 13.15798 | 7.437 | | | |
| 11 | −62.01983 | 6.688 | 2.02278 | 14.33 | 0.68314 |
| 12 | −15.46075 | 1.992 | 1.90223 | 37.00 | 0.57807 |
| 13 | 45.88654 | 0.353 | | | |
| 14 | 22.39312 | 3.254 | 1.44238 | 67.57 | 0.52604 |
| 15 | 171.42179 | DD[15] | | | |
| 16(St) | ∞ | 3.253 | | | |
| 17 | 53.92293 | 3.915 | 1.85522 | 23.07 | 0.62591 |
| 18 | −55.13137 | 1.714 | 1.79641 | 43.54 | 0.56469 |
| 19 | 47.21786 | 1.732 | | | |
| 20 | 56.22673 | 8.496 | 1.50308 | 80.52 | 0.53776 |
| 21 | −69.76230 | 0.146 | | | |
| 22 | 59.36350 | 4.176 | 1.49708 | 63.19 | 0.53569 |
| 23 | −42.74006 | 1.002 | 1.79844 | 25.58 | 0.61592 |
| 24 | 90.35618 | DD[24] | | | |
| 25 | 83.97862 | 9.242 | 1.50308 | 80.52 | 0.53776 |
| 26 | −23.44413 | 0.950 | 1.79844 | 34.92 | 0.58698 |
| 27 | −99.37718 | 0.242 | | | |
| *28 | 65.39779 | 7.695 | 1.58313 | 59.38 | 0.54237 |
| *29 | −29.01762 | DD[29] | | | |
| 30 | −35.22578 | 1.107 | 1.79213 | 48.79 | 0.55322 |
| 31 | 29.54173 | 7.913 | 1.52413 | 50.48 | 0.56014 |
| 32 | −23.43103 | 2.000 | | | |
| 33 | ∞ | 33.000 | 1.60859 | 46.44 | 0.56664 |
| 34 | ∞ | 13.200 | 1.51633 | 64.05 | 0.53463 |
| 35 | ∞ | 8.376 | | | |

TABLE 11

| | Example 4 | | |
|---|---|---|---|
| | WIDE | TELE | TELE, β = −0.1 |
| Zr | 1.00 | 35.00 | 35.00 |
| f | 7.898 | 276.418 | 244.437 |
| Bf | 39.598 | 39.598 | 39.598 |
| FNo. | 1.98 | 4.84 | 4.01 |
| 2ω(°) | 71.8 | 2.2 | 2.4 |
| Ymax | 5.5 | 5.5 | 5.5 |
| DD[6] | 0.687 | 20.991 | 20.991 |
| DD[8] | 0.163 | 48.830 | 48.830 |
| DD[15] | 73.029 | 4.059 | 4.059 |
| DD[24] | 20.989 | 23.071 | 9.045 |
| DD[29] | 2.764 | 0.682 | 14.708 |

TABLE 12

| | Example 4 | |
|---|---|---|
| Sn | 28 | 29 |
| KA | 1.0000000E+00 | 1.0000000E+00 |
| A3 | 0.0000000E+00 | 0.0000000E+00 |
| A4 | −9.1122076E−06 | 3.2360030E−06 |

TABLE 12-continued

Example 4

| Sn | 28 | 29 |
|---|---|---|
| A5 | 5.8779053E−08 | 3.6185421E−08 |
| A6 | −3.7405788E−08 | −3.1165470E−08 |
| A7 | −1.8318481E−10 | −7.6495966E−10 |
| A8 | −1.6194216E−11 | 3.5025757E−11 |
| A9 | −5.8791329E−12 | −6.4441992E−12 |
| A10 | −3.5918534E−13 | −8.8750709E−14 |
| A11 | −1.2336475E−14 | −2.2572283E−14 |
| A12 | −2.5020331E−16 | −3.0144018E−16 |
| A13 | 5.7927095E−17 | 4.8517775E−18 |
| A14 | −9.0842839E−18 | 2.1557781E−18 |
| A15 | 4.9574136E−20 | 2.7053475E−19 |
| A16 | −5.9834320E−20 | −3.6361288E−20 |
| A17 | 4.4363718E−21 | −2.3676962E−21 |
| A18 | 2.8659492E−22 | −2.0388194E−22 |
| A19 | −5.7173664E−23 | 9.9654016E−24 |
| A20 | −8.7496819E−25 | −3.1709320E−25 |

Example 5

Figure 11:
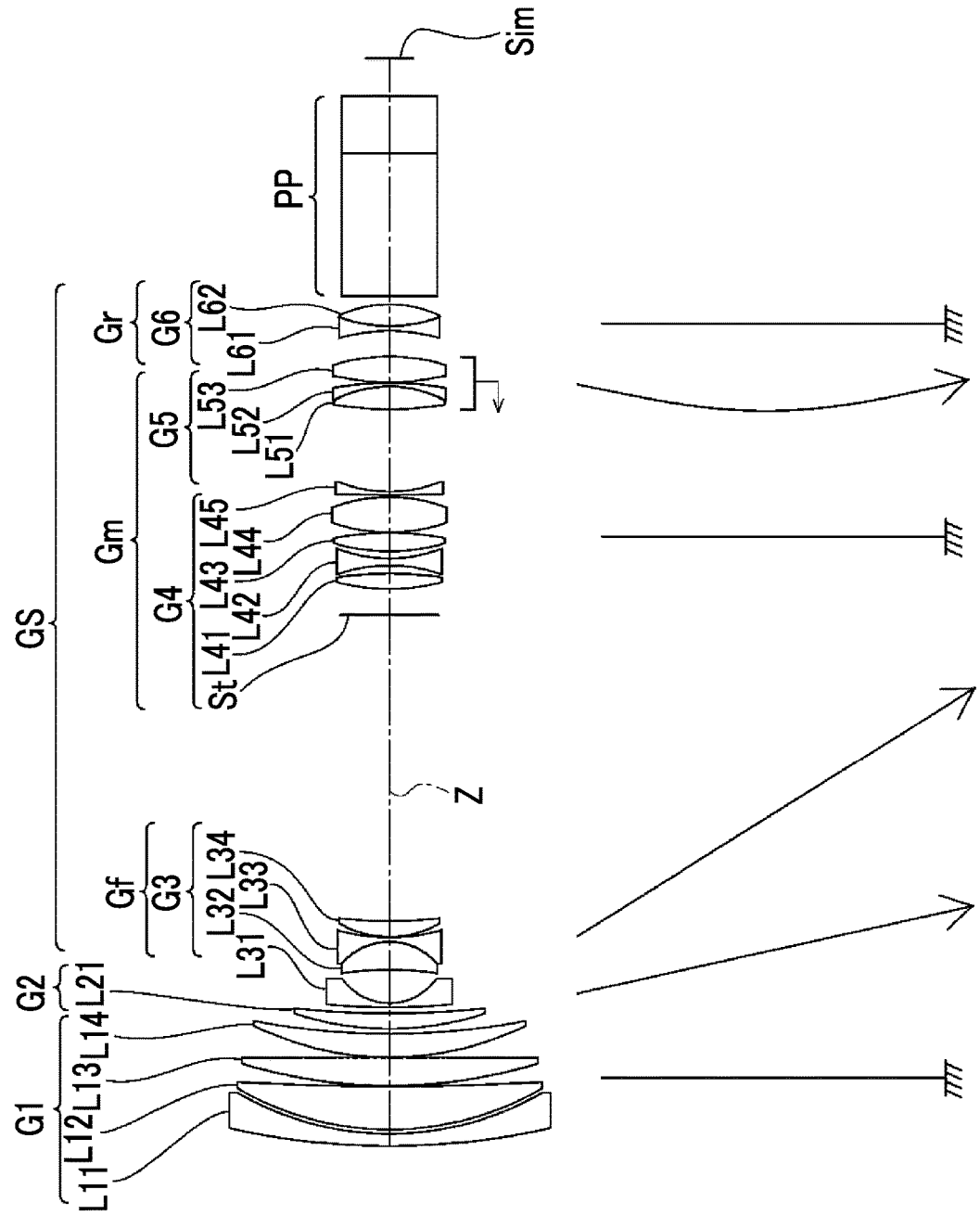
FIG. 11 is a cross-sectional view of a configuration of a zoom lens of Example 5 and a diagram illustrating movement loci thereof.

FIG. 11 shows a configuration and movement loci of the zoom lens of Example 5. The zoom lens of Example 5 consists of, in order from the object side to the image side, a first lens group G1 having a positive refractive power, a second lens group G2 having a positive refractive power, a third lens group G3 having a negative refractive power, a fourth lens group G4 having a positive refractive power, a fifth lens group G5 having a positive refractive power, and a sixth lens group G6 having a negative refractive power. During zooming, the first lens group G1, the fourth lens group G4, and the sixth lens group G6 remain stationary with respect to the image plane Sim, and the second lens group G2, the third lens group G3, and the fifth lens group G5 move along the optical axis Z by changing the spacings between the adjacent lens groups. The subsequent group GS consists of a front group Gf, a middle group Gm, and a rear group Gr in order from the object side to the image side. The front group Gf consists of a third lens group G3. The middle group Gm consists of a fourth lens group G4 and a fifth lens group G5. The rear group Gr consists of a sixth lens group G6. The focusing group consists of a fifth lens group G5.

The first lens group G1 consists of four lenses L11 to L14 in order from the object side to the image side. The second lens group G2 consists of one lens L21. The third lens group G3 consists of four lenses L31 to L34 in order from the object side to the image side. The fourth lens group G4 consists of an aperture stop St and five lenses L41 to L45 in order from the object side to the image side. The fifth lens group G5 consists of three lenses L51 to L53 in order from the object side to the image side. The sixth lens group G6 consists of two lenses L61 and L62 in order from the object side to the image side.

Regarding the zoom lens of Example 5, Table 13 shows basic lens data, Table 14 shows specifications and variable surface spacings, and Table 15 shows aspherical coefficients thereof. FIG. 12 shows aberration diagrams. The object distance in a state where the lateral magnification of the zoom lens is −0.1 times is 1.642 m (meters).

TABLE 13

Example 5

| Sn | R | D | Nd | νd | θgF |
|---|---|---|---|---|---|
| 1 | 177.68796 | 2.800 | 1.85883 | 30.00 | 0.59793 |
| 2 | 73.18677 | 1.000 | | | |
| 3 | 73.18677 | 10.009 | 1.43875 | 94.94 | 0.53433 |
| 4 | 658.04596 | 0.120 | | | |
| 5 | 122.36861 | 6.458 | 1.43875 | 94.94 | 0.53433 |
| 6 | −8597.22391 | 0.120 | | | |
| 7 | 74.60476 | 5.452 | 1.81680 | 46.32 | 0.55793 |
| 8 | 169.49126 | DD[8] | | | |
| 9 | 72.43647 | 3.591 | 1.55032 | 75.50 | 0.54170 |
| 10 | 220.01653 | DD[10] | | | |
| 11 | 158.44265 | 1.000 | 2.00100 | 27.90 | 0.60338 |
| 12 | 14.07192 | 7.704 | | | |
| 13 | −78.01643 | 6.498 | 1.94595 | 17.98 | 0.65460 |
| 14 | −15.15951 | 0.970 | 1.90043 | 37.37 | 0.57720 |
| 15 | 47.15596 | 0.120 | | | |
| 16 | 24.33689 | 3.628 | 1.57761 | 40.45 | 0.57852 |
| 17 | 99.09638 | DD[17] | | | |
| 18(St) | ∞ | 5.750 | | | |
| 19 | 50.79214 | 3.519 | 1.85896 | 22.73 | 0.62844 |
| 20 | −96.64659 | 1.885 | | | |
| 21 | −38.47540 | 1.673 | 1.80000 | 48.00 | 0.55473 |
| 22 | 36.30227 | 1.593 | | | |
| 23 | 47.58788 | 4.268 | 1.51708 | 78.17 | 0.53841 |
| 24 | −72.53234 | 0.120 | | | |
| 25 | 42.05408 | 8.163 | 1.49701 | 55.56 | 0.55152 |
| 26 | −39.60207 | 0.500 | | | |
| 27 | 685.96000 | 0.900 | 1.80000 | 25.00 | 0.61743 |
| 28 | 34.51010 | DD[28] | | | |
| 29 | 83.33334 | 5.255 | 1.51708 | 78.17 | 0.53841 |
| 30 | −28.57526 | 0.800 | 1.85000 | 28.53 | 0.60495 |
| 31 | −80.13641 | 0.120 | | | |
| *32 | 52.51090 | 5.979 | 1.58313 | 59.38 | 0.54237 |
| *33 | −47.41804 | DD[33] | | | |
| 34 | −43.26011 | 1.100 | 1.80000 | 46.86 | 0.55732 |
| 35 | 36.04142 | 5.000 | 1.56530 | 42.76 | 0.57422 |
| 36 | −29.59894 | 2.000 | | | |
| 37 | ∞ | 33.000 | 1.60859 | 46.44 | 0.56664 |
| 38 | ∞ | 13.200 | 1.51633 | 64.05 | 0.53463 |
| 39 | ∞ | 8.735 | | | |

TABLE 14

Example 5

| | WIDE | TELE | TELE, β = −0.1 |
|---|---|---|---|
| Zr | 1.00 | 30.00 | 30.00 |
| f | 8.250 | 247.493 | 229.575 |
| Bf | 39.954 | 39.954 | 39.954 |
| FNo. | 1.97 | 4.01 | 4.01 |
| 2ω(°) | 69.4 | 2.6 | 2.4 |
| Ymax | 5.5 | 5.5 | 5.5 |
| DD[8] | 1.214 | 28.054 | 28.054 |
| DD[10] | 1.365 | 40.935 | 40.935 |
| DD[17] | 70.932 | 4.522 | 4.522 |
| DD[28] | 19.033 | 23.528 | 7.872 |
| DD[33] | 5.945 | 1.450 | 17.106 |

TABLE 15

Example 5

| Sn | 32 | 33 |
|---|---|---|
| KA | 1.0000000E+00 | 1.0000000E+00 |
| A3 | 0.0000000E+00 | 0.0000000E+00 |
| A4 | −3.0760279E−06 | 1.1306977E−06 |
| A5 | 2.0812588E−09 | 1.6201762E−08 |
| A6 | −9.8483222E−09 | −1.0645349E−08 |
| A7 | 2.4295213E−10 | 1.2627966E−10 |
| A8 | −1.8325750E−11 | −1.2952721E−12 |

TABLE 15-continued

Example 5

| Sn | 32 | 33 |
|---|---|---|
| A9 | −2.5091629E−12 | −2.9581299E−12 |
| A10 | −1.3213030E−13 | −5.5736599E−14 |
| A11 | −5.3440011E−15 | −1.0600492E−14 |
| A12 | 5.1575574E−16 | 1.6181290E−16 |
| A13 | 4.7963535E−18 | −4.1497886E−17 |
| A14 | −5.6358635E−18 | 1.9112706E−18 |
| A15 | 2.0339815E−19 | 2.2375299E−19 |
| A16 | −3.6599702E−20 | 1.9948034E−21 |
| A17 | 1.1107915E−22 | −1.6968432E−21 |
| A18 | 5.6219111E−22 | −5.0282649E−23 |
| A19 | −2.2779067E−23 | 1.5712362E−23 |
| A20 | −8.4919578E−25 | −1.0465125E−24 |

Example 6

Figure 13:
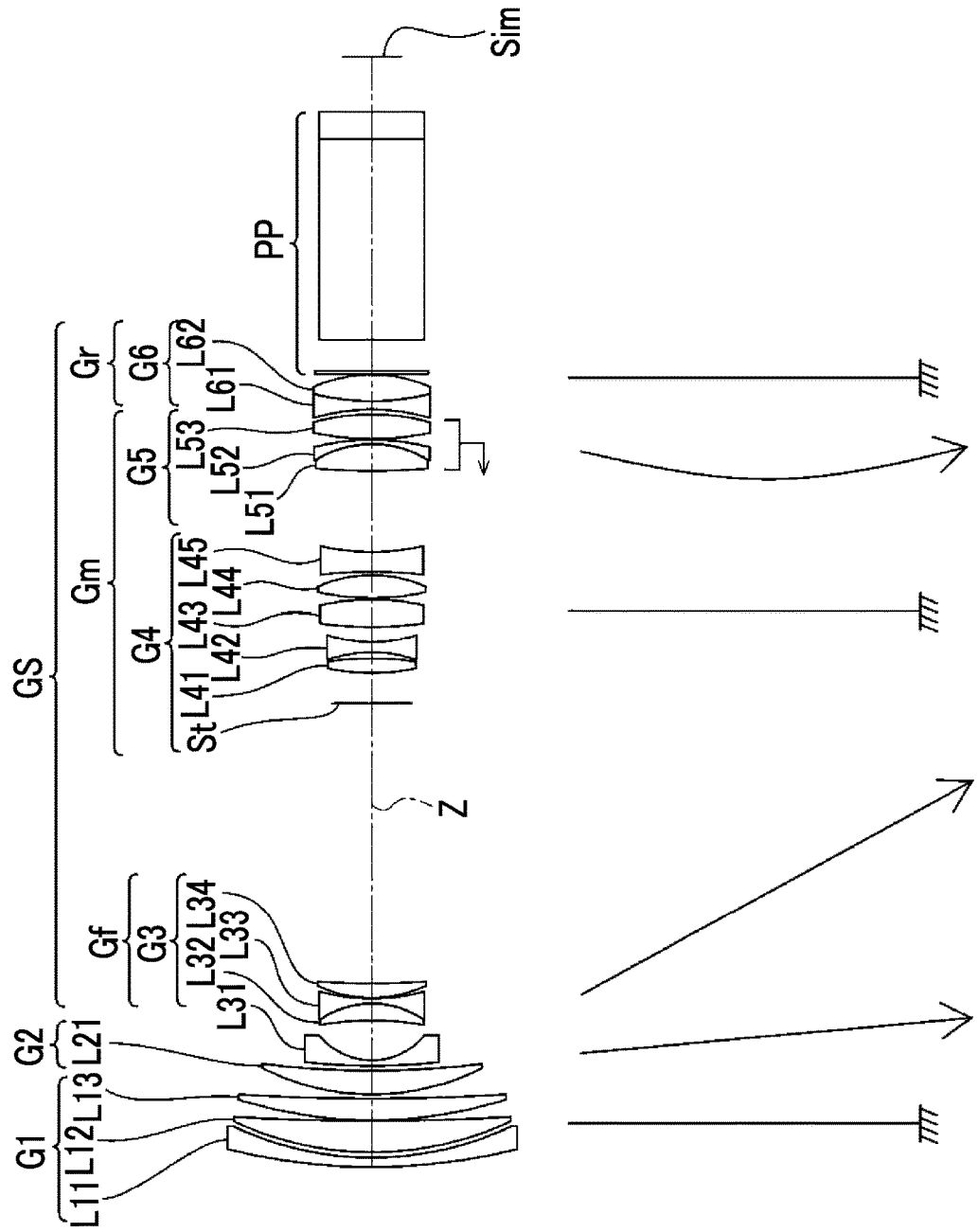
FIG. 13 is a cross-sectional view of a configuration of a zoom lens of Example 6 and a diagram illustrating movement loci thereof.

FIG. 13 shows a configuration and movement loci of the zoom lens of Example 6. The zoom lens of Example 6 consists of, in order from the object side to the image side, a first lens group G1 having a positive refractive power, a second lens group G2 having a positive refractive power, a third lens group G3 having a negative refractive power, a fourth lens group G4 having a positive refractive power, a fifth lens group G5 having a positive refractive power, and a sixth lens group G6 having a negative refractive power. During zooming, the first lens group G1, the fourth lens group G4, and the sixth lens group G6 remain stationary with respect to the image plane Sim, and the second lens group G2, the third lens group G3, and the fifth lens group G5 move along the optical axis Z by changing the spacings between the adjacent lens groups. The subsequent group GS consists of a front group Gf, a middle group Gm, and a rear group Gr in order from the object side to the image side. The front group Gf consists of a third lens group G3. The middle group Gm consists of a fourth lens group G4 and a fifth lens group G5. The rear group Gr consists of a sixth lens group G6. The focusing group consists of a fifth lens group G5.

The first lens group G1 consists of three lenses L11 to L13 in order from the object side to the image side. The second lens group G2 consists of one lens L21. The third lens group G3 consists of four lenses L31 to L34 in order from the object side to the image side. The fourth lens group G4 consists of an aperture stop St and five lenses L41 to L45 in order from the object side to the image side. The fifth lens group G5 consists of three lenses L51 to L53 in order from the object side to the image side. The sixth lens group G6 consists of two lenses L61 and L62 in order from the object side to the image side.

Regarding the zoom lens of Example 6, Table 16 shows basic lens data, Table 17 shows specifications and variable surface spacings, and Table 18 shows aspherical coefficients thereof. FIG. 14 shows aberration diagrams. The object distance in a state where the lateral magnification of the zoom lens is −0.1 times is 1.568 m (meters).

TABLE 16

Example 6

| Sn | R | D | Nd | υd | θgF |
|---|---|---|---|---|---|
| 1 | 192.31394 | 3.000 | 1.92205 | 25.92 | 0.61249 |
| 2 | 107.05086 | 1.682 | | | |
| 3 | 107.05086 | 9.890 | 1.43875 | 94.94 | 0.53433 |

TABLE 16-continued

Example 6

| Sn | R | D | Nd | υd | θgF |
|---|---|---|---|---|---|
| 4 | 792.14037 | 0.200 | | | |
| 5 | 146.81144 | 6.750 | 1.74602 | 53.40 | 0.54464 |
| 6 | 705.44701 | DD[6] | | | |
| 7 | 79.63596 | 7.513 | 1.55032 | 75.50 | 0.54170 |
| 8 | 292.13211 | DD[8] | | | |
| 9 | 204.98728 | 1.682 | 1.95266 | 32.73 | 0.58899 |
| 10 | 22.47554 | 12.509 | | | |
| 11 | −101.93005 | 5.322 | 1.94595 | 17.98 | 0.65460 |
| 12 | −30.84394 | 1.631 | 1.90047 | 37.37 | 0.57720 |
| 13 | 67.56456 | 0.120 | | | |
| 14 | 42.01885 | 4.578 | 1.79630 | 27.17 | 0.61064 |
| 15 | 283.56783 | DD[15] | | | |
| 16(St) | ∞ | 9.671 | | | |
| 17 | 75.63268 | 4.548 | 1.85001 | 23.29 | 0.62416 |
| 18 | −108.35267 | 1.862 | | | |
| 19 | −46.64287 | 3.364 | 1.73732 | 54.27 | 0.54495 |
| 20 | 49.03088 | 4.774 | | | |
| 21 | 127.12893 | 8.391 | 1.52739 | 75.79 | 0.53848 |
| 22 | −78.19098 | 0.441 | | | |
| 23 | 83.46802 | 7.139 | 1.54329 | 59.14 | 0.54404 |
| 24 | −45.10520 | 1.165 | | | |
| 25 | −129.16164 | 6.187 | 1.79999 | 25.47 | 0.61623 |
| 26 | 76.38443 | DD[26] | | | |
| 27 | 215.76509 | 8.472 | 1.52739 | 75.79 | 0.53848 |
| 28 | −35.09158 | 1.349 | 1.84943 | 31.99 | 0.59421 |
| 29 | −75.98436 | 0.202 | | | |
| *30 | 88.15752 | 7.750 | 1.58313 | 59.38 | 0.54237 |
| *31 | −72.33137 | DD[31] | | | |
| 32 | −66.79491 | 2.533 | 1.79987 | 48.01 | 0.55470 |
| 33 | 75.63543 | 8.351 | 1.55339 | 44.99 | 0.57005 |
| 34 | −48.18918 | 0.200 | | | |
| 35 | ∞ | 1.000 | 1.51633 | 64.14 | 0.53531 |
| 36 | ∞ | 10.000 | | | |
| 37 | ∞ | 63.000 | 1.60863 | 46.60 | 0.56787 |
| 38 | ∞ | 8.500 | 1.51633 | 64.14 | 0.53531 |
| 39 | ∞ | 17.508 | | | |

TABLE 17

Example 6

| | WIDE | TELE | TELE, β = −0.1 |
|---|---|---|---|
| Zr | 1.00 | 13.55 | 13.55 |
| f | 15.511 | 210.176 | 212.066 |
| Bf | 72.277 | 72.277 | 72.277 |
| FNo. | 2.48 | 3.52 | 3.52 |
| 2ω(°) | 64.2 | 5.0 | 4.8 |
| Ymax | 9.25 | 9.25 | 9.25 |
| DD[6] | 1.283 | 16.319 | 16.319 |
| DD[8] | 1.513 | 70.419 | 70.419 |
| DD[15] | 88.027 | 4.085 | 4.085 |
| DD[26] | 25.393 | 23.201 | 9.357 |
| DD[31] | 1.548 | 3.740 | 17.584 |

TABLE 18

Example 6

| Sn | 30 | 31 |
|---|---|---|
| KA | 1.0000000E+00 | 1.0000000E+00 |
| A3 | 0.0000000E+00 | 0.0000000E+00 |
| A4 | −6.4662618E−07 | 2.3768924E−07 |
| A5 | 2.6014178E−10 | 2.0250990E−09 |
| A6 | −7.3192615E−10 | −7.9116108E−10 |
| A7 | 1.0736104E−11 | 5.5803242E−12 |
| A8 | −4.8151386E−13 | −3.4033612E−14 |
| A9 | −3.9200977E−14 | −4.6215246E−14 |
| A10 | −1.2274151E−15 | −5.1776120E−16 |
| A11 | −2.9517296E−17 | −5.8551233E−17 |

TABLE 18-continued

Example 6

| Sn | 30 | 31 |
|---|---|---|
| A12 | 1.6938506E-18 | 5.3142771E-19 |
| A13 | 9.3661957E-21 | -8.1036004E-20 |
| A14 | -6.5438527E-21 | 2.2191938E-21 |
| A15 | 1.4042391E-22 | 1.5447667E-22 |
| A16 | -1.5024243E-23 | 8.1887037E-25 |
| A17 | 2.7112441E-26 | -4.1416918E-25 |
| A18 | 8.1590771E-26 | -7.2975187E-27 |
| A19 | -1.9656854E-27 | 1.3558746E-27 |
| A20 | -4.3571940E-29 | -5.3696190E-29 |

Example 7

Figure 15:
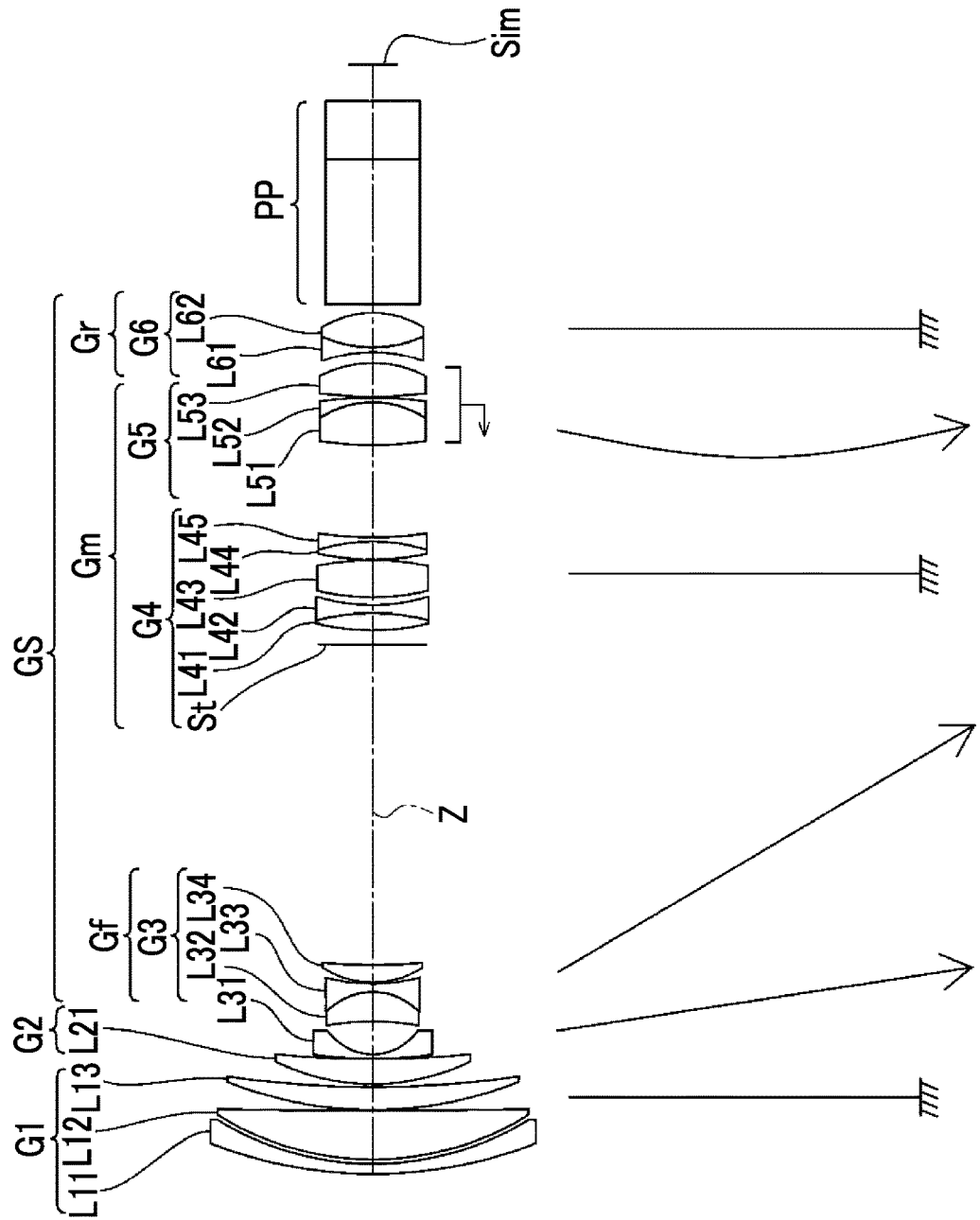
FIG. 15 is a cross-sectional view of a configuration of a zoom lens of Example 7 and a diagram illustrating movement loci thereof.

FIG. 15 shows a configuration and movement loci of the zoom lens of Example 7. The zoom lens of Example 7 consists of, in order from the object side to the image side, a first lens group G1 having a positive refractive power, a second lens group G2 having a positive refractive power, a third lens group G3 having a negative refractive power, a fourth lens group G4 having a positive refractive power, a fifth lens group G5 having a positive refractive power, and a sixth lens group G6 having a negative refractive power. During zooming, the first lens group G1, the fourth lens group G4, and the sixth lens group G6 remain stationary with respect to the image plane Sim, and the second lens group G2, the third lens group G3, and the fifth lens group G5 move along the optical axis Z by changing the spacings between the adjacent lens groups. The subsequent group GS consists of a front group Gf, a middle group Gm, and a rear group Gr in order from the object side to the image side. The front group Gf consists of a third lens group G3. The middle group Gm consists of a fourth lens group G4 and a fifth lens group G5. The rear group Gr consists of a sixth lens group G6. The focusing group consists of a fifth lens group G5.

The first lens group G1 consists of three lenses L11 to L13 in order from the object side to the image side. The second lens group G2 consists of one lens L21. The third lens group G3 consists of four lenses L31 to L34 in order from the object side to the image side. The fourth lens group G4 consists of an aperture stop St and five lenses L41 to L45 in order from the object side to the image side. The fifth lens group G5 consists of three lenses L51 to L53 in order from the object side to the image side. The sixth lens group G6 consists of two lenses L61 and L62 in order from the object side to the image side.

Regarding the zoom lens of Example 7, Table 19 shows basic lens data, Table 20 shows specifications and variable surface spacings, and Table 21 shows aspherical coefficients thereof. FIG. 16 shows aberration diagrams. The object distance in a state where the lateral magnification of the zoom lens is -0.1 times is 1.718 m (meters).

TABLE 19

Example 7

| Sn | R | D | Nd | νd | θgF |
|---|---|---|---|---|---|
| 1 | 107.38898 | 2.280 | 1.98893 | 27.70 | 0.60430 |
| 2 | 70.82321 | 1.000 | | | |
| 3 | 69.89563 | 11.198 | 1.43875 | 94.94 | 0.53433 |
| 4 | 2775.08338 | 0.120 | | | |
| 5 | 94.64522 | 5.192 | 1.79730 | 50.97 | 0.54487 |
| 6 | 242.72204 | DD [6] | | | |
| 7 | 52.55441 | 5.711 | 1.43922 | 90.50 | 0.49478 |
| 8 | 220.16932 | DD [8] | | | |
| 9 | 103.34958 | 1.000 | 2.07168 | 21.76 | 0.63909 |
| 10 | 13.18186 | 7.479 | | | |
| 11 | -61.89294 | 6.689 | 2.02186 | 14.44 | 0.68239 |
| 12 | -15.45257 | 1.950 | 1.90254 | 36.94 | 0.57822 |
| 13 | 46.02502 | 0.273 | | | |
| 14 | 22.42694 | 3.994 | 1.44528 | 68.19 | 0.52573 |
| 15 | 167.17412 | DD [15] | | | |
| 16(St) | ∞ | 3.255 | | | |
| 17 | 54.00840 | 3.903 | 1.85520 | 23.07 | 0.62590 |
| 18 | -55.33380 | 1.720 | 1.79743 | 43.36 | 0.56504 |
| 19 | 47.16279 | 1.716 | | | |
| 20 | 56.26379 | 8.447 | 1.50311 | 80.52 | 0.53776 |
| 21 | -69.32384 | 0.137 | | | |
| 22 | 59.21197 | 4.148 | 1.49793 | 63.83 | 0.53435 |
| 23 | -42.72642 | 0.987 | 1.79830 | 25.63 | 0.61578 |
| 24 | 90.65750 | DD [24] | | | |
| 25 | 84.63103 | 9.707 | 1.50311 | 80.52 | 0.53776 |
| 26 | -23.44051 | 1.062 | 1.79599 | 35.04 | 0.58668 |
| 27 | -99.37083 | 0.189 | | | |
| *28 | 66.19415 | 7.671 | 1.58313 | 59.38 | 0.54237 |
| *29 | -29.01928 | DD [29] | | | |
| 30 | -35.15340 | 1.125 | 1.78779 | 49.22 | 0.55238 |
| 31 | 29.63918 | 7.834 | 1.52264 | 50.76 | 0.55963 |
| 32 | -23.51247 | 2.000 | | | |
| 33 | ∞ | 33.000 | 1.60859 | 46.44 | 0.56664 |
| 34 | ∞ | 13.200 | 1.51633 | 64.05 | 0.53463 |
| 35 | ∞ | 8.495 | | | |

TABLE 20

Example 7

| | WIDE | TELE | TELE, β = -0.1 |
|---|---|---|---|
| Zr | 1.00 | 35.00 | 35.00 |
| f | 7.873 | 275.554 | 245.670 |
| Bf | 39.717 | 39.717 | 39.717 |
| FNo. | 1.98 | 4.76 | 4.01 |
| 2ω (°) | 72.0 | 2.2 | 2.2 |
| Ymax | 5.5 | 5.5 | 5.5 |
| DD[6] | 0.636 | 23.059 | 23.059 |
| DD[8] | 0.120 | 48.750 | 48.750 |
| DD[15] | 73.135 | 2.082 | 2.082 |
| DD[24] | 20.988 | 22.173 | 8.072 |
| DD[29] | 2.622 | 1.437 | 15.538 |

TABLE 21

Example 7

| Sn | 28 | 29 |
|---|---|---|
| KA | 1.0000000E+00 | 1.0000000E+00 |
| A3 | 0.0000000E+00 | 0.0000000E+00 |
| A4 | -9.1578389E-06 | 2.9975843E-06 |
| A5 | 5.2031773E-08 | 4.4163442E-08 |
| A6 | -3.6915998E-08 | -3.1254505E-08 |
| A7 | -2.0432049E-10 | -7.7805523E-10 |
| A8 | -1.6288464E-11 | 3.3242018E-11 |
| A9 | -5.9403195E-12 | -6.3311880E-12 |
| A10 | -3.5452141E-13 | -8.7095980E-14 |
| A11 | -1.2425538E-14 | -2.2417719E-14 |
| A12 | -2.4906394E-16 | -3.1277014E-16 |
| A13 | 5.7681580E-17 | 4.3814018E-18 |
| A14 | -9.0477439E-18 | 2.1495819E-18 |
| A15 | 5.2994068E-20 | 2.6849638E-19 |
| A16 | -5.9809851E-20 | -3.5645249E-20 |
| A17 | 4.4361598E-21 | -2.3722486E-21 |
| A18 | 2.8331841E-22 | -2.0442342E-22 |

TABLE 21-continued

| | Example 7 | |
|---|---|---|
| Sn | 28 | 29 |
| A19 | −5.6964229E−23 | 1.0117280E−23 |
| A20 | −8.6141422E−25 | −3.1850201E−25 |

Example 8

Figure 17:
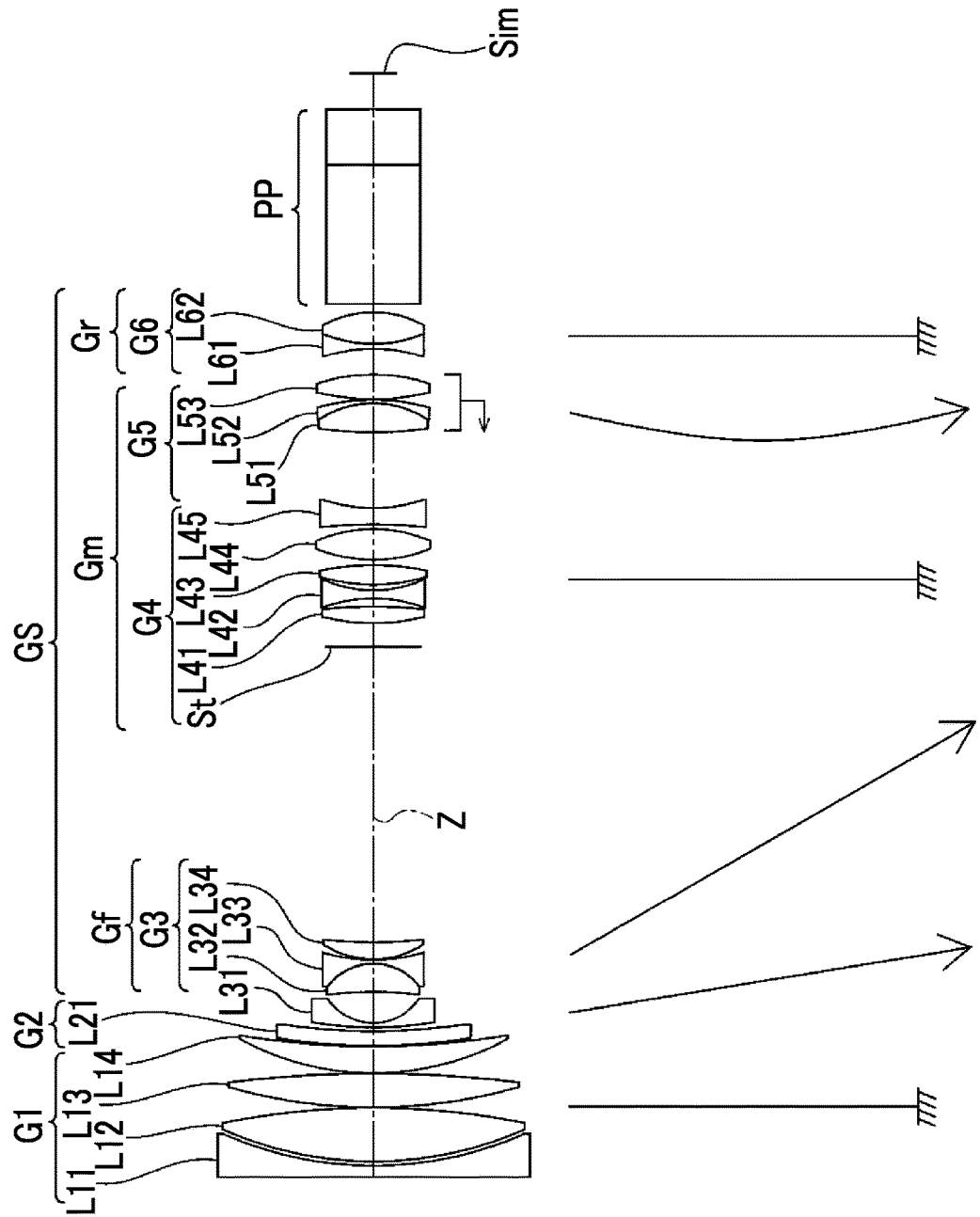
FIG. 17 is a cross-sectional view of a configuration of a zoom lens of Example 8 and a diagram illustrating movement loci thereof.

FIG. 17 shows a configuration and movement loci of the zoom lens of Example 8. The zoom lens of Example 8 consists of, in order from the object side to the image side, a first lens group G1 having a positive refractive power, a second lens group G2 having a positive refractive power, a third lens group G3 having a negative refractive power, a fourth lens group G4 having a positive refractive power, a fifth lens group G5 having a positive refractive power, and a sixth lens group G6 having a negative refractive power. During zooming, the first lens group G1, the fourth lens group G4, and the sixth lens group G6 remain stationary with respect to the image plane Sim, and the second lens group G2, the third lens group G3, and the fifth lens group G5 move along the optical axis Z by changing the spacings between the adjacent lens groups. The subsequent group GS consists of a front group Gf, a middle group Gm, and a rear group Gr in order from the object side to the image side. The front group Gf consists of a third lens group G3. The middle group Gm consists of a fourth lens group G4 and a fifth lens group G5. The rear group Gr consists of a sixth lens group G6. The focusing group consists of a fifth lens group G5.

The first lens group G1 consists of four lenses L11 to L14 in order from the object side to the image side. The second lens group G2 consists of one lens L21. The third lens group G3 consists of four lenses L31 to L34 in order from the object side to the image side. The fourth lens group G4 consists of an aperture stop St and five lenses L41 to L45 in order from the object side to the image side. The fifth lens group G5 consists of three lenses L51 to L53 in order from the object side to the image side. The sixth lens group G6 consists of two lenses L61 and L62 in order from the object side to the image side.

Regarding the zoom lens of Example 8, Table 22 shows basic lens data, Table 23 shows specifications and variable surface spacings, and Table 24 shows aspherical coefficients thereof. FIG. 18 shows aberration diagrams. The object distance in a state where the lateral magnification of the zoom lens is −0.1 times is 1.454 m (meters).

TABLE 22

| | | Example 8 | | | |
|---|---|---|---|---|---|
| Sn | R | D | Nd | νd | θgF |
| 1 | −3309764.97079 | 2.800 | 1.85883 | 30.00 | 0.59793 |
| 2 | 92.43409 | 1.000 | | | |
| 3 | 92.43409 | 12.704 | 1.43875 | 94.94 | 0.53433 |
| 4 | −191.28255 | 0.120 | | | |
| 5 | 131.47790 | 8.024 | 1.43875 | 94.94 | 0.53433 |
| 6 | −300.02373 | 0.120 | | | |
| 7 | 69.58209 | 6.362 | 1.85000 | 43.00 | 0.56402 |
| 8 | 206.15543 | DD[8] | | | |
| 9 | 151.22610 | 3.500 | 1.55032 | 75.50 | 0.54170 |
| 10 | 154.92870 | DD[10] | | | |
| 11 | 96.20693 | 1.000 | 1.99347 | 28.65 | 0.60120 |
| 12 | 13.78940 | 7.437 | | | |
| 13 | −88.95357 | 6.623 | 1.94595 | 17.98 | 0.65460 |
| 14 | −14.56922 | 0.970 | 1.90043 | 37.37 | 0.57720 |
| 15 | 45.99658 | 0.120 | | | |
| 16 | 23.23405 | 4.033 | 1.53057 | 49.27 | 0.56230 |
| 17 | 128.91903 | DD[17] | | | |
| 18(St) | ∞ | 5.766 | | | |
| 19 | 52.12044 | 3.755 | 1.85773 | 22.84 | 0.62761 |
| 20 | −119.47282 | 1.870 | | | |
| 21 | −38.46994 | 2.000 | 1.73429 | 54.57 | 0.54452 |
| 22 | 31.68899 | 1.305 | | | |
| 23 | 47.22485 | 4.619 | 1.49861 | 81.27 | 0.53756 |
| 24 | −66.35407 | 1.292 | | | |
| 25 | 38.60399 | 7.295 | 1.52099 | 51.06 | 0.55908 |
| 26 | −35.29934 | 1.050 | | | |
| 27 | −135.68852 | 3.862 | 1.80001 | 25.00 | 0.61743 |
| 28 | 37.99499 | DD[28] | | | |
| 29 | 94.39138 | 6.949 | 1.49861 | 81.27 | 0.53756 |
| 30 | −24.67609 | 0.800 | 1.84986 | 30.93 | 0.59749 |
| 31 | −52.01515 | 0.120 | | | |
| *32 | 53.59893 | 5.855 | 1.58313 | 59.38 | 0.54237 |
| *33 | −45.91717 | DD[33] | | | |
| 34 | −37.62287 | 1.100 | 1.76830 | 48.97 | 0.55371 |
| 35 | 32.80027 | 7.524 | 1.52689 | 49.96 | 0.56107 |
| 36 | −26.02273 | 2.000 | | | |
| 37 | ∞ | 33.000 | 1.60859 | 46.44 | 0.56664 |
| 38 | ∞ | 13.200 | 1.51633 | 64.05 | 0.53463 |
| 39 | ∞ | 8.626 | | | |

TABLE 23

Example 8

| | WIDE | TELE | TELE, β = −0.1 |
|---|---|---|---|
| Zr | 1.00 | 30.00 | 30.00 |
| f | 8.246 | 247.372 | 230.055 |
| Bf | 39.846 | 39.846 | 39.846 |
| FNo. | 1.97 | 4.01 | 4.01 |
| 2ω (°) | 69.4 | 2.6 | 2.6 |
| Ymax | 5.5 | 5.5 | 5.5 |
| DD[8] | 0.120 | 22.993 | 22.993 |
| DD[10] | 0.900 | 42.292 | 42.292 |
| DD[17] | 70.229 | 5.964 | 5.964 |
| DD[28] | 17.993 | 23.561 | 9.490 |
| DD[33] | 6.312 | 0.744 | 14.815 |

TABLE 24

Example 8

| Sn | 32 | 33 |
|---|---|---|
| KA | 1.0000000E+00 | 1.0000000E+00 |
| A3 | 0.0000000E+00 | 0.0000000E+00 |
| A4 | −3.0760279E−06 | 1.1306977E−06 |
| A5 | 2.0812588E−09 | 1.6201762E−08 |
| A6 | −9.8483222E−09 | −1.0645349E−08 |
| A7 | 2.4295213E−10 | 1.2627966E−10 |
| A8 | −1.8325750E−11 | −1.2952721E−12 |
| A9 | −2.5091629E−12 | −2.9581299E−12 |
| A10 | −1.3213030E−13 | −5.5736599E−14 |
| A11 | −5.3440011E−15 | −1.0600492E−14 |
| A12 | 5.1575574E−16 | 1.6181290E−16 |
| A13 | 4.7963535E−18 | −4.1497886E−17 |
| A14 | −5.6358635E−18 | 1.9112706E−18 |
| A15 | 2.0339815E−19 | 2.2375299E−19 |
| A16 | −3.6599702E−20 | 1.9948034E−21 |
| A17 | 1.1107915E−22 | −1.6968432E−21 |
| A18 | 5.6219111E−22 | −5.0282649E−23 |
| A19 | −2.2779067E−23 | 1.5712362E−23 |
| A20 | −8.4919578E−25 | −1.0465125E−24 |

Example 9

Figure 19:
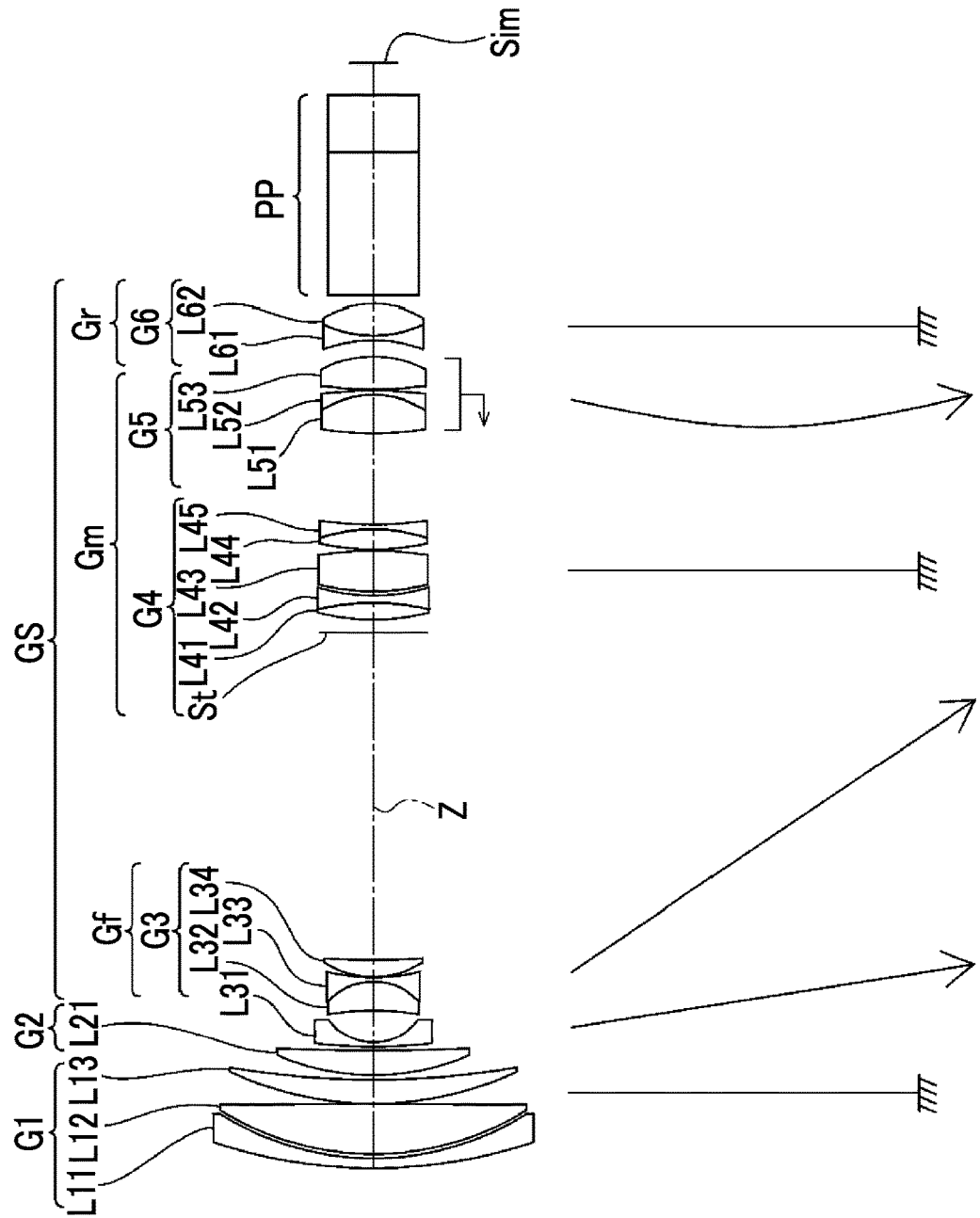
FIG. 19 is a cross-sectional view of a configuration of a zoom lens of Example 9 and a diagram illustrating movement loci thereof.

FIG. 19 shows a configuration and movement loci of the zoom lens of Example 9. The zoom lens of Example 9 consists of, in order from the object side to the image side, a first lens group G1 having a positive refractive power, a second lens group G2 having a positive refractive power, a third lens group G3 having a negative refractive power, a fourth lens group G4 having a positive refractive power, a fifth lens group G5 having a positive refractive power, and a sixth lens group G6 having a negative refractive power. During zooming, the first lens group G1, the fourth lens group G4, and the sixth lens group G6 remain stationary with respect to the image plane Sim, and the second lens group G2, the third lens group G3, and the fifth lens group G5 move along the optical axis Z by changing the spacings between the adjacent lens groups. The subsequent group GS consists of a front group Gf, a middle group Gm, and a rear group Gr in order from the object side to the image side. The front group Gf consists of a third lens group G3. The middle group Gm consists of a fourth lens group G4 and a fifth lens group G5. The rear group Gr consists of a sixth lens group G6. The focusing group consists of a fifth lens group G5.

The first lens group G1 consists of three lenses L11 to L13 in order from the object side to the image side. The second lens group G2 consists of one lens L21. The third lens group G3 consists of four lenses L31 to L34 in order from the object side to the image side. The fourth lens group G4 consists of an aperture stop St and five lenses L41 to L45 in order from the object side to the image side. The fifth lens group G5 consists of three lenses L51 to L53 in order from the object side to the image side. The sixth lens group G6 consists of two lenses L61 and L62 in order from the object side to the image side.

Regarding the zoom lens of Example 9, Table 25 shows basic lens data, Table 26 shows specifications and variable surface spacings, and Table 27 shows aspherical coefficients thereof. FIG. 20 shows aberration diagrams. The object distance in a state where the lateral magnification of the zoom lens is −0.1 times is 1.739 m (meters).

TABLE 25

Example 9

| Sn | R | D | Nd | νd | θgF |
|---|---|---|---|---|---|
| 1 | 122.62116 | 2.280 | 1.98705 | 28.12 | 0.60303 |
| 2 | 69.59668 | 1.000 | | | |
| 3 | 70.50762 | 11.515 | 1.43875 | 94.94 | 0.53433 |
| 4 | −3729.96906 | 0.120 | | | |
| 5 | 82.56202 | 5.485 | 1.85396 | 43.97 | 0.55844 |
| 6 | 205.91863 | DD[6] | | | |
| 7 | 58.76925 | 5.710 | 1.44063 | 90.28 | 0.49534 |
| 8 | 488.49110 | DD[8] | | | |
| 9 | 127.33072 | 1.000 | 2.06740 | 22.22 | 0.63603 |
| 10 | 13.39610 | 7.438 | | | |
| 11 | −64.91464 | 6.678 | 2.02239 | 15.05 | 0.67863 |
| 12 | −15.02111 | 0.970 | 1.90252 | 36.94 | 0.57821 |
| 13 | 46.58972 | 0.120 | | | |
| 14 | 22.33358 | 3.858 | 1.45630 | 78.04 | 0.51432 |
| 15 | 174.12062 | DD[15] | | | |
| 16(St) | ∞ | 3.008 | | | |
| 17 | 54.61939 | 3.902 | 1.85896 | 22.73 | 0.62844 |
| 18 | −57.45406 | 1.668 | 1.79274 | 43.75 | 0.56435 |
| 19 | 46.92130 | 1.000 | | | |
| 20 | 55.77855 | 9.353 | 1.50261 | 80.60 | 0.53774 |
| 21 | −80.84278 | 0.289 | | | |
| 22 | 62.04859 | 4.647 | 1.52815 | 71.00 | 0.53600 |
| 23 | −41.31417 | 1.019 | 1.79709 | 25.86 | 0.61513 |
| 24 | 89.42237 | DD[24] | | | |
| 25 | 83.33265 | 8.865 | 1.50261 | 80.60 | 0.53774 |
| 26 | −23.04442 | 0.974 | 1.79286 | 36.12 | 0.58367 |
| 27 | −106.64215 | 0.251 | | | |
| *28 | 63.62005 | 7.583 | 1.58313 | 59.38 | 0.54237 |
| *29 | −28.81766 | DD[29] | | | |
| 30 | −35.16286 | 1.100 | 1.79919 | 47.63 | 0.55560 |
| 31 | 29.16984 | 7.227 | 1.53176 | 49.05 | 0.56270 |
| 32 | −23.33809 | 2.000 | | | |
| 33 | ∞ | 33.000 | 1.60859 | 46.44 | 0.56664 |
| 34 | ∞ | 13.200 | 1.51633 | 64.05 | 0.53463 |
| 35 | ∞ | 7.352 | | | |

TABLE 26

Example 9

| | WIDE | TELE | TELE, β = −0.1 |
|---|---|---|---|
| Zr | 1.00 | 35.00 | 35.00 |
| f | 8.032 | 281.117 | 246.913 |
| Bf | 38.571 | 38.571 | 38.571 |
| FNo. | 1.99 | 4.82 | 4.01 |
| 2ω (°) | 70.2 | 2.2 | 2.2 |
| Ymax | 5.5 | 5.5 | 5.5 |
| DD[6] | 1.073 | 26.756 | 26.756 |
| DD[8] | 0.882 | 47.655 | 47.655 |
| DD[15] | 75.419 | 2.963 | 2.963 |
| DD[24] | 21.213 | 23.671 | 9.157 |
| DD[29] | 3.765 | 1.307 | 15.821 |

TABLE 27

Example 9

| Sn | 28 | 29 |
|---|---|---|
| KA | 1.0000000E+00 | 1.0000000E+00 |
| A3 | 0.0000000E+00 | 0.0000000E+00 |
| A4 | −9.3951927E−06 | 2.9136111E−06 |
| A5 | 8.3367185E−08 | 6.6626898E−08 |
| A6 | −3.6638018E−08 | −3.1379232E−08 |
| A7 | −3.1394568E−10 | −7.7459816E−10 |
| A8 | −2.0811065E−11 | 3.1042330E−11 |
| A9 | −5.7859756E−12 | −6.1258644E−12 |
| A10 | −3.6442843E−13 | −1.1534842E−13 |
| A11 | −1.0891422E−14 | −2.2911266E−14 |
| A12 | −2.3484636E−16 | −3.8998876E−16 |
| A13 | 6.1094503E−17 | 6.0529924E−18 |
| A14 | −9.8092432E−18 | 2.0754042E−18 |
| A15 | 4.7880867E−20 | 1.8844804E−19 |
| A16 | −6.0990371E−20 | −3.5573090E−20 |
| A17 | 4.3671214E−21 | −2.3849171E−21 |
| A18 | 3.1738042E−22 | −2.1716572E−22 |
| A19 | −5.6697145E−23 | 1.7165118E−23 |
| A20 | −8.4676798E−25 | −3.9389188E−25 |

Example 10

Figure 21:
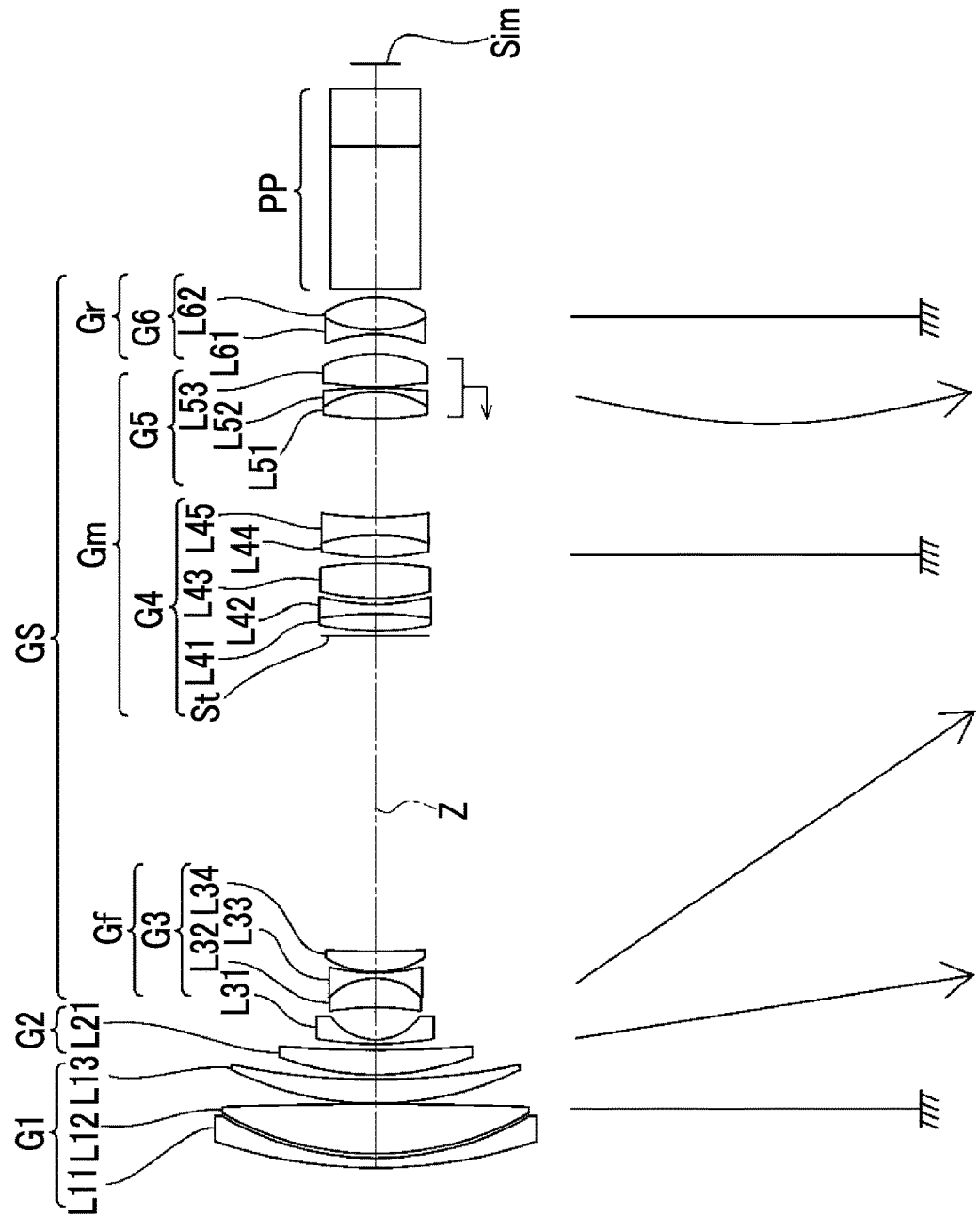
FIG. 21 is a cross-sectional view of a configuration of a zoom lens of Example 10 and a diagram illustrating movement loci thereof.

FIG. 21 shows a configuration and movement loci of the zoom lens of Example 10. The zoom lens of Example 10 consists of, in order from the object side to the image side, a first lens group G1 having a positive refractive power, a second lens group G2 having a positive refractive power, a third lens group G3 having a negative refractive power, a fourth lens group G4 having a positive refractive power, a fifth lens group G5 having a positive refractive power, and a sixth lens group G6 having a negative refractive power. During zooming, the first lens group G1, the fourth lens group G4, and the sixth lens group G6 remain stationary with respect to the image plane Sim, and the second lens group G2, the third lens group G3, and the fifth lens group G5 move along the optical axis Z by changing the spacings between the adjacent lens groups. The subsequent group GS consists of a front group Gf, a middle group Gm, and a rear group Gr in order from the object side to the image side. The front group Gf consists of a third lens group G3. The middle group Gm consists of a fourth lens group G4 and a fifth lens group G5. The rear group Gr consists of a sixth lens group G6. The focusing group consists of a fifth lens group G5.

The first lens group G1 consists of three lenses L11 to L13 in order from the object side to the image side. The second lens group G2 consists of one lens L21. The third lens group G3 consists of four lenses L31 to L34 in order from the object side to the image side. The fourth lens group G4 consists of an aperture stop St and five lenses L41 to L45 in order from the object side to the image side. The fifth lens group G5 consists of three lenses L51 to L53 in order from the object side to the image side. The sixth lens group G6 consists of two lenses L61 and L62 in order from the object side to the image side.

Regarding the zoom lens of Example 10, Table 28 shows basic lens data, Table 29 shows specifications and variable surface spacings, and Table 30 shows aspherical coefficients thereof. FIG. 22 shows aberration diagrams. The object distance in a state where the lateral magnification of the zoom lens is −0.1 times is 1.781 m (meters).

TABLE 28

Example 10

| Sn | R | D | Nd | νd | θgF |
|---|---|---|---|---|---|
| 1 | 120.37862 | 2.280 | 1.99579 | 25.74 | 0.61366 |
| 2 | 73.45361 | 1.000 | | | |
| 3 | 74.94699 | 11.459 | 1.43875 | 94.94 | 0.53433 |
| 4 | −1054.15624 | 0.120 | | | |
| 5 | 78.51166 | 5.493 | 1.86828 | 43.30 | 0.55919 |
| 6 | 168.27453 | DD[6] | | | |
| 7 | 65.27050 | 5.710 | 1.44302 | 89.53 | 0.49680 |
| 8 | 310.90826 | DD[8] | | | |
| 9 | 82.42172 | 1.000 | 2.08404 | 20.47 | 0.64778 |
| 10 | 13.15796 | 7.438 | | | |
| 11 | −67.89262 | 6.783 | 2.01594 | 14.20 | 0.68359 |
| 12 | −15.54364 | 1.171 | 1.90569 | 36.30 | 0.57975 |
| 13 | 45.37671 | 0.154 | | | |
| 14 | 22.21241 | 4.796 | 1.46176 | 62.25 | 0.53625 |
| 15 | 194.09242 | DD[15] | | | |
| 16(St) | ∞ | 1.255 | | | |
| 17 | 59.60167 | 4.000 | 1.85721 | 22.89 | 0.62726 |
| 18 | −85.71710 | 2.009 | 1.74985 | 49.82 | 0.55259 |
| 19 | 49.73964 | 1.450 | | | |
| 20 | 57.21825 | 8.111 | 1.50121 | 80.84 | 0.53768 |
| 21 | −81.20604 | 1.399 | | | |
| 22 | 65.19845 | 5.134 | 1.49750 | 66.16 | 0.53262 |
| 23 | −41.06954 | 4.058 | 1.77626 | 26.81 | 0.61232 |
| 24 | 89.45376 | DD[24] | | | |
| 25 | 83.80228 | 6.210 | 1.50121 | 80.84 | 0.53768 |
| 26 | −24.00162 | 0.891 | 1.79104 | 34.93 | 0.58714 |
| 27 | −114.57453 | 0.120 | | | |
| *28 | 57.54835 | 7.769 | 1.58313 | 59.38 | 0.54237 |
| *29 | −28.86590 | DD[29] | | | |
| 30 | −34.83496 | 1.100 | 1.79237 | 48.76 | 0.55326 |
| 31 | 28.14969 | 7.408 | 1.53356 | 50.18 | 0.56035 |
| 32 | −23.27359 | 2.000 | | | |
| 33 | ∞ | 33.000 | 1.60859 | 46.44 | 0.56664 |
| 34 | ∞ | 13.200 | 1.51633 | 64.05 | 0.53463 |
| 35 | ∞ | 5.822 | | | |

TABLE 29

Example 10

| | WIDE | TELE | TELE, β = −0.1 |
|---|---|---|---|
| Zr | 1.00 | 35.00 | 35.00 |
| f | 8.393 | 293.763 | 257.352 |
| Bf | 37.041 | 37.041 | 37.041 |
| FNo. | 1.97 | 4.98 | 4.01 |
| 2ω (°) | 66.6 | 2.2 | 2.2 |
| Ymax | 5.5 | 5.5 | 5.5 |
| DD[6] | 1.149 | 24.612 | 24.612 |
| DD[8] | 1.361 | 49.410 | 49.410 |
| DD[15] | 72.857 | 1.346 | 1.346 |
| DD[24] | 22.718 | 25.958 | 10.545 |
| DD[29] | 4.546 | 1.306 | 16.719 |

TABLE 30

Example 10

| Sn | 28 | 29 |
|---|---|---|
| KA | 1.0000000E+00 | 1.0000000E+00 |
| A3 | 0.0000000E+00 | 0.0000000E+00 |
| A4 | −8.7410699E−06 | 4.3417459E−06 |
| A5 | 5.5803004E−08 | 2.2520574E−08 |
| A6 | −4.3137006E−08 | −3.3978749E−08 |
| A7 | −1.3089675E−10 | −9.3018565E−10 |
| A8 | −1.8027427E−11 | 3.7468118E−11 |
| A9 | −6.0094365E−12 | −6.3993858E−12 |
| A10 | −3.6570927E−13 | −1.0277614E−13 |
| A11 | −1.0931030E−14 | −2.1847291E−14 |
| A12 | −3.5843790E−16 | −1.7893542E−16 |

Example 11

Figure 23:
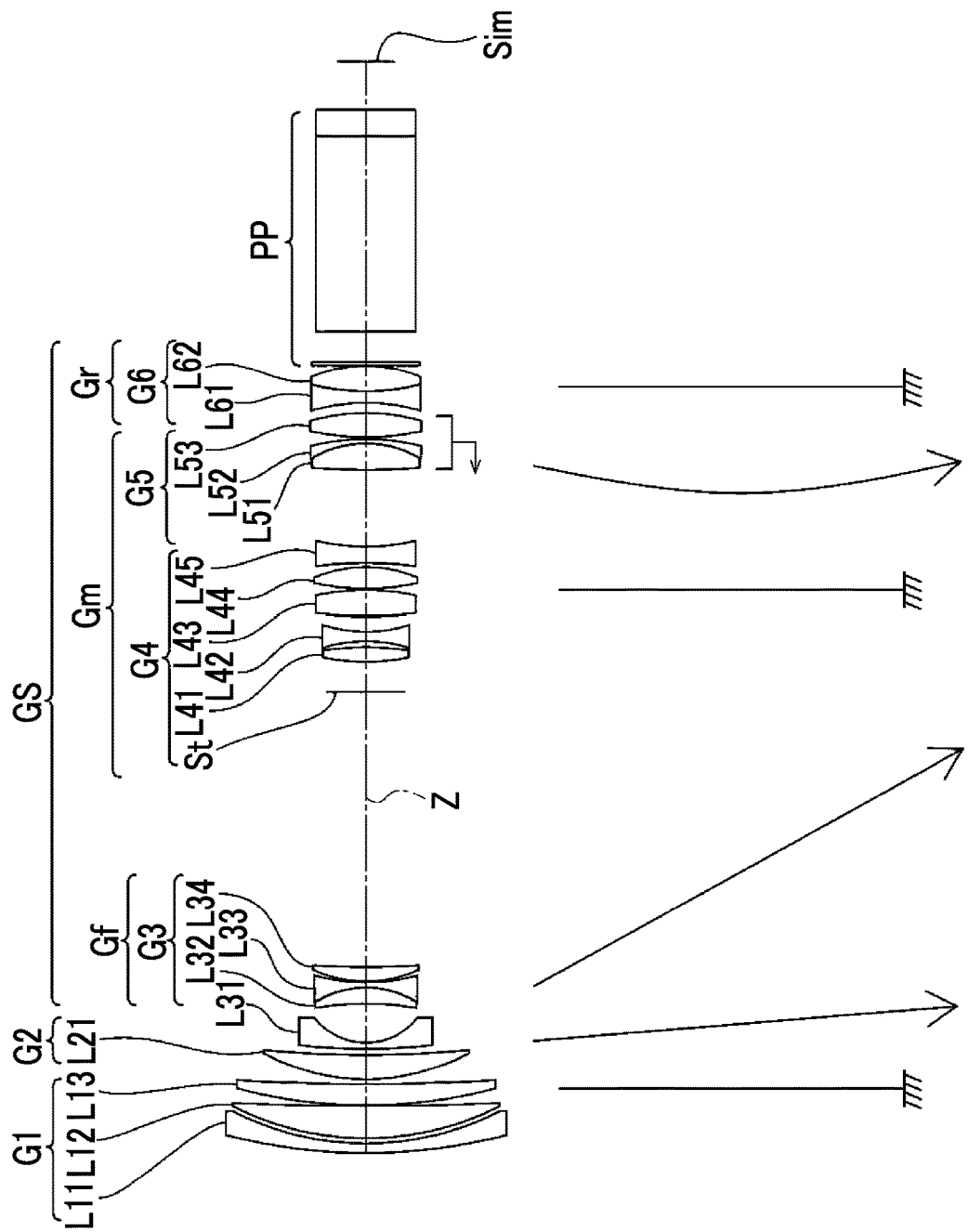
FIG. 23 is a cross-sectional view of a configuration of a zoom lens of Example 11 and a diagram illustrating movement loci thereof.

FIG. 23 shows a configuration and movement loci of the zoom lens of Example 11. The zoom lens of Example 11 consists of, in order from the object side to the image side, a first lens group G1 having a positive refractive power, a second lens group G2 having a positive refractive power, a third lens group G3 having a negative refractive power, a fourth lens group G4 having a positive refractive power, a fifth lens group G5 having a positive refractive power, and a sixth lens group G6 having a negative refractive power. During zooming, the first lens group G1, the fourth lens group G4, and the sixth lens group G6 remain stationary with respect to the image plane Sim, and the second lens group G2, the third lens group G3, and the fifth lens group G5 move along the optical axis Z by changing the spacings between the adjacent lens groups. The subsequent group GS consists of a front group Gf, a middle group Gm, and a rear group Gr in order from the object side to the image side. The front group Gf consists of a third lens group G3. The middle group Gm consists of a fourth lens group G4 and a fifth lens group G5. The rear group Gr consists of a sixth lens group G6. The focusing group consists of a fifth lens group G5.

The first lens group G1 consists of three lenses L11 to L13 in order from the object side to the image side. The second lens group G2 consists of one lens L21. The third lens group G3 consists of four lenses L31 to L34 in order from the object side to the image side. The fourth lens group G4 consists of an aperture stop St and five lenses L41 to L45 in order from the object side to the image side. The fifth lens group G5 consists of three lenses L51 to L53 in order from the object side to the image side. The sixth lens group G6 consists of two lenses L61 and L62 in order from the object side to the image side.

Regarding the zoom lens of Example 11, Table 31 shows basic lens data, Table 32 shows specifications and variable surface spacings, and Table 33 shows aspherical coefficients thereof. FIG. 24 shows aberration diagrams. The object distance in a state where the lateral magnification of the zoom lens is −0.1 times is 1.586 m (meters).

TABLE 30-continued

Example 10

| Sn | 28 | 29 |
|---|---|---|
| A13 | 5.6484672E−17 | 6.1089583E−18 |
| A14 | −8.8294834E−18 | 2.0427358E−18 |
| A15 | 8.0119813E−20 | 2.3257042E−19 |
| A16 | −5.9815102E−20 | −4.0121126E−20 |
| A17 | 4.2624657E−21 | −2.4619747E−21 |
| A18 | 3.6652478E−22 | −1.8728471E−22 |
| A19 | −6.2125834E−23 | 1.1791454E−23 |
| A20 | −6.7909421E−25 | −1.1768297E−25 |

TABLE 31

Example 11

| Sn | R | D | Nd | υd | θgF |
|---|---|---|---|---|---|
| 1 | 192.48221 | 3.000 | 1.90933 | 25.93 | 0.61233 |
| 2 | 98.87437 | 1.682 | | | |
| 3 | 98.87437 | 10.461 | 1.43875 | 94.94 | 0.53433 |
| 4 | 1053.37081 | 0.200 | | | |
| 5 | 169.42826 | 6.917 | 1.74606 | 40.89 | 0.57378 |
| 6 | 713.67134 | DD[6] | | | |
| 7 | 73.77769 | 7.751 | 1.55032 | 75.50 | 0.54170 |
| 8 | 365.56233 | DD[8] | | | |
| 9 | 212.89287 | 1.998 | 1.93797 | 34.20 | 0.58520 |
| 10 | 22.48503 | 12.628 | | | |
| 11 | −103.22504 | 5.214 | 1.94595 | 17.98 | 0.65460 |
| 12 | −31.52506 | 1.631 | 1.90043 | 37.37 | 0.57720 |
| 13 | 66.96822 | 0.294 | | | |
| 14 | 42.67536 | 4.663 | 1.79128 | 27.96 | 0.60817 |
| 15 | 292.93586 | DD[15] | | | |
| 16(St) | ∞ | 9.891 | | | |
| 17 | 76.31301 | 4.568 | 1.85000 | 23.12 | 0.62538 |
| 18 | −106.90353 | 2.038 | | | |
| 19 | −46.89961 | 3.215 | 1.73119 | 54.88 | 0.54419 |
| 20 | 49.23181 | 4.776 | | | |
| 21 | 133.23155 | 8.432 | 1.52414 | 76.29 | 0.53830 |
| 22 | −80.70562 | 0.495 | | | |
| 23 | 86.63734 | 6.905 | 1.53551 | 64.12 | 0.53704 |
| 24 | −44.61622 | 1.324 | | | |
| 25 | −128.38908 | 5.262 | 1.78573 | 27.50 | 0.60981 |
| 26 | 75.35967 | DD[26] | | | |
| 27 | 223.80280 | 8.624 | 1.52414 | 76.29 | 0.53830 |
| 28 | −35.23632 | 1.410 | 1.84558 | 30.34 | 0.59938 |
| 29 | −75.73342 | 0.572 | | | |
| *30 | 87.55517 | 7.750 | 1.58313 | 59.38 | 0.54237 |
| *31 | −70.67770 | DD[31] | | | |
| 32 | −65.35292 | 3.749 | 1.79730 | 47.47 | 0.55604 |
| 33 | 74.96734 | 8.251 | 1.55491 | 45.76 | 0.56840 |
| 34 | −47.89564 | 0.200 | | | |
| 35 | ∞ | 1.000 | 1.51633 | 64.14 | 0.53531 |
| 36 | ∞ | 10.000 | | | |
| 37 | ∞ | 63.000 | 1.60863 | 46.60 | 0.56787 |
| 38 | ∞ | 8.500 | 1.51633 | 64.14 | 0.53531 |
| 39 | ∞ | 15.804 | | | |

TABLE 32

Example 11

| | WIDE | TELE | TELE, β = −0.1 |
|---|---|---|---|
| Zr | 1.00 | 13.55 | 13.55 |
| f | 15.502 | 210.053 | 213.041 |
| Bf | 70.571 | 70.571 | 70.571 |
| FNo. | 2.48 | 3.52 | 3.52 |
| 2ω (°) | 64.4 | 5.0 | 4.8 |
| Ymax | 9.25 | 9.25 | 9.25 |
| DD[6] | 1.574 | 17.742 | 17.742 |
| DD[8] | 1.972 | 70.864 | 70.864 |
| DD[15] | 88.860 | 3.800 | 3.800 |
| DD[26] | 24.719 | 22.663 | 8.747 |
| DD[31] | 3.339 | 5.395 | 19.311 |

TABLE 33

Example 11

| Sn | 30 | 31 |
|---|---|---|
| KA | 1.0000000E+00 | 1.0000000E+00 |
| A3 | 0.0000000E+00 | 0.0000000E+00 |
| A4 | −5.6082781E−07 | 3.2170780E−07 |
| A5 | −1.9094403E−08 | −1.8152211E−08 |
| A6 | −1.0883291E−09 | −1.0033448E−09 |
| A7 | 4.2207379E−11 | 4.0829899E−11 |
| A8 | 1.5915270E−12 | −3.3164821E−13 |
| A9 | −9.2461290E−14 | 5.6892771E−14 |
| A10 | −1.5190569E−15 | −3.2913293E−15 |
| A11 | 5.4183063E−18 | −1.1136771E−16 |
| A12 | −3.4618899E−18 | 6.6041803E−18 |
| A13 | 6.8563459E−20 | −3.8729244E−19 |
| A14 | −1.5137542E−20 | −1.1729343E−20 |
| A15 | −6.5855435E−23 | −3.1498378E−22 |

TABLE 33-continued

Example 11

| Sn | 30 | 31 |
|---|---|---|
| A16 | −2.0611413E−23 | −4.4314395E−24 |
| A17 | 2.1387198E−25 | −7.7903337E−25 |
| A18 | 6.9616598E−26 | −1.4888967E−26 |
| A19 | −3.9793937E−27 | 1.8149285E−27 |
| A20 | −7.3787693E−29 | 1.0400922E−29 |

Table 34 shows corresponding values of Conditional Expressions (1) to (11) of the zoom lenses of Examples 1 to 11.

TABLE 34

| Expression Number | | Example 1 | Example 2 | Example 3 | Example 4 | Example 5 | Example 6 |
|---|---|---|---|---|---|---|---|
| (1) | Ymax/f1 | 0.061 | 0.046 | 0.048 | 0.037 | 0.046 | 0.035 |
| (2) | f1/f2 | 0.657 | 0.879 | 0.808 | 0.952 | 0.608 | 1.333 |
| (3) | ft/f2 | 1.159 | 1.181 | 1.125 | 1.773 | 1.272 | 1.070 |
| (4) | |ft/fF| | 5.086 | 3.670 | 3.280 | 7.919 | 6.781 | 3.904 |
| (5) | |DZF/fF| | 0.197 | 0.194 | 0.184 | 0.402 | 0.429 | 0.257 |
| (6) | (R1r − R2f)/(R1r + R2f) | 0.861 | 0.936 | 0.926 | 0.645 | 0.797 | 0.401 |
| (7) | (R2r − RSf)/(R2r + RSf) | −0.004 | −0.072 | −0.125 | 0.370 | 0.175 | 0.163 |
| (8) | DZSn/fSn | −3.429 | −4.265 | −4.661 | −5.961 | −5.328 | −3.720 |
| (9) | fSn/f2 | −0.085 | −0.106 | −0.095 | −0.074 | −0.064 | −0.115 |
| (10) | fSn/ft | −0.073 | −0.090 | −0.085 | −0.042 | −0.050 | −0.107 |
| (11) | f1/fSn | −7.749 | −8.287 | −8.475 | −12.831 | −9.491 | −11.608 |

| Expression Number | | Example 7 | Example 8 | Example 9 | Example 10 | Example 11 |
|---|---|---|---|---|---|---|
| (1) | Ymax/f1 | 0.036 | 0.064 | 0.036 | 0.039 | 0.028 |
| (2) | f1/f2 | 0.972 | 0.010 | 1.001 | 0.760 | 2.010 |
| (3) | ft/f2 | 1.771 | 0.029 | 1.862 | 1.587 | 1.262 |
| (4) | |ft/fF| | 7.870 | 7.326 | 8.029 | 8.680 | 3.932 |
| (5) | |DZF/fF| | 0.403 | 0.417 | 0.415 | 0.455 | 0.260 |
| (6) | (R1r − R2f)/(R1r + R2f) | 0.644 | 0.154 | 0.556 | 0.441 | 0.813 |
| (7) | (R2r − RSf)/(R2r + RSf) | 0.361 | 0.234 | 0.586 | 0.581 | 0.264 |
| (8) | DZSn/fSn | −6.121 | −4.717 | −6.052 | −5.831 | −3.764 |
| (9) | fSn/f2 | −0.075 | −0.002 | −0.079 | −0.066 | −0.136 |
| (10) | fSn/ft | −0.042 | −0.055 | −0.043 | −0.042 | −0.108 |
| (11) | f1/fSn | −13.027 | −6.340 | −12.630 | −11.469 | −14.795 |

The zoom lenses of Examples 1 to 11 have a zoom magnification of 10 times or more, and in particular, Examples 1 to 5 and 7 to 10 have a zoom magnification of 18 times or more, thereby achieving an increase in magnification. The zoom lenses of Examples 1 to 11 are configured to have a small size while achieving an increase in magnification, and various aberrations are satisfactorily corrected to realize high optical performance.

Figure 25:
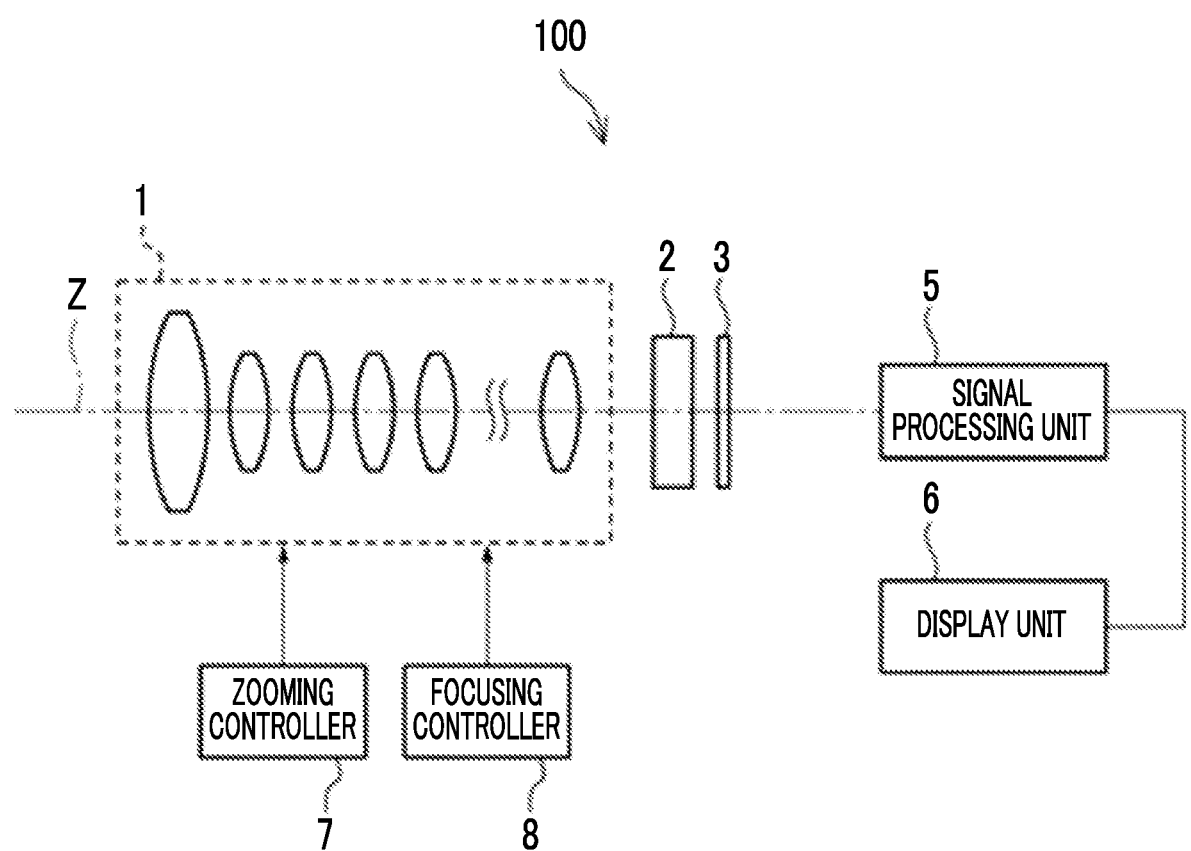
FIG. 25 is a diagram illustrating a schematic configuration of an imaging apparatus according to an embodiment.

Next, an imaging apparatus according to an embodiment of the present disclosure will be described. FIG. 25 shows a schematic configuration diagram of an imaging apparatus 100 using the zoom lens 1 according to the embodiment of the present disclosure as an example of the imaging apparatus according to the embodiment of the present disclosure. Examples of the imaging apparatus 100 include a broadcast camera, a movie camera, a digital camera, a video camera, a surveillance camera, and the like.

The imaging apparatus 100 includes a zoom lens 1, a filter 2 disposed on the image side of the zoom lens 1, and an imaging element 3 disposed on the image side of the filter 2. It should be noted that FIG. 25 schematically shows a plurality of lenses included in the zoom lens 1.

The imaging element 3 converts an optical image formed by the zoom lens 1 into an electric signal. As the imaging element 3, for example, a charge coupled device (CCD) or a complementary metal oxide semiconductor (CMOS) or the like can be used. The imaging element 3 is disposed such that the imaging surface thereof coincides with the image plane of the zoom lens 1.

The imaging apparatus 100 also comprises a signal processing unit 5 that calculates and processes an output signal from the imaging element 3, a display unit 6 that displays an image formed by the signal processing unit 5, a zooming controller 7 that controls zooming of the zoom lens 1, and a focusing controller 8 that controls focusing of the zoom lens 1. Although FIG. 25 shows only one imaging element 3, a so-called three-plate imaging apparatus having three imaging elements may be used.

The technology of the present disclosure has been hitherto described through embodiments and examples, but the technology of the present disclosure is not limited to the above-mentioned embodiments and examples, and may be modified into various forms. For example, values such as the curvature radius, the surface spacing, the refractive index, the Abbe number, and the aspherical coefficient of each lens are not limited to the values shown in the numerical examples, and different values may be used therefor.

What is claimed is:

1. A zoom lens consisting of, in order from an object side to an image side: a first lens group that has a positive refractive power; a second lens group that has a positive refractive power; and a subsequent group,
wherein during zooming, a spacing between the first lens group and the second lens group changes, and a spacing between the second lens group and the subsequent group changes,
the subsequent group includes a focusing group that moves during focusing,
a curvature radius of a lens surface closest to the image side in the second lens group is R2r,
a curvature radius of a lens surface closest to the object side in the subsequent group is RSf, Conditional Expression (7) is satisfied, which is represented by $$-0.3 < (R2r - RSf)/(R2r + RSf) < 1.2 \quad (7),$$

the subsequent group includes at least one lens group having a negative refractive power, among lens groups having negative refractive powers in the subsequent group, a Sn lens group, which is a lens group that has a strongest refractive power, moves during zooming, and a focal length of the Sn lens group is fSn, a difference in an optical axis direction between a position of the Sn lens group in a state in which an infinite distance object is in focus at a wide angle end and a position of the Sn lens group in a state in which the infinite distance object is in focus at a telephoto end is DZSn, Conditional Expression (8-3) is satisfied, which is represented by $$-15 < DZSn/fSn < -2.5 \quad (8-3),$$

the subsequent group consists of three or four lens groups, and during zooming, spacings between all adjacent lens groups within the subsequent group change.

2. The zoom lens according to claim 1, wherein
a focal length of the first lens group is f1,
a maximum image height is Ymax, and
Conditional Expression (1) is satisfied, which is represented by $$0 < Ymax/f1 < 2 \quad (1).$$

3. The zoom lens according to claim 1, wherein
a focal length of the zoom lens in a state where an infinite distance object is in focus at a telephoto end is ft,
a focal length of the second lens group is f2, and
Conditional Expression (3) is satisfied, which is represented by $$0 < ft/f2 < 4 \quad (3).$$

4. The zoom lens according to claim 1, wherein
a focal length of the zoom lens in a state where an infinite distance object is in focus at a telephoto end is ft,
a focal length of the focusing group is fF, and
Conditional Expression (4) is satisfied, which is represented by $$1 < |ft/fF| < 15 \quad (4).$$

5. The zoom lens according to claim 1, wherein
a curvature radius of a lens surface closest to the image side in the first lens group is R1r,
a curvature radius of a lens surface closest to the object side in the second lens group is R2f, and
Conditional Expression (6) is satisfied, which is represented by $$0 \leq (R1r - R2f)/(R1r + R2f) < 2 \quad (6).$$

6. The zoom lens according to claim 1, wherein a focal length of the second lens group is f2, and Conditional Expression (9) is satisfied, which is represented by $$-0.3 < fSn/f2 < 0 \quad (9).$$

7. The zoom lens according to claim 1, wherein a focal length of the zoom lens in a state in which an infinite distance object is in focus at a telephoto end is ft, and Conditional Expression (10) is satisfied, which is represented by $$-0.2 < fSn/ft < 0 \quad (10).$$

8. The zoom lens according to claim 1, wherein a focal length of the first lens group is f1, and Conditional Expression (11) is satisfied, which is represented by $$-30 < f1/fSn < -3 \quad (11).$$

9. The zoom lens according to claim 1, wherein the first lens group remains stationary with respect to an image plane and the second lens group moves during zooming.

10. The zoom lens according to claim 4, wherein Conditional Expression (4-3) is satisfied, which is represented by $$3 < |ft/fF| < 12 \quad (4-3).$$

11. An imaging apparatus comprising the zoom lens according to claim 1.

12. The zoom lens according to claim 1, wherein
the subsequent group consists of a front group, a middle group, and a rear group in order from the object side to the image side,
the Sn lens group is disposed closest to the image side in the front group, and
the focusing group is disposed closest to the image side in the middle group.

13. The zoom lens according to claim 12, wherein
the front group has a negative refractive power and moves during zooming,
the middle group has a negative refractive power and moves during zooming,
the rear group has a positive refractive power and remains stationary with respect to an image plane during zooming, and
the focusing group consists of the middle group.

14. The zoom lens according to claim 12, wherein
the front group has a negative refractive power and moves during zooming,
the middle group consists of, in order from the object side to the image side, a first middle group that has a positive refractive power and that remains stationary with respect to an image plane during zooming, and a second middle group that has a positive refractive power and that moves during zooming, and
the focusing group consists of the second middle group.

15. The zoom lens according to claim 1, wherein
Conditional Expression (7-1) is satisfied, which is represented by $$-0.24 < (R2r - RSf)/(R2r + RSf) < 0.9 \quad (7-1).$$

16. The zoom lens according to claim 1, wherein
Conditional Expression (7-2) is satisfied, which is represented by $$-0.15 < (R2r - RSf)/(R2r + RSf) < 0.6 \quad (7-2).$$

17. The zoom lens according to claim 1, wherein
Conditional Expression (8-1) is satisfied, which is represented by $$-11 < DZSn/fSn < -2.5 \quad (8-1).$$

18. The zoom lens according to claim 1, wherein
Conditional Expression (8-2) is satisfied, which is represented by $$-7 < DZSn/fSn < -3 \quad (8-2).$$

19. The zoom lens according to claim 6, wherein
Conditional Expression (9-2) is satisfied, which is represented by $$-0.15 < fSn/f2 < 0 \quad (9-2).$$

20. The zoom lens according to claim 8, wherein Conditional Expression (11-2) is satisfied, which is represented by $$-15 < f1/fSn < -6 \qquad (11\text{-}2).$$

* * * * *